US011330649B2

(12) United States Patent
Jacobs et al.

(10) Patent No.: US 11,330,649 B2
(45) Date of Patent: May 10, 2022

(54) METHODS AND SYSTEMS OF MULTI-LINK PEER-TO-PEER COMMUNICATIONS

(71) Applicant: XCOM Labs, Inc., San Diego, CA (US)

(72) Inventors: Paul Eric Jacobs, La Jolla, CA (US); Matthew Stuart Grob, La Jolla, CA (US)

(73) Assignee: XCOM Labs, Inc., San Diego, CA (US)

(*) Notice: Subject to any disclaimer, the term of this patent is extended or adjusted under 35 U.S.C. 154(b) by 123 days.

(21) Appl. No.: 16/750,589

(22) Filed: Jan. 23, 2020

(65) Prior Publication Data

US 2020/0245384 A1   Jul. 30, 2020

Related U.S. Application Data

(60) Provisional application No. 62/797,005, filed on Jan. 25, 2019, provisional application No. 62/797,059, filed on Jan. 25, 2019.

(51) Int. Cl.
    *H04W 76/14* (2018.01)
    *H04W 76/15* (2018.01)

(52) U.S. Cl.
    CPC .......... *H04W 76/14* (2018.02); *H04W 76/15* (2018.02)

(58) Field of Classification Search
    CPC . H04W 40/22; H04W 68/00; H04W 72/0433; H04W 76/14; H04L 27/2614; H04L 5/0005; H04L 27/2605
    See application file for complete search history.

(56) References Cited

U.S. PATENT DOCUMENTS 5,414,796 A    5/1995   Jacobs et al.
5,469,115 A    11/1995  Peterzell
(Continued)

FOREIGN PATENT DOCUMENTS

WO   WO 2012/057547   5/2012

OTHER PUBLICATIONS

Krishnaswamy et al., "COBA: Concurrent Bandwidth Aggregation - A Case Study in Parallel Wireless Communications," Journal of Communications, vol. 7, No. 7, pp. 524-537, 2012.
(Continued)

*Primary Examiner* — Iqbal Zaidi
(74) *Attorney, Agent, or Firm* — Knobbe Martens Olson & Bear, LLP

(57) ABSTRACT

Methods and systems of multi-link peer-to-peer communications enable consumer devices to have increased communication performance. A method of communication can include establishing, by a consumer device, a P2P interface with extender devices, transmitting uplink data to the two or more extender devices, and transmitting, by each of the two or more extender devices, uplink transmission data to a cellular network. The method can further include receiving, by the extender devices, downlink transmission data from a respective cellular network, transmitting, by each of the two or more extender devices via the peer-to-peer wireless interface, the received downlink transmission data, and receiving, at the consumer device via the peer-to-peer wireless interface, data related to the received downlink transmission data. In an example, the consumer device can also transmit data directly to a cellular network and receive data directly from the cellular network in parallel with the P2P communication.

30 Claims, 22 Drawing Sheets

(56) References Cited

U.S. PATENT DOCUMENTS

| | | |
|---|---|---|
| 5,479,475 A | 12/1995 | Grob |
| 5,487,175 A | 1/1996 | Bayley |
| 5,515,177 A | 5/1996 | Propach et al. |
| 5,517,323 A | 5/1996 | Propach et al. |
| 5,539,531 A | 7/1996 | Propach et al. |
| 5,566,000 A | 10/1996 | Propach et al. |
| D375,740 S | 11/1996 | Mergenthaler et al. |
| D375,937 S | 11/1996 | Mergenthaler et al. |
| 5,574,773 A | 11/1996 | Grob |
| D376,804 S | 12/1996 | Mergenthaler et al. |
| 5,590,406 A | 12/1996 | Bayley |
| 5,600,754 A | 2/1997 | Gardner et al. |
| 5,617,060 A | 4/1997 | Wilson |
| 5,657,420 A | 8/1997 | Jacobs et al. |
| 5,663,807 A | 9/1997 | Propach et al. |
| D386,186 S | 11/1997 | Schnetzer et al. |
| 5,737,708 A | 4/1998 | Grob |
| 5,748,104 A | 5/1998 | Argyroudis |
| 5,757,858 A | 5/1998 | Black |
| 5,761,204 A | 6/1998 | Grob |
| 5,778,338 A | 7/1998 | Jacobs et al. |
| 5,781,856 A | 7/1998 | Jacobs et al. |
| 5,784,406 A | 7/1998 | DeJaco et al. |
| 5,844,885 A | 12/1998 | Grob |
| 5,857,147 A | 1/1999 | Gardner et al. |
| 5,864,763 A | 1/1999 | Leung |
| 5,870,431 A | 2/1999 | Easton |
| 5,881,368 A | 3/1999 | Grob |
| 5,884,196 A | 3/1999 | Lekven |
| D407,701 S | 4/1999 | Chintala et al. |
| 5,898,920 A | 4/1999 | Jacobs |
| D409,561 S | 5/1999 | Chintala et al. |
| 5,903,862 A | 5/1999 | Weaver et al. |
| D410,893 S | 6/1999 | Chintala et al. |
| 5,912,882 A | 6/1999 | Yafuso |
| D411,823 S | 7/1999 | Jacobs et al. |
| D412,483 S | 8/1999 | Chintala et al. |
| D413,117 S | 8/1999 | Chintala et al. |
| 5,956,673 A | 9/1999 | Weaver et al. |
| 5,956,683 A | 9/1999 | Jacobs et al. |
| 5,960,362 A | 9/1999 | Grob |
| 5,983,099 A | 11/1999 | Yao |
| 5,983,114 A | 11/1999 | Yao |
| 6,006,108 A | 12/1999 | Black |
| D424,573 S | 5/2000 | Maloney et al. |
| 6,101,397 A | 8/2000 | Grob |
| 6,107,878 A | 8/2000 | Black |
| 6,134,440 A | 10/2000 | Black |
| 6,147,964 A | 11/2000 | Black |
| 6,181,201 B1 | 1/2001 | Black |
| 6,205,129 B1 | 3/2001 | Esteves |
| 6,205,130 B1 | 3/2001 | Dejaco |
| 6,208,858 B1 | 3/2001 | Antonio |
| 6,208,873 B1 | 3/2001 | Black |
| 6,215,779 B1 | 4/2001 | Bender |
| 6,246,885 B1 | 6/2001 | Black |
| 6,285,861 B1 | 9/2001 | Bonaccorso |
| 6,360,093 B1 | 3/2002 | Ross et al. |
| 6,360,100 B1 | 3/2002 | Grob |
| 6,363,102 B1 | 3/2002 | Ling |
| 6,366,779 B1 | 4/2002 | Bender |
| 6,397,070 B1 | 5/2002 | Black |
| 6,426,971 B1 | 7/2002 | Wu |
| 6,434,376 B1 | 8/2002 | Black |
| 6,449,490 B1 | 9/2002 | Chaponniere |
| D468,685 S | 1/2003 | Jacobs et al. |
| 6,535,523 B1 | 3/2003 | Karmi |
| 6,535,918 B1 | 3/2003 | Bender |
| 6,556,549 B1 | 4/2003 | Bender |
| 6,560,211 B2 | 5/2003 | Esteves |
| 6,574,211 B2 | 6/2003 | Padovani |
| 6,594,501 B2 | 7/2003 | Black |
| 6,594,628 B1 | 7/2003 | Jacobs et al. |
| 6,633,552 B1 | 10/2003 | Ling |
| 6,636,568 B2 | 10/2003 | Kadous |
| 6,661,833 B1 | 12/2003 | Black |
| 6,665,272 B1 | 12/2003 | Pankaj |
| 6,678,257 B1 | 1/2004 | Vijayan |
| 6,680,925 B2 | 1/2004 | Wu |
| 6,680,926 B2 | 1/2004 | Bender |
| 6,680,968 B2 | 1/2004 | Black |
| 6,687,510 B2 | 2/2004 | Esteves |
| 6,693,920 B2 | 2/2004 | Montojo |
| 6,694,469 B1 | 2/2004 | Jalali |
| 6,714,526 B2 | 3/2004 | Wei |
| 6,714,780 B1 | 3/2004 | Antonio |
| 6,725,028 B2 | 4/2004 | Bonaccorso |
| 6,738,608 B2 | 5/2004 | Black |
| 6,741,861 B2 | 5/2004 | Bender |
| 6,748,201 B2 | 6/2004 | Black |
| 6,757,520 B2 | 6/2004 | Attar |
| 6,798,736 B1 | 9/2004 | Black |
| 6,801,580 B2 | 10/2004 | Kadous |
| 6,804,210 B2 | 10/2004 | Bender |
| 6,807,161 B2 | 10/2004 | Bender |
| 6,813,478 B2 | 11/2004 | Glazko |
| 6,850,769 B2 | 2/2005 | Grob |
| 6,873,606 B2 | 3/2005 | Agrawal |
| 6,894,994 B1 | 5/2005 | Grob |
| 6,914,965 B1 | 7/2005 | Grob |
| 6,917,799 B2 | 7/2005 | Ross et al. |
| 6,917,821 B2 | 7/2005 | Kadous |
| 6,920,504 B2 | 7/2005 | Bender |
| 6,928,062 B2 | 8/2005 | Krishnan |
| 6,941,133 B2 | 9/2005 | Jacobs et al. |
| 6,965,613 B2 | 11/2005 | Karmi |
| 6,980,514 B2 | 12/2005 | Grob |
| 6,985,516 B1 | 1/2006 | Easton |
| 6,987,778 B2 | 1/2006 | Sindhushayana |
| 7,010,073 B2 | 3/2006 | Black |
| 7,020,073 B2 | 3/2006 | Kadous |
| 7,020,225 B2 | 3/2006 | Sindhushayana |
| 7,039,001 B2 | 5/2006 | Krishnan |
| 7,042,857 B2 | 5/2006 | Krishnan |
| 7,051,268 B1 | 5/2006 | Sindhushayana |
| 7,068,707 B2 | 6/2006 | Bender |
| 7,069,037 B2 | 6/2006 | Lott |
| 7,072,628 B2 | 7/2006 | Agashe |
| 7,079,550 B2 | 7/2006 | Padovani |
| 7,088,701 B1 | 8/2006 | Attar |
| 7,088,957 B2 | 8/2006 | Ling |
| 7,095,790 B2 | 8/2006 | Krishnan |
| 7,103,643 B1 | 9/2006 | Jacobs et al. |
| 7,106,782 B2 | 9/2006 | Howard |
| 7,113,792 B2 | 9/2006 | Glazko et al. |
| 7,123,922 B2 | 10/2006 | Chaponniere |
| 7,127,654 B2 | 10/2006 | Jalali |
| 7,127,655 B2 | 10/2006 | Chandhok et al. |
| 7,130,282 B2 | 10/2006 | Black |
| 7,133,437 B2 | 11/2006 | Black |
| 7,145,940 B2 | 12/2006 | Gore |
| 7,146,174 B2 | 12/2006 | Gardner et al. |
| 7,149,264 B2 | 12/2006 | Black |
| 7,155,246 B2 | 12/2006 | Bhushan |
| 7,158,506 B2 | 1/2007 | Jacobs et al. |
| 7,165,099 B2 | 1/2007 | Sprigg et al. |
| 7,167,684 B2 | 1/2007 | Kadous |
| 7,177,351 B2 | 2/2007 | Kadous |
| 7,177,648 B2 | 2/2007 | Attar |
| 7,181,666 B2 | 2/2007 | Grob |
| 7,184,426 B2 | 2/2007 | Padovani |
| 7,184,713 B2 | 2/2007 | Kadous |
| 7,184,954 B1 | 2/2007 | Jacobs et al. |
| 7,190,951 B2 | 3/2007 | Jacobs et al. |
| 7,194,041 B2 | 3/2007 | Kadous |
| 7,206,580 B2 | 4/2007 | Black |
| 7,206,598 B2 | 4/2007 | Attar |
| 7,209,517 B2 | 4/2007 | Sindhushayana |
| 7,219,145 B2 | 5/2007 | Chmaytelli et al. |
| 7,228,148 B2 | 6/2007 | Esteves |
| 7,233,794 B2 | 6/2007 | Grob |
| 7,236,535 B2 | 6/2007 | Subramaniam |
| 7,239,622 B2 | 7/2007 | Black |
| 7,239,847 B2 | 7/2007 | Attar |

(56) References Cited

U.S. PATENT DOCUMENTS

| | | |
|---|---|---|
| 7,248,572 B2 | 7/2007 | Bender |
| 7,251,229 B2 | 7/2007 | Montojo |
| 7,263,382 B2 | 8/2007 | Chandhok et al. |
| 7,266,156 B2 | 9/2007 | Montojo |
| 7,289,473 B1 | 10/2007 | Padovani |
| 7,295,857 B2 | 11/2007 | Joshi |
| 7,315,531 B2 | 1/2008 | Black |
| 7,324,836 B2 | 1/2008 | Steenstra et al. |
| 7,369,549 B2 | 5/2008 | Wu |
| 7,376,209 B2 | 5/2008 | Namgoong |
| 7,382,744 B2 | 6/2008 | Bhushan |
| 7,411,930 B2 | 8/2008 | Montojo |
| 7,418,046 B2 | 8/2008 | Gore |
| 7,424,290 B2 | 9/2008 | Jacobs et al. |
| 7,428,269 B2 | 9/2008 | Sampath |
| 7,450,943 B2 | 11/2008 | Black |
| 7,457,639 B2 | 11/2008 | Subramaniam |
| D583,782 S | 12/2008 | Jacobs et al. |
| 7,463,576 B2 | 12/2008 | Krishnan |
| 7,472,396 B2 | 12/2008 | Jacobs et al. |
| 7,477,693 B2 | 1/2009 | Subramaniam |
| 7,483,699 B2 | 1/2009 | Karmi |
| 7,499,427 B2 | 3/2009 | Padovani |
| 7,508,748 B2 | 3/2009 | Kadous |
| 7,525,909 B2 | 4/2009 | Fan |
| 7,539,507 B2 | 5/2009 | Grob |
| 7,564,775 B2 | 7/2009 | Jayaraman |
| 7,564,794 B2 | 7/2009 | Montojo |
| 7,564,818 B2 | 7/2009 | Black |
| 7,567,621 B2 | 7/2009 | Sampath |
| 7,576,605 B2 | 8/2009 | Lee et al. |
| 7,580,709 B2 | 8/2009 | Black |
| 7,596,090 B2 | 9/2009 | Black |
| 7,596,098 B2 | 9/2009 | Karmi |
| 7,599,329 B2 | 10/2009 | Karmi |
| 7,606,326 B2 | 10/2009 | Krishnan |
| 7,609,773 B2 | 10/2009 | Bhushan |
| 7,613,978 B2 | 11/2009 | Jalali |
| 7,620,005 B2 | 11/2009 | Wei |
| 7,630,719 B2 | 12/2009 | Bender |
| 7,646,802 B2 | 1/2010 | Black |
| 7,668,125 B2 | 2/2010 | Kadous |
| 7,672,383 B2 | 3/2010 | Namgoong |
| 7,675,886 B2 | 3/2010 | Agrawal |
| 7,684,797 B2 | 3/2010 | Jain et al. |
| 7,693,213 B2 | 4/2010 | Sindhushayana |
| 7,715,356 B2 | 5/2010 | Bender |
| 7,719,991 B2 | 5/2010 | Bhushan |
| 7,729,714 B2 | 6/2010 | Black |
| 7,734,285 B2 | 6/2010 | Chmaytelli et al. |
| 7,738,906 B2 | 6/2010 | Attar |
| 7,742,447 B2 | 6/2010 | Joshi |
| 7,788,092 B2 | 8/2010 | Jacobs et al. |
| 7,796,563 B2 | 9/2010 | Wu |
| 7,817,677 B2 | 10/2010 | Black |
| 7,817,760 B2 | 10/2010 | Black |
| 7,826,441 B2 | 11/2010 | Black |
| 7,830,900 B2 | 11/2010 | Black |
| 7,835,695 B2 | 11/2010 | Ling |
| 7,844,040 B2 | 11/2010 | Sprigg et al. |
| 7,848,282 B2 | 12/2010 | Padovani |
| 7,848,283 B2 | 12/2010 | Padovani |
| 7,848,284 B2 | 12/2010 | Padovani |
| 7,848,285 B2 | 12/2010 | Padovani |
| 7,848,298 B2 | 12/2010 | Attar |
| 7,869,387 B2 | 1/2011 | Black |
| 7,876,265 B2 | 1/2011 | Black |
| 7,877,744 B2 | 1/2011 | Jacobs et al. |
| 7,890,144 B2 | 2/2011 | Subramaniam |
| 7,893,873 B2 | 2/2011 | Black |
| 7,903,615 B2 | 3/2011 | Gorokhov |
| 7,907,121 B2 | 3/2011 | Jacobs et al. |
| 7,924,753 B2 | 4/2011 | Attar |
| 7,929,991 B2 | 4/2011 | Jacobs et al. |
| 7,940,663 B2 | 5/2011 | Kadous |
| 7,940,908 B2 | 5/2011 | Sprigg et al. |
| 7,948,959 B2 | 5/2011 | Wang |
| 7,953,062 B2 | 5/2011 | Sindhushayana |
| 7,961,592 B2 | 6/2011 | Black |
| 7,974,359 B2 | 7/2011 | Gorokhov |
| 7,995,531 B2 | 8/2011 | Padovani |
| 7,995,684 B2 | 8/2011 | Montojo |
| 8,005,042 B2 | 8/2011 | Padovani |
| 8,009,625 B2 | 8/2011 | Padovani |
| 8,010,113 B2 | 8/2011 | Black |
| 8,014,331 B2 | 9/2011 | Sarkar |
| 8,040,942 B2 | 10/2011 | Bhushan |
| 8,041,302 B2 | 10/2011 | Gardner et al. |
| 8,050,198 B2 | 11/2011 | Bhushan |
| 8,060,129 B2 | 11/2011 | Grob |
| 8,073,068 B2 | 12/2011 | Kim |
| 8,077,654 B2 | 12/2011 | Sutivong |
| 8,077,655 B2 | 12/2011 | Padovani |
| 8,077,691 B2 | 12/2011 | Kadous |
| 8,085,678 B2 | 12/2011 | Spindola |
| 8,089,924 B2 | 1/2012 | Padovani |
| 8,094,623 B2 | 1/2012 | Attar |
| 8,094,740 B2 | 1/2012 | Bhushan |
| 8,098,231 B2 | 1/2012 | Jacobs et al. |
| 8,098,767 B2 | 1/2012 | Mirbagheri |
| 8,102,872 B2 | 1/2012 | Spindola |
| 8,107,517 B2 | 1/2012 | Naguib |
| 8,111,663 B2 | 2/2012 | Black |
| 8,116,283 B2 | 2/2012 | Black |
| 8,126,072 B2 | 2/2012 | Namgoong |
| 8,139,672 B2 | 3/2012 | Gore |
| 8,160,596 B2 | 4/2012 | Black |
| 8,165,619 B2 | 4/2012 | Attar |
| 8,175,594 B2 | 5/2012 | Attar |
| 8,189,540 B2 | 5/2012 | Padovani |
| 8,203,961 B2 | 6/2012 | Yavuz |
| 8,204,530 B2 | 6/2012 | Gorokhov |
| 8,213,390 B2 | 7/2012 | Black |
| 8,218,573 B2 | 7/2012 | Bhushan |
| 8,229,423 B2 | 7/2012 | Sarkar |
| 8,249,577 B2 | 8/2012 | Chmaytelli et al. |
| 8,274,948 B2 | 9/2012 | Bender |
| 8,301,598 B2 | 10/2012 | Chandhok et al. |
| 8,306,096 B2 | 11/2012 | Sampath |
| 8,311,027 B2 | 11/2012 | Padovani |
| 8,331,310 B2 | 12/2012 | Wang |
| 8,331,377 B2 | 12/2012 | Attar |
| 8,331,385 B2 | 12/2012 | Black |
| 8,331,892 B2 | 12/2012 | Kadous |
| 8,351,372 B2 | 1/2013 | Padovani |
| 8,351,456 B2 | 1/2013 | Kadous |
| 8,363,697 B2 | 1/2013 | Grob et al. |
| 8,374,134 B2 | 2/2013 | Wang et al. |
| 8,375,261 B2 | 2/2013 | Shi |
| 8,385,433 B2 | 2/2013 | Wang |
| 8,385,465 B2 | 2/2013 | Kadous |
| 8,385,923 B2 | 2/2013 | Attar |
| 8,391,196 B2 | 3/2013 | Gorokhov |
| 8,391,337 B2 | 3/2013 | Black |
| 8,391,413 B2 | 3/2013 | Mantravadi |
| 8,396,152 B2 | 3/2013 | Attar |
| 8,406,774 B2 | 3/2013 | Yavuz |
| 8,411,594 B2 | 4/2013 | Black |
| 8,412,227 B2 | 4/2013 | Edge |
| 8,416,756 B2 | 4/2013 | Bhushan |
| 8,451,740 B2 | 5/2013 | Sampath |
| 8,451,776 B2 | 5/2013 | Dayal |
| 8,452,011 B2 | 5/2013 | Guo |
| 8,457,152 B2 | 6/2013 | Gorokhov |
| 8,462,859 B2 | 6/2013 | Sampath |
| 8,462,950 B2 | 6/2013 | Jacobs |
| 8,472,322 B2 | 6/2013 | Black |
| 8,483,223 B2 | 7/2013 | Black |
| 8,487,478 B2 | 7/2013 | Kirby et al. |
| 8,494,593 B2 | 7/2013 | Black |
| 8,498,192 B2 | 7/2013 | Bhushan |
| 8,514,988 B2 | 8/2013 | Wu |
| 8,537,875 B2 | 9/2013 | Soriaga |
| RE44,577 E | 11/2013 | Yafuso |

(56) References Cited

U.S. PATENT DOCUMENTS

| | | |
|---|---|---|
| 8,576,760 B2 | 11/2013 | Gorokhov |
| 8,582,621 B2 | 11/2013 | Grob et al. |
| 8,583,137 B2 | 11/2013 | Rezaiifar |
| 8,588,777 B2 | 11/2013 | Grob |
| 8,589,514 B2 | 11/2013 | Duggal et al. |
| 8,594,252 B2 | 11/2013 | Black |
| 8,605,729 B2 | 12/2013 | Dayal |
| 8,605,801 B2 | 12/2013 | Rezaiifar |
| 8,605,880 B2 | 12/2013 | Sprigg et al. |
| 8,611,303 B2 | 12/2013 | Rezaiifar |
| 8,611,305 B2 | 12/2013 | Black |
| 8,611,310 B2 | 12/2013 | Black |
| 8,611,325 B2 | 12/2013 | Black |
| 8,611,815 B2 | 12/2013 | Mohammadian |
| 8,619,717 B2 | 12/2013 | Agrawal |
| 8,619,835 B2 | 12/2013 | Grob et al. |
| 8,630,602 B2 | 1/2014 | Attar |
| 8,634,435 B2 | 1/2014 | Kadous |
| 8,634,438 B2 | 1/2014 | Nanda |
| 8,635,645 B2 | 1/2014 | Krishnamoorthi |
| 8,638,758 B2 | 1/2014 | Black |
| 8,639,190 B2 | 1/2014 | Gore |
| 8,639,662 B2 | 1/2014 | Chandhok et al. |
| 8,644,396 B2 | 2/2014 | Lee et al. |
| 8,654,705 B2 | 2/2014 | Wang |
| 8,654,715 B2 | 2/2014 | Wang |
| 8,654,868 B2 | 2/2014 | Jacobs et al. |
| 8,655,400 B2 | 2/2014 | Kadous |
| 8,665,880 B2 | 3/2014 | Yavuz |
| 8,676,209 B2 | 3/2014 | Gorokhov |
| 8,687,648 B2 | 4/2014 | Jacobs et al. |
| 8,700,083 B2 | 4/2014 | Yavuz |
| 8,712,461 B2 | 4/2014 | Yavuz |
| 8,712,848 B2 | 4/2014 | Jacobs et al. |
| 8,724,545 B2 | 5/2014 | Dayal |
| 8,724,555 B2 | 5/2014 | Krishnan |
| 8,732,272 B2 | 5/2014 | Deshpande |
| 8,737,538 B2 | 5/2014 | Grob et al. |
| 8,737,911 B2 | 5/2014 | Black |
| 8,737,981 B2 | 5/2014 | Jacobs et al. |
| 8,743,751 B2 | 6/2014 | Li |
| 8,743,758 B1 | 6/2014 | Bhargava et al. |
| 8,743,909 B2 | 6/2014 | Black |
| 8,744,018 B2 | 6/2014 | Chen |
| 8,755,350 B2 | 6/2014 | Grob |
| 8,760,994 B2 | 6/2014 | Wang |
| 8,767,885 B2 | 7/2014 | Sampath |
| 8,773,308 B2 | 7/2014 | Black |
| 8,810,194 B2 | 8/2014 | Kirby |
| 8,818,274 B2 | 8/2014 | Grob |
| D712,881 S | 9/2014 | Shaanan et al. |
| 8,824,979 B2 | 9/2014 | Yavuz |
| 8,825,860 B2 | 9/2014 | Linsky |
| 8,830,934 B2 | 9/2014 | Banister |
| 8,831,156 B2 | 9/2014 | Liang |
| 8,839,079 B2 | 9/2014 | Chen |
| 8,842,693 B2 | 9/2014 | Agrawal |
| 8,848,607 B2 | 9/2014 | Wang |
| 8,854,944 B2 | 10/2014 | Jou |
| 8,855,001 B2 | 10/2014 | Gorokhov |
| 8,867,456 B2 | 10/2014 | Yavuz |
| 8,868,118 B2 | 10/2014 | Rezaiifar |
| 8,873,534 B2 | 10/2014 | Sindhushayana |
| 8,878,393 B2 | 11/2014 | Kirby |
| 8,879,440 B2 | 11/2014 | Guo |
| 8,879,445 B2 | 11/2014 | Sadek |
| 8,885,744 B2 | 11/2014 | Kadous |
| 8,886,126 B2 | 11/2014 | Mantravadi |
| 8,886,239 B2 | 11/2014 | Dayal |
| 8,891,436 B2 | 11/2014 | Zhang |
| 8,892,035 B2 | 11/2014 | Mohammadian et al. |
| 8,897,181 B2 | 11/2014 | Wang |
| 8,897,188 B2 | 11/2014 | Black |
| 8,897,220 B2 | 11/2014 | Kadous |
| 8,897,256 B2 | 11/2014 | Cherian |
| 8,903,021 B2 | 12/2014 | Mantravadi |
| 8,908,496 B2 | 12/2014 | Kadous |
| 8,923,109 B2 | 12/2014 | Wang |
| 8,923,125 B2 | 12/2014 | Lott |
| 8,923,208 B2 | 12/2014 | Dayal |
| 8,929,908 B2 | 1/2015 | Agrawal |
| 8,947,042 B2 | 2/2015 | Kirby et al. |
| 8,948,095 B2 | 2/2015 | Black |
| 8,948,147 B2 | 2/2015 | Zheng |
| 8,954,063 B2 | 2/2015 | Sarkar |
| 8,963,486 B2 | 2/2015 | Kirby |
| 8,966,001 B2 | 2/2015 | Rauber |
| 8,971,461 B2 | 3/2015 | Sampath |
| 8,971,808 B2 | 3/2015 | Talvitie et al. |
| 8,971,811 B2 | 3/2015 | Grob |
| 8,971,823 B2 | 3/2015 | Gore |
| 8,971,884 B2 | 3/2015 | Ahluwalia |
| 8,983,480 B2 | 3/2015 | Rezaiifar |
| 8,995,417 B2 | 3/2015 | Jou |
| 9,001,735 B2 | 4/2015 | Padovani |
| 9,007,942 B2 | 4/2015 | Zhao |
| 9,014,152 B2 | 4/2015 | Jou |
| 9,037,134 B2 | 5/2015 | Grob |
| 9,055,545 B2 | 6/2015 | Black |
| 9,059,785 B2 | 6/2015 | Fertonani |
| 9,066,306 B2 | 6/2015 | Yavuz |
| 9,071,344 B2 | 6/2015 | Smee |
| 9,072,102 B2 | 6/2015 | Yavuz |
| 9,078,269 B2 | 7/2015 | Yavuz |
| 9,088,389 B2 | 7/2015 | Gorokhov |
| 9,100,549 B2 | 8/2015 | Jacobs et al. |
| 9,106,287 B2 | 8/2015 | Wang |
| 9,113,488 B2 | 8/2015 | Oguz |
| 9,118,387 B2 | 8/2015 | Padovani |
| 9,119,026 B2 | 8/2015 | Black |
| 9,119,217 B2 | 8/2015 | Black |
| 9,124,344 B2 | 9/2015 | Padovani |
| 9,130,407 B2 | 9/2015 | Toncich et al. |
| 9,131,420 B2 | 9/2015 | Rezaiifar |
| 9,136,958 B2 | 9/2015 | Walker |
| 9,136,974 B2 | 9/2015 | Gorokhov |
| 9,137,806 B2 | 9/2015 | Yavuz |
| 9,141,961 B2 | 9/2015 | Rajan et al. |
| 9,143,957 B2 | 9/2015 | Sadek |
| 9,144,036 B2 | 9/2015 | Gorokhov |
| 9,144,084 B2 | 9/2015 | Sadek |
| 9,148,256 B2 | 9/2015 | Sampath |
| 9,148,908 B2 | 9/2015 | Bhargava et al. |
| 9,154,179 B2 | 10/2015 | Gudem |
| 9,154,211 B2 | 10/2015 | Sampath |
| 9,155,106 B2 | 10/2015 | Krishnan |
| 9,155,124 B2 | 10/2015 | Bhargava et al. |
| 9,161,232 B2 | 10/2015 | Linsky |
| 9,161,233 B2 | 10/2015 | Wang |
| 9,166,715 B2 | 10/2015 | Jacobs et al. |
| 9,172,402 B2 | 10/2015 | Gudem |
| 9,172,453 B2 | 10/2015 | Wang |
| 9,177,467 B2 | 11/2015 | Tu |
| 9,178,387 B2 | 11/2015 | Mohammadian et al. |
| 9,178,632 B2 | 11/2015 | Grob |
| 9,179,319 B2 | 11/2015 | Gore |
| 9,184,870 B2 | 11/2015 | Sampath |
| 9,185,718 B2 | 11/2015 | Kadous |
| 9,185,720 B2 | 11/2015 | Mantravadi |
| 9,191,276 B2 | 11/2015 | Jacobs et al. |
| 9,198,053 B2 | 11/2015 | Edge |
| 9,204,437 B2 | 12/2015 | Smee |
| 9,226,173 B2 | 12/2015 | Sadek |
| 9,246,560 B2 | 1/2016 | Sampath |
| 9,247,525 B2 | 1/2016 | Jacobs et al. |
| 9,253,658 B2 | 2/2016 | Sadek |
| 9,264,972 B2 | 2/2016 | Fan |
| D751,928 S | 3/2016 | Shaanan et al. |
| 9,277,564 B2 | 3/2016 | Wang |
| 9,282,462 B2 | 3/2016 | Dayal |
| 9,288,814 B2 | 3/2016 | Yavuz |
| 9,294,932 B2 | 3/2016 | Walker |
| 9,307,544 B2 | 4/2016 | Gore |
| 9,344,973 B2 | 5/2016 | Yavuz |

(56) References Cited

U.S. PATENT DOCUMENTS

| | | |
|---|---|---|
| 9,358,940 B2 | 6/2016 | Cooper et al. |
| 9,363,006 B2 | 6/2016 | Bhargava et al. |
| 9,374,791 B2 | 6/2016 | Yavuz |
| 9,398,602 B2 | 7/2016 | Kadous |
| 9,407,327 B2 | 8/2016 | Kirby |
| 9,408,165 B2 | 8/2016 | Jou |
| 9,408,220 B2 | 8/2016 | Gore |
| 9,414,434 B2 | 8/2016 | Bhargava et al. |
| 9,419,751 B2 | 8/2016 | Sindhushayana |
| 9,428,127 B2 | 8/2016 | Cooper et al. |
| D765,595 S | 9/2016 | Shaanan et al. |
| 9,450,638 B2 | 9/2016 | Yan |
| 9,451,480 B2 | 9/2016 | Huang |
| 9,451,514 B1 | 9/2016 | Michel et al. |
| 9,454,265 B2 | 9/2016 | Wyrwas et al. |
| 9,461,736 B2 | 10/2016 | Bhushan |
| 9,474,075 B2 | 10/2016 | Yavuz |
| 9,483,769 B2 | 11/2016 | Rajan et al. |
| 9,491,722 B2 | 11/2016 | Yavuz |
| 9,497,495 B2 | 11/2016 | Krishnamoorthi |
| 9,503,134 B2 | 11/2016 | Sadek |
| 9,509,452 B2 | 11/2016 | Liang |
| 9,524,502 B2 | 12/2016 | Rajan et al. |
| 9,525,477 B1 | 12/2016 | Wu |
| 9,544,075 B2 | 1/2017 | Altman et al. |
| 9,578,591 B2 | 2/2017 | Bhargava et al. |
| 9,578,649 B2 | 2/2017 | Dayal |
| 9,585,150 B2 | 2/2017 | Marsh |
| 9,585,156 B2 | 2/2017 | Bhattad |
| 9,609,649 B2 | 3/2017 | Fan |
| 9,660,776 B2 | 5/2017 | Kadous |
| 9,667,817 B2 | 5/2017 | Grob |
| 9,673,837 B2 | 6/2017 | Xue |
| 9,716,402 B2 | 7/2017 | Kirby et al. |
| 9,730,227 B2 | 8/2017 | Marsh |
| 9,747,613 B2 | 8/2017 | Rajan et al. |
| 9,750,014 B2 | 8/2017 | Sadek |
| 9,788,361 B2 | 10/2017 | Valliappan |
| 9,793,738 B2 | 10/2017 | Jacobs et al. |
| 9,794,949 B2 | 10/2017 | Bhargava et al. |
| 9,806,791 B2 | 10/2017 | Bhargava et al. |
| 9,819,747 B2 | 11/2017 | Dacosta |
| 9,832,785 B2 | 11/2017 | Kadous |
| 9,860,033 B2 | 1/2018 | Kadous |
| 9,867,194 B2 | 1/2018 | Kadous |
| 9,893,800 B2 | 2/2018 | Wu |
| 9,900,856 B2 | 2/2018 | Wu |
| 9,900,880 B1 | 2/2018 | Fawazhashim et al. |
| 9,924,368 B2 | 3/2018 | Valliappan |
| 9,924,436 B2 | 3/2018 | Grob |
| 9,936,400 B2 | 4/2018 | Lee |
| 9,942,921 B2 | 4/2018 | Bhargava et al. |
| 9,954,399 B2 | 4/2018 | Toncich et al. |
| 9,954,668 B2 | 4/2018 | Lee |
| 9,955,476 B2 | 4/2018 | Black |
| 9,980,090 B2 | 5/2018 | Gujral et al. |
| 9,986,480 B2 | 5/2018 | Ta et al. |
| 9,991,747 B2 | 6/2018 | Toncich et al. |
| 9,991,986 B2 | 6/2018 | Sindhushayana |
| 10,038,999 B2 | 7/2018 | Sprigg et al. |
| 10,044,438 B2 | 8/2018 | Kadous |
| 10,044,459 B2 | 8/2018 | Chendamarai Kannan |
| 10,075,313 B2 | 9/2018 | Black |
| 10,091,789 B2 | 10/2018 | Valliappan |
| 10,136,311 B2 | 11/2018 | Bhargava et al. |
| 10,178,649 B2 | 1/2019 | Liu |
| 10,182,404 B2 | 1/2019 | Prakash |
| 10,201,014 B2 | 2/2019 | Kadous |
| 10,205,505 B2 | 2/2019 | Michel et al. |
| 10,218,406 B2 | 2/2019 | Liu |
| 10,219,235 B2 | 2/2019 | Patel |
| 10,219,252 B2 | 2/2019 | Chendamarai Kannan |
| 10,219,300 B2 | 2/2019 | Gorokhov |
| 10,225,818 B2 | 3/2019 | Liu |
| 10,292,019 B2 | 5/2019 | Ta et al. |
| 10,360,593 B2 | 7/2019 | Hunter et al. |
| 10,420,161 B1 | 9/2019 | Sava et al. |
| 10,517,027 B2 | 12/2019 | Ta et al. |
| 10,568,139 B2 | 2/2020 | Bhargava et al. |
| 10,756,795 B2 | 8/2020 | Black et al. |
| 10,880,773 B2 | 12/2020 | Huang et al. |
| 11,063,645 B2 | 7/2021 | Black et al. |
| 11,128,356 B2 | 9/2021 | Black et al. |
| 2001/0024437 A1 | 9/2001 | Bender |
| 2001/0034762 A1 | 10/2001 | Jacobs et al. |
| 2001/0034763 A1 | 10/2001 | Jacobs et al. |
| 2001/0044736 A1 | 11/2001 | Jacobs et al. |
| 2001/0044741 A1 | 11/2001 | Jacobs et al. |
| 2001/0047408 A1 | 11/2001 | Jacobs et al. |
| 2001/0055391 A1 | 12/2001 | Jacobs |
| 2002/0029166 A1 | 3/2002 | Jacobs et al. |
| 2002/0059418 A1 | 5/2002 | Bird et al. |
| 2002/0072967 A1 | 6/2002 | Jacobs et al. |
| 2002/0173315 A1 | 11/2002 | Chmaytelli |
| 2003/0050832 A1 | 3/2003 | Jacobs et al. |
| 2003/0145119 A1 | 7/2003 | Bender |
| 2003/0149738 A1 | 8/2003 | Jacobs et al. |
| 2004/0039642 A1 | 2/2004 | Jacobs et al. |
| 2004/0039784 A1 | 2/2004 | Jacobs et al. |
| 2004/0054588 A1 | 3/2004 | Jacobs et al. |
| 2004/0110525 A1 | 6/2004 | Black |
| 2004/0121730 A1 | 6/2004 | Kadous |
| 2004/0205151 A1 | 10/2004 | Sprigg et al. |
| 2004/0249708 A1 | 12/2004 | Jacobs et al. |
| 2004/0268216 A1 | 12/2004 | Jacobs et al. |
| 2005/0104857 A1 | 5/2005 | Jacobs et al. |
| 2006/0063569 A1 | 3/2006 | Jacobs et al. |
| 2006/0111920 A1 | 5/2006 | Jacobs et al. |
| 2006/0119356 A1 | 6/2006 | Rabe et al. |
| 2006/0174314 A1 | 8/2006 | Jacobs et al. |
| 2006/0203794 A1 | 9/2006 | Sampath |
| 2006/0223580 A1 | 10/2006 | Antonio et al. |
| 2006/0229089 A1 | 10/2006 | Tokgoz |
| 2007/0005428 A1 | 1/2007 | Jacobs et al. |
| 2007/0005429 A1 | 1/2007 | Jacobs et al. |
| 2007/0038728 A1 | 2/2007 | Jacobs et al. |
| 2007/0041457 A1 | 2/2007 | Kadous |
| 2007/0066232 A1 | 3/2007 | Black |
| 2007/0071147 A1 | 3/2007 | Sampath |
| 2007/0140192 A1 | 6/2007 | Kusmoto et al. |
| 2007/0165738 A1 | 7/2007 | Barriac |
| 2007/0198981 A1 | 8/2007 | Jacobs et al. |
| 2008/0025241 A1 | 1/2008 | Bhushan |
| 2008/0032740 A1 | 2/2008 | Joshi |
| 2008/0112495 A1 | 5/2008 | Gore |
| 2008/0126258 A1 | 5/2008 | Jacobs et al. |
| 2009/0080499 A1 | 3/2009 | Yavuz |
| 2009/0163209 A1 | 6/2009 | Black |
| 2009/0187593 A1 | 7/2009 | Chen et al. |
| 2009/0198608 A1 | 8/2009 | Jain et al. |
| 2009/0307739 A1 | 12/2009 | Dean et al. |
| 2010/0003931 A1 | 1/2010 | Krishnan |
| 2010/0046497 A1 | 2/2010 | Jalali |
| 2010/0057924 A1 | 3/2010 | Rauber |
| 2010/0067422 A1 | 3/2010 | Kadous |
| 2010/0067518 A1 | 3/2010 | Kaufman et al. |
| 2010/0215022 A1 | 8/2010 | Black |
| 2010/0225270 A1 | 9/2010 | Jacobs et al. |
| 2011/0007680 A1 | 1/2011 | Kadous |
| 2011/0007688 A1 | 1/2011 | Veeravalli |
| 2011/0047384 A1 | 2/2011 | Jacobs et al. |
| 2011/0222423 A1 | 9/2011 | Spindola |
| 2011/0256834 A1 | 10/2011 | Dayal |
| 2011/0310858 A1 | 12/2011 | Tokgoz |
| 2012/0016947 A1 | 1/2012 | Damola et al. |
| 2012/0057511 A1 | 3/2012 | Sivakumar et al. |
| 2012/0069232 A1 | 3/2012 | Chui |
| 2012/0077532 A1 | 3/2012 | Kadous |
| 2012/0113906 A1 | 5/2012 | Kadous |
| 2012/0127870 A1 | 5/2012 | Zhao |
| 2012/0127923 A1 | 5/2012 | Zhao |
| 2012/0140798 A1 | 6/2012 | Kadous |
| 2012/0213303 A1 | 8/2012 | Kadous |
| 2012/0258706 A1 | 10/2012 | Yu et al. |

(56) References Cited

U.S. PATENT DOCUMENTS

| | | |
|---|---|---|
| 2013/0027440 A1 | 1/2013 | Martin et al. |
| 2013/0039262 A1 | 2/2013 | Lim et al. |
| 2013/0170440 A1 | 7/2013 | Tavildar et al. |
| 2013/0201959 A1 | 8/2013 | Guo |
| 2013/0214909 A1 | 8/2013 | Meijers et al. |
| 2013/0217333 A1 | 8/2013 | Sprigg et al. |
| 2013/0229990 A1 | 9/2013 | Fan |
| 2013/0235754 A1 | 9/2013 | Lim et al. |
| 2013/0253918 A1 | 9/2013 | Jacobs |
| 2013/0300358 A1 | 11/2013 | Kirby et al. |
| 2013/0335528 A1 | 12/2013 | Vishwanath et al. |
| 2014/0029705 A1 | 1/2014 | Wu |
| 2014/0038645 A1 | 2/2014 | Wu |
| 2014/0051470 A1 | 2/2014 | Patil et al. |
| 2014/0056239 A1 | 2/2014 | Zhang |
| 2014/0071894 A1 | 3/2014 | Kairouz |
| 2014/0071967 A1 | 3/2014 | Velasco |
| 2014/0079155 A1 | 3/2014 | Wang |
| 2014/0089073 A1 | 3/2014 | Jacobs et al. |
| 2014/0133656 A1 | 5/2014 | Wurster et al. |
| 2014/0219117 A1 | 8/2014 | Meshkati |
| 2014/0219194 A1 | 8/2014 | Varoglu et al. |
| 2014/0219243 A1 | 8/2014 | Meshkati |
| 2014/0247779 A1 | 9/2014 | Wei et al. |
| 2014/0247814 A1 | 9/2014 | Zhang |
| 2014/0256340 A1 | 9/2014 | Prakash et al. |
| 2014/0269616 A1 | 9/2014 | Black |
| 2014/0273884 A1 | 9/2014 | Mantravadi |
| 2014/0285684 A1 | 9/2014 | Huang |
| 2014/0362744 A1 | 12/2014 | Yan |
| 2015/0063150 A1 | 3/2015 | Sadek |
| 2015/0063151 A1 | 3/2015 | Sadek |
| 2015/0063323 A1 | 3/2015 | Sadek |
| 2015/0065152 A1 | 3/2015 | Sadek |
| 2015/0070323 A1 | 3/2015 | Hong |
| 2015/0071648 A1 | 3/2015 | Hong et al. |
| 2015/0083917 A1 | 3/2015 | Wyrwas et al. |
| 2015/0084928 A1 | 3/2015 | Wyrwas et al. |
| 2015/0084994 A1 | 3/2015 | Wyrwas et al. |
| 2015/0085686 A1 | 3/2015 | Chande |
| 2015/0133184 A1 | 5/2015 | Sadek |
| 2015/0139015 A1 | 5/2015 | Kadous |
| 2015/0163823 A1 | 6/2015 | Sadek |
| 2015/0181299 A1 | 6/2015 | Rauber |
| 2015/0195733 A1 | 7/2015 | Yavuz |
| 2015/0223077 A1 | 8/2015 | Fan |
| 2015/0245273 A1 | 8/2015 | Grob |
| 2015/0282077 A1 | 10/2015 | Yavuz |
| 2015/0319702 A1 | 11/2015 | Patel |
| 2015/0326382 A1 | 11/2015 | Li |
| 2015/0350919 A1 | 12/2015 | Patel |
| 2015/0373605 A1 | 12/2015 | Kanamarlapudi et al. |
| 2015/0382190 A1 | 12/2015 | Canoy et al. |
| 2016/0012489 A1 | 1/2016 | Rajan et al. |
| 2016/0037511 A1 | 2/2016 | Vincze et al. |
| 2016/0085440 A1 | 3/2016 | Canoy et al. |
| 2016/0088625 A1 | 3/2016 | Kadous |
| 2016/0095039 A1 | 3/2016 | Valliappan |
| 2016/0095040 A1 | 3/2016 | Valliappan |
| 2016/0128123 A1 | 5/2016 | Li |
| 2016/0128130 A1 | 5/2016 | Sadek |
| 2016/0164573 A1 | 6/2016 | Birk et al. |
| 2016/0219578 A1 | 7/2016 | Lim et al. |
| 2016/0255664 A1 | 9/2016 | Li |
| 2016/0315688 A1 | 10/2016 | Bhargava et al. |
| 2016/0316361 A1 | 10/2016 | Bhargava et al. |
| 2016/0337971 A1 | 11/2016 | Bhargava et al. |
| 2016/0353482 A1 | 12/2016 | Valliappan |
| 2017/0005741 A1 | 1/2017 | Wu |
| 2017/0013658 A1 | 1/2017 | Ta et al. |
| 2017/0019814 A1 | 1/2017 | Determan |
| 2017/0027017 A1 | 1/2017 | Black |
| 2017/0048047 A1 | 2/2017 | Kadous |
| 2017/0048889 A1 | 2/2017 | Kadous |
| 2017/0054488 A1 | 2/2017 | Michel et al. |
| 2017/0055260 A1 | 2/2017 | Valliappan |
| 2017/0055285 A1 | 2/2017 | Valliappan |
| 2017/0055291 A1 | 2/2017 | Gorokhov |
| 2017/0064657 A1 | 3/2017 | Chendamarai Kannan |
| 2017/0064729 A1 | 3/2017 | Sadek |
| 2017/0070847 A1 | 3/2017 | Altman et al. |
| 2017/0076311 A1 | 3/2017 | Rajan et al. |
| 2017/0093545 A1 | 3/2017 | Kadous |
| 2017/0093883 A1 | 3/2017 | Hebron et al. |
| 2017/0094680 A1 | 3/2017 | Patel |
| 2017/0135029 A1 | 5/2017 | Chendamarai Kannan |
| 2017/0142705 A1 | 5/2017 | Chendamarai Kannan |
| 2017/0142713 A1 | 5/2017 | Chendamarai Kannan |
| 2017/0156078 A1 | 6/2017 | Lee et al. |
| 2017/0202022 A1 | 7/2017 | Chendamarai Kannan |
| 2017/0208576 A1 | 7/2017 | Chendamarai Kannan |
| 2017/0222771 A1 | 8/2017 | Chendamarai Kannan |
| 2017/0223651 A1 | 8/2017 | Patel |
| 2017/0223737 A1 | 8/2017 | Patel |
| 2017/0250842 A1 | 8/2017 | Han et al. |
| 2017/0251473 A1 | 8/2017 | Xue |
| 2017/0280382 A1 | 9/2017 | Radulescu |
| 2017/0289761 A1 | 10/2017 | Stojanovski et al. |
| 2017/0311316 A1 | 10/2017 | Chendamarai Kannan |
| 2017/0311343 A1 | 10/2017 | Chendamarai Kannan |
| 2017/0311346 A1 | 10/2017 | Chendamarai Kannan |
| 2017/0318586 A1 | 11/2017 | Wang |
| 2017/0332288 A1 | 11/2017 | Sadek |
| 2017/0353874 A1 | 12/2017 | Harrang et al. |
| 2017/0359263 A1 | 12/2017 | Barghi |
| 2017/0359815 A1 | 12/2017 | Chendamarai Kannan |
| 2017/0373807 A1 | 12/2017 | Hessler et al. |
| 2018/0014311 A1 | 1/2018 | Bhargava et al. |
| 2018/0026703 A1 | 1/2018 | Bhargava et al. |
| 2018/0027059 A1 | 1/2018 | Miller |
| 2018/0041917 A1 | 2/2018 | Xi et al. |
| 2018/0042018 A1 | 2/2018 | Bhushan |
| 2018/0048372 A1 | 2/2018 | Sun et al. |
| 2018/0054234 A1 | 2/2018 | Stuckman et al. |
| 2018/0054348 A1 | 2/2018 | Luo |
| 2018/0054382 A1 | 2/2018 | Luo |
| 2018/0054762 A1 | 2/2018 | Kadous |
| 2018/0054780 A1 | 2/2018 | Radulescu |
| 2018/0054783 A1 | 2/2018 | Luo |
| 2018/0054811 A1 | 2/2018 | Luo |
| 2018/0054812 A1 | 2/2018 | Luo |
| 2018/0054830 A1 | 2/2018 | Luo |
| 2018/0054832 A1 | 2/2018 | Luo |
| 2018/0059221 A1 | 3/2018 | Slobodyanyuk |
| 2018/0063799 A1 | 3/2018 | Sadek |
| 2018/0069589 A1 | 3/2018 | Liu |
| 2018/0069594 A1 | 3/2018 | Henry et al. |
| 2018/0069731 A1 | 3/2018 | Henry et al. |
| 2018/0070243 A1 | 3/2018 | Liu |
| 2018/0084430 A1 | 3/2018 | Patel |
| 2018/0098225 A1 | 4/2018 | Damnjanovic |
| 2018/0098335 A1 | 4/2018 | Sun |
| 2018/0103461 A1 | 4/2018 | Sun |
| 2018/0103472 A1 | 4/2018 | Zhang |
| 2018/0109957 A1 | 4/2018 | Fan |
| 2018/0110022 A1 | 4/2018 | Fan |
| 2018/0110063 A1 | 4/2018 | Fan |
| 2018/0115907 A1 | 4/2018 | Damnjanovic |
| 2018/0115933 A1 | 4/2018 | Radulescu |
| 2018/0115973 A1 | 4/2018 | Black |
| 2018/0123859 A1 | 5/2018 | Liu |
| 2018/0124770 A1 | 5/2018 | Yerramalli |
| 2018/0124776 A1 | 5/2018 | Yerramalli |
| 2018/0124777 A1 | 5/2018 | Yerramalli |
| 2018/0124789 A1 | 5/2018 | Yerramalli |
| 2018/0124820 A1 | 5/2018 | Sun |
| 2018/0132236 A1 | 5/2018 | Kadous |
| 2018/0139616 A1 | 5/2018 | Khoshnevisan |
| 2018/0139618 A1 | 5/2018 | Yerramalli |
| 2018/0139782 A1 | 5/2018 | Sadek |
| 2018/0146480 A1 | 5/2018 | Chendamarai Kannan |
| 2018/0160328 A1 | 6/2018 | Chendamarai Kannan |
| 2018/0160389 A1 | 6/2018 | Yerramalli |
| 2018/0167848 A1 | 6/2018 | Lei |

(56) References Cited

U.S. PATENT DOCUMENTS

| | | |
|---|---|---|
| 2018/0167968 A1 | 6/2018 | Liu |
| 2018/0175986 A1 | 6/2018 | Chendamarai Kannan |
| 2018/0176946 A1 | 6/2018 | Sun |
| 2018/0198518 A1 | 7/2018 | Wu |
| 2018/0199379 A1 | 7/2018 | Bhargava et al. |
| 2018/0206213 A1 | 7/2018 | Kim et al. |
| 2018/0206252 A1 | 7/2018 | Thangarasa et al. |
| 2018/0213560 A1 | 7/2018 | Naghshvar |
| 2018/0220428 A1 | 8/2018 | Sun |
| 2018/0227011 A1 | 8/2018 | Yerramalli |
| 2018/0227771 A1 | 8/2018 | Malik |
| 2018/0227797 A1 | 8/2018 | Liu |
| 2018/0227936 A1 | 8/2018 | Yerramalli |
| 2018/0227944 A1 | 8/2018 | Yerramalli |
| 2018/0241494 A1 | 8/2018 | Chendamarai Kannan |
| 2018/0241526 A1 | 8/2018 | Chendamarai Kannan |
| 2018/0242163 A1 | 8/2018 | Patel |
| 2018/0242223 A1 | 8/2018 | Chendamarai Kannan |
| 2018/0242232 A1 | 8/2018 | Chendamarai Kannan |
| 2018/0242277 A1 | 8/2018 | Liu |
| 2018/0242348 A1 | 8/2018 | Chendamarai Kannan |
| 2018/0249380 A1 | 8/2018 | Zhang |
| 2018/0249496 A1 | 8/2018 | Radulescu |
| 2018/0255561 A1 | 9/2018 | Barghi |
| 2018/0255584 A1 | 9/2018 | Sun |
| 2018/0262962 A1 | 9/2018 | Ta et al. |
| 2018/0269962 A1 | 9/2018 | Liu |
| 2018/0278363 A1 | 9/2018 | Bhushan |
| 2018/0279134 A1 | 9/2018 | Malik |
| 2018/0279156 A1 | 9/2018 | Malik |
| 2018/0279212 A1 | 9/2018 | Malik |
| 2018/0279292 A1 | 9/2018 | Luo |
| 2018/0287762 A1 | 10/2018 | Sun |
| 2018/0287840 A1 | 10/2018 | Akkarakaran |
| 2018/0287870 A1 | 10/2018 | Yerramalli |
| 2018/0288747 A1 | 10/2018 | Sun |
| 2018/0288749 A1 | 10/2018 | Sun |
| 2018/0288781 A1 | 10/2018 | Akkarakaran |
| 2018/0294911 A1 | 10/2018 | Sun |
| 2018/0295622 A1 | 10/2018 | Sadek |
| 2018/0302186 A1 | 10/2018 | Reddy |
| 2018/0302201 A1 | 10/2018 | Yoo |
| 2018/0302796 A1 | 10/2018 | Zhang |
| 2018/0309479 A1 | 10/2018 | Yerramalli |
| 2018/0310267 A1 | 10/2018 | Liu |
| 2018/0310341 A1 | 10/2018 | Yerramalli |
| 2018/0317093 A1 | 11/2018 | Li |
| 2018/0317259 A1 | 11/2018 | Islam |
| 2018/0324713 A1 | 11/2018 | Yoo |
| 2018/0331870 A1 | 11/2018 | Sun |
| 2018/0332551 A1 | 11/2018 | Liu |
| 2018/0338299 A1 | 11/2018 | Liu |
| 2018/0343156 A1 | 11/2018 | Malik |
| 2018/0343588 A1 | 11/2018 | Sadek |
| 2018/0343676 A1 | 11/2018 | Yerramalli |
| 2018/0352563 A1 | 12/2018 | Liu |
| 2018/0352597 A1 | 12/2018 | Bostick et al. |
| 2018/0359656 A1 | 12/2018 | Liu |
| 2018/0359685 A1 | 12/2018 | Li |
| 2018/0367362 A1 | 12/2018 | Sun |
| 2018/0368089 A1 | 12/2018 | Yerramalli |
| 2018/0376392 A1 | 12/2018 | Wu |
| 2018/0376393 A1 | 12/2018 | Wu |
| 2018/0376503 A1 | 12/2018 | Sun |
| 2019/0007946 A1 | 1/2019 | Yerramalli |
| 2019/0009756 A1 | 1/2019 | Jacobs |
| 2019/0014481 A1 | 1/2019 | Yerramalli |
| 2019/0014507 A1 | 1/2019 | Zhang |
| 2019/0014589 A1 | 1/2019 | Yerramalli |
| 2019/0020424 A1 | 1/2019 | Yerramalli |
| 2019/0020461 A1 | 1/2019 | Yerramalli |
| 2019/0020522 A1 | 1/2019 | Sun |
| 2019/0020527 A1 | 1/2019 | Lei |
| 2019/0020528 A1 | 1/2019 | Lei |
| 2019/0020529 A1 | 1/2019 | Lei |
| 2019/0020853 A1* | 1/2019 | Segal ................ H04N 21/4223 |
| 2019/0021080 A1 | 1/2019 | Lei |
| 2019/0028999 A1 | 1/2019 | Yerramalli |
| 2019/0029019 A1 | 1/2019 | Zhang |
| 2019/0037376 A1 | 1/2019 | Liu |
| 2019/0037427 A1 | 1/2019 | Yerramalli |
| 2019/0037481 A1 | 1/2019 | Zhang |
| 2019/0037482 A1 | 1/2019 | Damnjanovic |
| 2019/0037525 A1 | 1/2019 | Liu |
| 2019/0037603 A1 | 1/2019 | Damnjanovic |
| 2019/0044648 A1 | 2/2019 | Boudreau et al. |
| 2019/0053048 A1 | 2/2019 | Bhargava et al. |
| 2019/0053064 A1 | 2/2019 | Niu et al. |
| 2019/0053269 A1 | 2/2019 | Lei |
| 2019/0059001 A1 | 2/2019 | Yerramalli |
| 2019/0059102 A1 | 2/2019 | Yerramalli |
| 2019/0069325 A1 | 2/2019 | Yerramalli |
| 2019/0075597 A1 | 3/2019 | Yerramalli |
| 2019/0182703 A1 | 6/2019 | Huang et al. |
| 2019/0230513 A1 | 7/2019 | Ang |
| 2019/0253844 A1 | 8/2019 | Ta et al. |
| 2019/0319723 A1 | 10/2019 | Axmon et al. |
| 2019/0373464 A1* | 12/2019 | Chari .................. H04L 41/12 |
| 2020/0059813 A1 | 2/2020 | Park et al. |
| 2020/0145881 A1 | 5/2020 | Mitra et al. |
| 2020/0154475 A1 | 5/2020 | Pao et al. |
| 2020/0195313 A1 | 6/2020 | Black et al. |
| 2020/0195322 A1 | 6/2020 | Black et al. |
| 2020/0195323 A1 | 6/2020 | Black et al. |
| 2020/0196384 A1* | 6/2020 | Liu .................... H04L 69/30 |
| 2020/0213994 A1 | 7/2020 | Feng et al. |

OTHER PUBLICATIONS

International Search Report and Written Opinion in International Application No. PCT/US2020/014935, mail date Apr. 15, 2020.

3GPP RP-170750, New WID: Further Enhancements to Coordinated Multi-Point (CoMP) Operation for LTE, Mar. 2017.

3GPP Tr 36.741, Study on Further Enhancements to Coordinated Multi-Point (CoMP) Operation for Lte, V14.0.0, Mar. 2017.

Agrawal, et al., Dynamic Point Selection for LTE-Advanced: Algorithms and Performance, Wireless Communications and Networking Conference (WCNC), 2014 IEEE, Istanbul, Turkey, Apr. 2014, pp. 1392-1397.

Andrews, et al., "Are We Approaching the Fundamental Limits of Wireless Network Densification?", IEEE Communications Magazine, vol. 54, No. 10, pp. 184-190, Oct. 2016.

Bjornson, et al., "Cooperative Multicell Precoding: Rate Region Characterization and Distributed Strategies with Instantaneous and Statistical Csi, IEEE Transactions on Signal Processing", vol. 58, No. 8, pp. 4298-4310, Aug. 2010.

Buzzi, et al., "Cell-Free Massive MIMO: User-Centric Approach", IEEE Wireless Communications Letters, vol. 6, No. 6, pp. 706-709, Dec. 2017.

Checko, et al., "Cloud RAN for Mobile Networks - a Technology Overview", IEEE Communications Surveys & Tutorials, vol. 17, No. 1, Sep. 2014.

Chen, et al., "Channel Hardening and Favorable Propagation in Cell-Free Massive MIMO with Stochastic Geometry", version 1,2017. Available at: http://arxiv.org/abs/1710.00395.

Chen, et al., Channel Hardening and Favorable Propagation in Cell-Free Massive MIMO with Stochastic Geometry, version 2, 2018. Available at: http://arxiv.org/abs/1710.00395.

Davydov, et al., "Evaluation of Joint Transmission CoMP in C-RAN based LTE-A HetNets with Large Coordination Areas", Proc. GLOBECOM'14, Atlanta, U.S., Dec. 2013, pp. 801-806.

Forenza, et al., "Achieving Large Multiplexing Gain in Distributed Antenna Systems via Cooperation with pCell Technology", 49th Asilomar Conference on Signals, Systems and Computers, Nov. 2015, IEEE, pp. 286-293.

Gesbert, et al., "Multi-cell MIMO Cooperative Networks: A New Look at Interference, IEEE Journal on Selected Areas in Communications", vol. 28, No. 9, pp. 1380-1408, Dec. 2010.

(56) References Cited

OTHER PUBLICATIONS

Gilhousen, et al., "On the Capacity of a Cellular CDMA system", IEEE Transactions on Vehicular Technology, vol. 40, No. 2, pp. 303-311, May 1991.
Interdonato, et al., "How Much Do Downlink Pilots Improve Cell-Free Massive Mimo?", IEEE, 2016, 7 pages.
International Preliminary Report on Patentability and Written Opinion for International Application No. PCT/US2019/066639, dated Jun. 16, 2021, in 16 pages.
International Search Report dated Apr. 17, 2020 for International Patent Application No. PCT/US2019/066639.
Larsson, et al., "Massive MIMO for Next Generation Wireless Systems", Jan. 2014.
Marzei I A, et al., "Fundamentals of Massive MIMO", Cambridge University Press, Dec. 2016, Table of Contents.
Nayebi, et al., "Precoding and Power Optimization in Cell-Free Massive MIMO Systems", IEEE Transactions on Wireless Communications, vol. 16, No. 7, pp. 4445-4459, Jul. 2017.
Ngo, et al., "Cell-Free Massive MIMO Versus Small Cells", IEEE Transactions on Wireless Communications, vol. 16, No. 3, pp. 1834-1850, Mar. 2017.
Ngo, et al., "On the Total Energy Efficiency of Cell-Free Massive Mimo", IEEE Transactions on Green Communications and Networking, vol. 2, No. 1, pp. 25-39, Mar. 2018.
Osseiran, et al., "5G Mobile and Wireless Communications Technology", Cambridge University Press, Oct. 2016, Ch. 9, Coordinated multi-point transmission in 5G.
Rohde & Schwarz, "Lte Transmission Modes and Beamforming", White Paper, Jul. 2015.
Shamai, et al., "Enhancing the Cellular Downlink Capacity via Co-processing at the Transmitting End", Proceedings of IEEE VTC-Spring, vol. 3, 2001, pp. 1745-1749.
Sun et al., "Performance Evaluation of CS/CB for Coordinated Multipoint Transmission in LTE-A Downlink", Proceedings of IEEE PIMRC'12, Sydney, Australia, Sep. 2012, pp. 1061-1065.
Tanghe, et al., "The Industrial Indoor Channel: Large-Scale and Temporal Fading at 900, 2400, and 5200 MHz", IEEE Transactions on Wireless Communications, vol. 7, No. 7, pp. 2740-2751, Jul. 2008.
Written Opinion dated Apr. 17, 2020 for International Patent Application No. PCT/US2019/066639.
Wu, et al., "Cloud Radio Access Network (C-RAN): A Primer", IEEE Network, vol. 29, No. 1, pp. 35-41, Jan./Feb. 2015.
Wu, et al., "Centralized and Distributed Schedulers for Non-Coherent Joint Transmission", Sep. 2018.
Zhou, et al., "Distributed Wireless Communication System: A New Architecture for Future Public Wireless Access", IEEE Communications Magazine, vol. 41, No. 3, pp. 108-113, Mar. 2003.

* cited by examiner

METHODS AND SYSTEMS OF MULTI-LINK PEER-TO-PEER COMMUNICATIONS

INCORPORATION BY REFERENCE TO ANY PRIORITY APPLICATIONS

This application claims the benefit of U.S. Provisional Application No. 62/797,005 filed on Jan. 25, 2019, and titled "METHODS AND SYSTEMS OF MULTI-LINK PEER-TO-PEER COMMUNICATIONS," and this application claims the benefit of U.S. Provisional Application No. 62/797,059, filed on Jan. 25, 2019, and titled "TOKEN BASED MVNO SERVICE." The entire disclosure of the above-identified provisional applications are hereby made part of this specification as if set forth fully herein and incorporated by reference for all purposes, for all that it contains. U.S. Pat. Nos. 8,743,758, 9,148,908, 9,451,514, and 9,578,591 are each incorporated in their entirety herein for all purposes for all that they contain.

Any and all applications for which a foreign or domestic priority claim is identified in the Application Data Sheet as filed with the present application are hereby incorporated by reference under 37 CFR 1.57.

BACKGROUND

Technical Field

Embodiments of this disclosure relate to wireless communication devices.

Description of Related Technology

Cellular phones and other computing devices with cellular connectivity functionality are configured to wirelessly exchange information with cellular carrier networks. Such devices typically include cellular modems and associated radio frequency circuitry to facilitate cellular communications. Some of these devices can also include non-cellular modems to facilitate non-cellular wireless communications, such as Wi-Fi and/or Bluetooth communications.

SUMMARY

Advantages of the subject matter described herein can utilize non-cellular interfaces and/or cellular interfaces in a wireless device to concurrently perform multiple wireless connections. Non-cellular networks, such as wireless local area networks, Bluetooth networks and the Internet, are ubiquitous and are also directly or indirectly connected with cellular networks. The subject matter described herein exploits the hybrid of cellular and non-cellular networks to expand the coverage of cellular base stations. When a wireless device participates in a hybrid network, the subject method utilizes a non-cellular interface of the device to originate or relay a cellular communication via hopping on the non-cellular network, and concurrently utilizes cellular connection without interrupting an existing non-cellular connection of the device. The concurrent uses such interfaces maximize the utilization of its computing and communication resources to expand the cellular coverage and/or increases the speed of data communications.

One innovation includes a method of wireless communication, the method comprising establishing, by a consumer device, a peer-to-peer wireless interface with two or more extender devices; transmitting, from the consumer device, uplink data to each of the two or more extender devices; transmitting, by each of the two or more extender devices, uplink transmission data to a cellular network; receiving, by each of the two or more extender devices, downlink transmission data from a respective cellular network; transmitting, by each of the two or more extender devices via the peer-to-peer wireless interface, the received downlink transmission data; and receiving, at the consumer device via the peer-to-peer wireless interface, data related to the received downlink transmission data.

Various embodiments of such methods of wireless communication can include one or more features, or different features. In an example, such methods can further comprise transmitting, by the consumer device, uplink transmission data to a cellular network, and receiving, by the consumer device, downlink transmission data from the cellular network, data received by the consumer device from the cellular network and from the peer-to-to-peer wireless interface being aggregated at the consumer device. Also where the transmitting by the consumer device uplink transmission data to a cellular network and receiving by the consumer device downlink transmission data from the cellular network occurs during a same time period as transmitting and receiving data from the two or more extender devices. In such methods, the two or more extender devises comprise a first extender device and a second extender device, and the method can further comprise transmitting, by the first extender device, to a cellular network operated by a first mobile network operator, and transmitting, by the second extender device, to a cellular network operated by a second mobile network operator. Also, some such methods can further include transmitting, by the consumer device, uplink transmission data to a cellular network; and receiving, by the consumer device, downlink transmission data from the cellular network, where the data received by the consumer device from the cellular network and from the peer-to-to-peer wireless interface is aggregated at the consumer device, and where said transmitting by the consumer device uplink transmission data to a cellular network and receiving by the consumer device downlink transmission data from the cellular network occurs during a same time period as transmitting and receiving data from the two or more extender devices.

In other examples of such methods, the two or more extender devises comprise a first extender device and a second extender device, and the method further comprises transmitting, by the first extender device on a first channel, to a cellular network operated by a first mobile network operator, and transmitting, by the second extender device on a second channel, to a cellular network operated by the first mobile network operator. In some examples, the method further includes transmitting, by the consumer device, uplink transmission data to a cellular network; and receiving, by the consumer device, downlink transmission data from the cellular network, where data received by the consumer device from the cellular network and from the peer-to-to-peer wireless interface is aggregated at the consumer device, and where the transmitting by the consumer device uplink transmission data to a cellular network and receiving by the consumer device downlink transmission data from the cellular network occurs during a same time period as transmitting and receiving data from the two or more extender devices.

In some other examples of such methods, establishing a peer-to-peer wireless interface with two or more extender devices comprises establishing a peer-to-peer wireless interface with a first extender device using a first wireless protocol, and establishing a peer-to-peer wireless interface with a second extender device using a second wireless protocol different from the first wireless protocol. The first wireless protocol can be Wi-Fi and the second wireless protocol can be Bluetooth. In another example of such methods, establishing, by a consumer device, a peer-to-peer wireless interface with two or more extender devices comprises communicating with a first extender device of the two or more extender devices on a first peer-to-peer wireless interface on a first channel, and communicating with a second extender device of the two or more extender devices on the peer-to-peer wireless interface on a second channel. In any of such methods, a peer-to-peer (P2P) wireless interface can be Wi-Fi. In some examples where the P2P wireless interface is W-Fi, the first channel is at 2.4 GHz and the second channel is at 5.8 GHz. In some examples, the peer-to-peer wireless interface includes two different channels of a cellular wireless interface. In some examples, the peer-to-peer wireless interface includes two different channels of a cellular wireless interface. In such methods where the peer-to-peer wireless interface includes two different channels of a cellular wireless interface, at least one of the first and second channels is a channel is a millimeter band channel. In some examples, at least one of the first and second channels is a channel is a sub-6 GHz channel. In some examples, the first channel and the second channel are different bands of 4G. In other of such examples, the first channel and the second channel are different bands of 5G.

Some implementations of such methods further include transmitting, by the consumer device, uplink transmission data to a cellular network; and receiving, by the consumer device, downlink transmission data from the cellular network, where data received by the consumer device from the cellular network and from the peer-to-to-peer wireless interface is aggregated at the consumer device, and where said transmitting by the consumer device uplink transmission data to a cellular network and receiving by the consumer device downlink transmission data from the cellular network occurs during a same time period as transmitting and receiving data from the two or more extender devices. In some examples of these methods, transmitting by each of the two or more extender devices, uplink transmission data to a cellular network comprises transmitting by a first extender device, of the two or more extender devices, uplink transmission data to a first base station in a first cell of the cellular network; and transmitting by a first extender device, of the two or more extender devices, uplink transmission data to a second base station in a second cell of the cellular network. In some examples, such methods further comprise transmitting, by the consumer device, uplink transmission data to the first base station; and receiving, by the consumer device, downlink transmission data from the first base station, where data received by the consumer device from the cellular network and from the peer-to-to-peer wireless interface is aggregated at the consumer device, and where said transmitting by the consumer device uplink transmission data and receiving by the consumer device downlink transmission data occurs during a same time period as transmitting and receiving data from the two or more extender devices.

Another innovation includes a method of token-based cellular communications, the method comprising storing, by one or more servers of a mobile virtual network operator (MVNO), account data for consumer accounts associated with a respective consumer device, the consumer accounts including a first consumer account associated with a first consumer device, the account data including a number of tokens for each consumer account, storing, by the one or more servers of the MVNO, account data for extender accounts associated with a respective extender device, each extender device configured to communicate on an associated cellular network of a mobile network operator (MNO), the extender accounts including a first extender account associated with a first extender device configured to communicate on a cellular network of a first MNO, the account data including a number of tokens for the each extender account, storing, by the one or more servers of the MVNO, account data for one or more mobile network operator (MNO) accounts, each account associated with one of a set of one or more MNO's that at least includes the first MNO, the account data for each MNO account including information of services of the associated MNO used by the MVNO via an extender device, detecting, by the one or more servers of the MVNO, the first extender device connecting to a cellular network of an associated MNO and service usage information on the MNO by the first extender device for the first consumer device, updating, by the one or more servers of the MVNO and in response to the detecting, an amount of tokens of the first consumer account, updating, by the one or more servers of the MVNO and in response to the detecting, an amount of tokens of the first extender account, and updating, by the one or more servers of the MVNO, account data of the MNO account associated with the first MNO based at least in part on the service usage information of the first MNO by the first extender device for the first consumer device.

Examples of methods of token-based cellular communications can include one or more other features as described herein. In some examples of such methods, updating an amount of tokens of the first extender account includes increasing the number of tokens based at least in part on the service usage information. In some examples of such methods, each of the plurality of MNO accounts are associated with a different MNO. In some examples of such methods, updating an amount of tokens of the first consumer account includes decreasing the number of tokens based at least in part on the service usage information. In some examples such methods further comprise receiving payment for tokens from a user associated with a consumer account, and wherein updating the account data to indicate an increase in the number of tokens in a consumer account is in response to receiving the payment for the tokens. In some examples such methods further comprise receiving a promise for payment of tokens from a user associated with a consumer account, and wherein updating the account data to indicate an increase in the number of tokens in a consumer account is in response to receiving the promise for payment of the tokens.

In some further examples such methods can further comprise receiving, by the one or more servers of the MVNO, one or more tokens from an extender device in exchange for MNO services of the extender device. In some examples such methods further comprise determining, by the one or more servers of the MVNO, a number of tokens needed for services of the first MNO used by the first consumer device via the first extender device. In some examples such methods further comprise determining a number of tokens is based on one or more factors. In some examples of such methods, the one or more factors comprise the amount of data to be communicated by the first extender on the first MNO. In some examples of such methods, the one or more factors comprise the data quality of connection indicated by an achievable data rate. In some examples of such methods, the MVNO is a social media entity. In some examples of such methods, the number of tokens for services is based on the allowing advertisements to be received on the first consumer device. In some examples of such methods, the number of tokens for services is based on allowing data mining of social media information on the first consumer device by the MVNO. In some examples of such methods, the first consumer device is a laptop computer, a tablet computer, an IoT device, or a smart phone. In some examples of such methods, the first consumer device is mobile device. In some examples of such methods, the first consumer device does not include a cellular modem.

Another innovation includes a token-based cellular communication system. Examples of systems include one or more servers of a mobile virtual network operator (MVNO) configured to store account data for consumer accounts associated with a respective consumer device, the account data including a number of tokens for each consumer account; store account data for extender accounts associated with a respective extender device, each extender device configured to communicate on an associated mobile network operator (MNO) cellular network, the account data including a number of tokens for each extender account; receive information indicating a first extender device connected to a cellular network of an associated MNO, indicting a first consumer device connected to the first extender device, and indicting service usage information of the first extender device on the associated MNO; update account information of the first extender device to indicate an additional number of tokens in the account of the first extender device based on the received service usage information; and update account information of the first consumer device to indicate a decrease in the number of tokens in the account of the first consumer device based on the received service usage information. Various examples of such systems can include other features, or different features. In some examples of such systems, the one or more servers of the MVNO are further configured to update account data of an MNO account associated with the first extender device based at least in part on the received service usage information. In some examples of such systems, the one or more servers of the MVNO are further configured to communicate with the first extended device and communicate with the first consumer device to determine, at least in part, the amount of tokens to be used for a connection. In some examples of such systems, where determining the amount of tokens to be used for a connection is based at least in part on a tier of service indicated for the first consumer device.

Another innovation includes a method of token-based cellular communications, method comprising receiving, by the extender device, information indicative of nearby consumer devices; transmitting via messaging, by the extender device, information on decision factors for the consumer device to determine whether to establish a connection; receiving, by an extender device, a request to connect to a consumer device seeking access to a cellular communication network; establishing, by the extender device, communications with the consumer device via a peer-to-peer (P2P) link; receiving, by the extender device, data from the consumer device; transmitting, by the extender device, data associated with the received data to a wireless communications network operated by a mobile network operator (MNO) associated with the extender device; receiving from the wireless communications network, by the extender device, data associated with the consumer device; transmitting the data associated with the consumer device to the consumer device via the P2P link; and receiving, at the extender device, token information indicating a number of tokens added to an account of the extender device, the token information associated with a mobile virtual network operator (MVNO) that the extender device has an account with, the number of tokens being based on service usage information for the extender device on the MNO for transmitting and receiving data associated with the consumer device. Examples of such methods can include one or more other features described herein. In some examples of such methods, the information on decision factors for the consumer device to determine whether to establish a connection comprise status indicative of one or more of battery life and signal strength of the extender device.

Another innovation includes a method of token-based cellular communications, method comprising determining the presence of nearby extender devices; transmitting, by a consumer device, a request to connect to an extender device for access to a cellular communication network; establishing, by the consumer device, communications with the extender device via a peer-to-peer link; transmitting, by the consumer device, data to the extender device for transmission to the cellular communication network; receiving, by the consumer device, data from the extender device via the P2P link, the received data associated with data transmitted by the consumer device; and receiving, at the consumer device, token information indicating a number of tokens subtracted from an account of the consumer device, the token information associated with a mobile virtual network operator (MVNO) that the consumer device has an account with, the number of tokens being based on service usage information of the extender device on the MNO for transmitting and receiving data associated with the consumer device. Various examples of such methods token-based cellular communication can include one or more other features described herein. In some examples of such methods, determining the presence of nearby extender devices comprises receiving, at the consumer device and via the P2P link, signals from at least one extender device. In some examples of such methods, determining the presence of nearby extender devices comprises receiving, at the consumer device from the MVNO, information indicating the presence of nearby extender devices. In some examples of such methods, the information indicating the presence of nearby extender devices comprises location information of extender devices that are within a determined distance of the consumer device. In some examples of such methods, the determined distance is a predetermined distance. In some examples of such methods, the determined distance is a distance selected by the consumer device.

Another innovation includes a method of wireless communication, the method comprising establishing, by a consumer device, a peer-to-peer wireless interface with at least one extender device; transmitting, by the consumer device via the at least one extender device, uplink transmission data to a cellular network; transmitting, by the consumer device, uplink transmission data to a cellular network; receiving, at the consumer device from the at least one extender devices via the peer-to-peer wireless interface, data related to a downlink transmission; and receiving, at the consumer device, downlink transmission data from a cellular network. In some examples of such methods, transmitting, by the consumer device via the at least one extender device, uplink transmission data to a cellular network includes transmitting uplink transmission data from the at least one extender device and a cellular base station using multiple-input and multiple-output (MIMO) communication. In some examples of such methods, transmitting, by the consumer device via the at least one extender device uplink transmission data to a cellular network, includes transmitting uplink transmission data from the consumer device via a first extender device to a cellular base station using multiple-input and multiple-output (MIMO) communication, and transmitting uplink transmission data from the consumer device via a second extender device to a cellular base station using multiple-input and multiple-output (MIMO) communication.

Another innovation is a method of wireless communication, the method comprising sending data from a consumer device for cellular communication to an extender device via a first peer-to-peer wireless link, and sending data from the consumer device to a communication network via another communication link concurrently with sending data via the peer-to-peer wireless link. In some examples of such methods, the another communication link comprises a cellular communication link. In some examples of such methods, the another communication link comprises a second peer-to-peer wireless link between the consumer device and an extender device.

Another innovation is a communication device that includes one or more computer hardware processors in communication with a non-transitory computer storage medium, the one or more computer hardware processors configured to execute the computer-executable instructions stored on the non-transitory storage medium to at least establish a first communication channel with at least one extender device for transmission of data from the consumer device to a first cellular network, and establish a second communication channel for transmission of data from the consumer device to a second cellular network concurrent with establishing the first communication channel. In some examples of such methods, the first cellular network and the second cellular network are operated by the same mobile network operator. In some examples of such devices, the first cellular network and the second cellular network are operated by different mobile network operators. In some examples of such devices, the one or more computer hardware processors are further configured to execute the computer-executable instructions stored on the non-transitory storage medium to at least transmit by the consumer device uplink transmission data via the first communication channel, and transmit by the consumer device uplink transmission data on the second communication channel concurrent with transmitting uplink transmission data via the first communication channel. In some examples of such devices, the one or more computer hardware processors are further configured to execute the computer-executable instructions stored on the non-transitory storage medium to at least receive at the consumer device via the first communication channel data related to a downlink transmission from the first cellular network, and receive at the consumer device via the second communication channel data related to a downlink transmission from the second cellular network concurrent with receiving via the first communication channel data related to a downlink transmission from the first cellular network.

BRIEF DESCRIPTION OF THE DRAWINGS

Embodiments of this disclosure will now be described, by way of non-limiting example, with reference to the accompanying drawings.

DETAILED DESCRIPTION OF CERTAIN EMBODIMENTS

Figure 1:
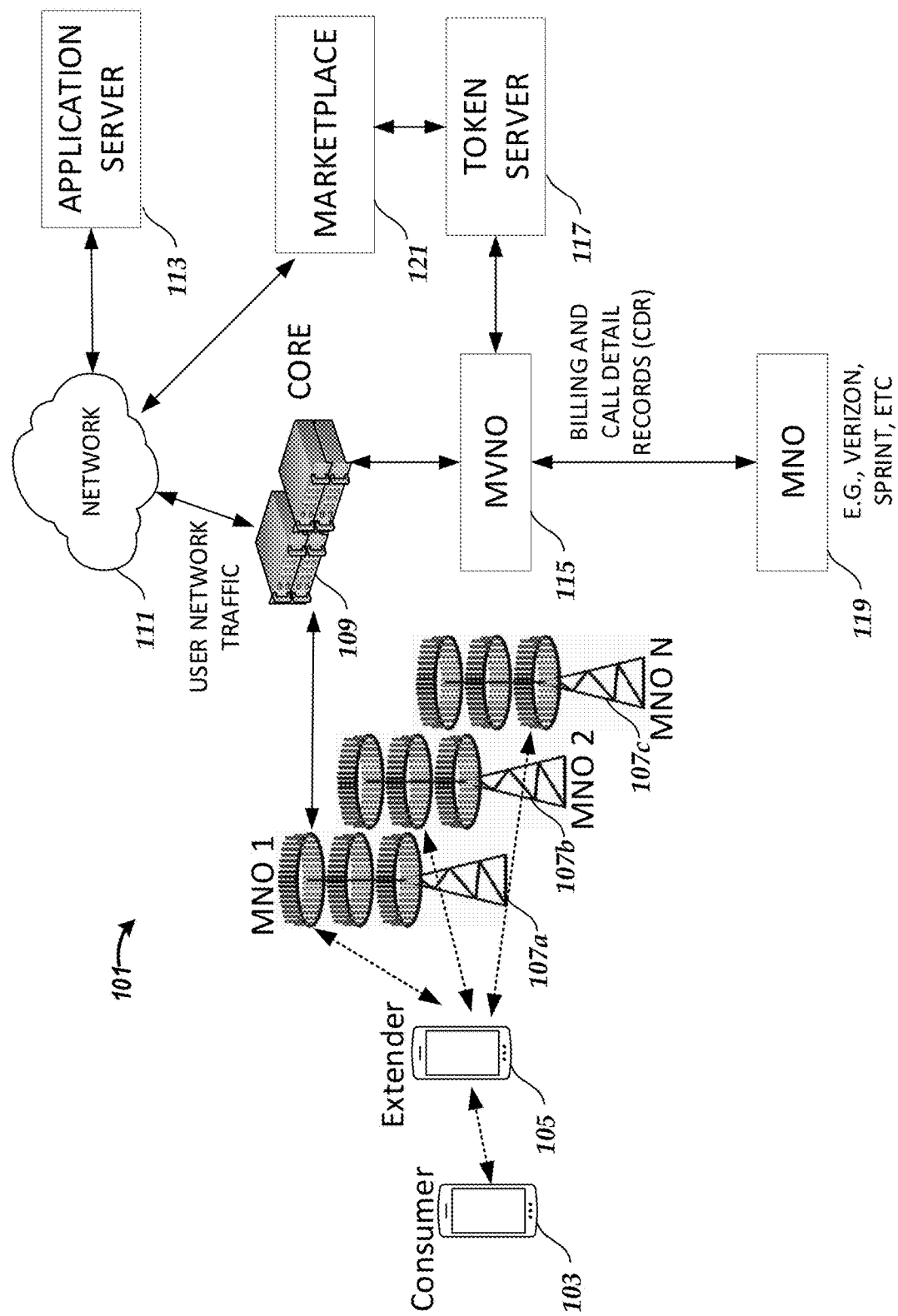
FIG. 1 is a diagram illustrating a wireless network environment in which a device configured for wireless communication ("consumer device") can establish a cellular communication via a peer-to-peer (P2P) link with another device configured for communication over a cellular network ("extender device").

The following description of certain embodiments presents various descriptions of specific embodiments. However, the innovations described herein can be embodied in a multitude of different ways, for example, as defined and covered by the claims. In this description, reference is made to the drawings, where like reference numerals can indicate identical or functionally similar elements. It will be understood that elements illustrated in the figures are not necessarily drawn to scale. Moreover, it will be understood that certain embodiments can include more elements than illustrated in a drawing and/or a subset of the elements illustrated in a drawing. Further, some embodiments can incorporate any suitable combination of features from two or more drawings. The headings provided herein are for convenience only and do not necessarily affect the scope or meaning of the claims.

Introduction

Some aspects of this disclosure relate to increasing the speed of communications between a communication device ("consumer device") and a base station. Some aspects of this disclosure also can relate to a token-based mobile virtual network operator (MVNO) managed system, where a consumer device connects to a cellular carrier network though a peer-to-peer (P2P) link with another device ("extender device") that includes a cellular modem. The P2P wireless topology can be any type of a network architecture set up in order to connect two devices (e.g., a consumer device to an extender device, a consumer device to a first extender device to a second extender device, etc.) a using a wireless radio link. In some examples, the P2P wireless topology includes a Wi-Fi connection. In examples described herein for a Wi-Fi P2P connection, the P2P wireless connection can include two or more Wi-Fi connections (e.g., one at 2.5 GHz and one at 5.0 GHz). In some examples, the wireless device to device connection can be at any of the compliant Wi-Fi IEEE 802.11 standard frequencies. In some examples, the wireless device-to-device connection includes millimeter wave radio waves (mmWave). In some examples, a wireless connection between two devices can be at 28 GHz, 39 GHz, or 60 GHz. In some examples, the P2P wireless topology includes a Bluetooth connection, or another type of device-to-device connection. Some examples of concurrent uses of the non-cellular interfaces for participating in cellular and non-cellular networks are described in U.S. Pat. Nos. 8,743, 758, 9,148,908, 9,451,514, and 9,578,591, each incorporated in their entirety herein. Disclosures include subject matter describing software, devices, networks, and methods to configure non-cellular interfaces the wireless device to establish two or more wireless links in a hybrid cellular network a non-cellular network. For example, the U.S. Pat. No. 9,148,908 disclosure includes description of the wireless device that is able to communicate with a base station in a cell of a cellular network over a non-cellular interface via another wireless device and the cell to the use of multi-hopping. The example described herein may use some similar technology for a consumer device to connect and communicate through an extender device, this disclosure provides multiple additional communication performance improvements. For example, for a consumer device to establish a cellular connection with a base station, and in parallel establish another connection with a bases station (the same base station or a different base station) such that the consumer device is communication in parallel on at least two different communication channels. By enabling wireless devices to communicate with a base station(s) in parallel, the effective coverage area of the cellular network is expanded in the effective capacity of the cellular network is improved. Some of the examples herein may also use such described communication technology in conjunction with improvements related to a token-based mobile virtual network operator (MVNO).

In various embodiments, the consumer device can include a mobile client (an app) that enables the consumer device to discover one or more (nearby) extender devices and establish cellular authentication for the consumer device over a P2P link. The consumer device can establish an authenticated connection with the cellular carrier network via a traffic tunnel through the extender device. The connection can be established with existing cellular offload architecture via network elements, such as an Evolved Packet Data Gateway (ePDG). In certain embodiments, the mobile client can enable the use of social network services to establish a cellular connection via P2P links to a nearby extender device. The mobile client can incentivize the establishment of the data tunnel for the consumer device over the extender device's cellular link by providing the extender device a number of tokens. Managing the use of such tokens can be done by the token-based MVNO system. A consumer device 103 using a cellular communication channel while also using one or more P2P (e.g., Wi-Fi) communication channels can increase the performance of the communications transacted by the consumer device and thus be advantageous for communications where large amount of data need to be communicated, or the urgency of the communication is high.

The consumer device can connect with one extender device via a P2P link, or a consumer device can with two or more extender devices via a P2P link. Each extender device has a cellular modem and can connect to a base station using cellular communication protocol. In embodiments of a token-based MVNO, a consumer device can connect with one extender device via a P2P link, or a consumer device can with two or more extender devices via a P2P link. Each extender device has a cellular modem and can connect to a base station using cellular communication protocol. The cellular protocol can include communication protocols for 3G, 4G or 5G communication. The consumer device and the extender device are configured to establish the P2P link. The configuration of the consumer device and extender device can include an app that facilitates the P2P connection. The app on the extender device can cause the extender device to broadcast its availability to operate as an extender device and receive requests to connect with a consumer device. The app on the consumer device can cause the consumer device to broadcast a request to connect to one or more extender devices by a P2P link. The app on the consumer device and the app on the extender device may negotiate the terms of using the extender device. For example, the number of tokens that will be provided to the extender device for providing services to the consumer device, which may relate to the services that are being requested, the amount of data to be communicated, etc. After the P2P link between the consumer device and the one or more extender device is established, the consumer device can communicate to the cellular network through each of the connected extender devices.

Connecting to a base station through two or more extender devices is likely to provide a performance gain over connecting to a base station through a single extender device. In implementations where a consumer device connects to cellular network through two or more extender devices, there are various ways the P2P link can be established between the consumer device and the extender devices. For example, Wi-Fi single or multi-channel, Bluetooth, etc. Also, there are various ways the two or more extender devices may establish cellular communications with base stations. For example, in an embodiment, the two or more extender devices may communicate with the same base station operated by an MNO. In another embodiment, the two or more extender devices may communicate with base stations operated by different MNO's. In another embodiment, the two or more extender devices may communicate with the same base station but using different channels of the same MNO. In another embodiment, the two or more extender devices may communicate with base stations in different cells. As described further in reference to examples illustrated in FIGS. 6-22, there are many different examples of connections between the consumer device and the two or more extender devices, and examples of connections between the two or more extender devices and the base stations.

A consumer device connected to two or more extender devices can perform aggregation of data that it receives from the two or more extenders. The two or more extender devices can receive downlink transmission data and send the received downlinked data to the consumer device over via a P2P link for aggregation of the consumer device. Aggregation of data can be at the physical layer or a higher layer. Thus, the technology disclosed herein provides a framework of enabling higher peak rate of a consumer device through a P2P link with two or more extender devices for downlink data communications and/or uplink data communications. The mechanisms of achieving a higher peak data rate can be achieved using joint processing at the physical layer and/or aggregation from an application perspective.

As one of ordinary skill in the art will appreciate, features illustrated in FIGS. 6-12 may be combined to form other possible examples of connecting a consumer device to a cellular network through two or more extender devices. All of the examples illustrated in in the Figures can be implemented in a token-based MVNO, an example of which described in reference to FIG. 1.

A token-based MVNO system may provide better access to cellular services by, for example, increasing the number of locations a consumer may assess cellular networks, improving processor power available for a consumer's mobile device, and increasing access to faster cellular communications. In an embodiment, an MVNO buys service from a mobile network operator (MNO) at wholesale pricing. When a consumer device uses the extender device's connection/service and cellular enabled equipment, the MVNO detects such use and pays a MNO associated with the extender device's MNO the fees associated with the connection/services. The MVNO sells tokens to consumer devices who use them to pay for service. In addition, the MVNO provides tokens to extender devices in exchange for providing services based on the services provided (for example, amount of data communicated, geographic location, performance capabilities of the extender device, time of day, and/or the amount of time operating as an extender device, and the like). The MVNO can exchange information with the consumer devices and extender devices, through an app running on all of the consumer devices and the extender devices operating in the system. As cellular services are used by the consumer device connected to an extender device, the app provides usage information of the services to the MVNO. The MVNO updates accounts of the consumer devices and extender devices in accordance with the received usage information, for example, decreasing a number of tokens in consumer devices' accounts based on the usage, and increasing a number of tokens in extender devices' accounts based on the usage.

A user puts/activates an app (e.g., supplied by the MVNO) on a mobile computer/device (e.g., desktop, tablet, laptop, or phone) to operate as a consumer device. A user puts/activates an app (e.g., supplied by the MVNO) on a mobile computer/device (e.g., desktop, tablet, laptop, or phone) to operate as an extender device. The app, when on the consumer device and the extender device, is configured to allow a consumer device to access the extender device's MNO via a P2P link between the consumer device and the extender device. The app also tracks the connection/services used and provides information to the MVNO to manage the system, and handle the accounting for token transactions and MNO payments. For example, the MVNO decreases the number of tokens in the account of the consumer device and increases the number of tokens in the account of the extender device as a result of the consumer device using the extender device to connect to an MNO.

The consumer device buys tokens directly from the MVNO, or from the marketplace. For connections/services used, the consumer device pays with tokens for the particular connections and cellular services used, as tracked by the app. The amount of tokens a consumer device pays can depend on one or more factors. (for example, geographic location, number of times connected to an extender device, amount of data communicated, time spent connected to an extender, performance of the extender device the consumer device is connected with (i.e., pay higher for connections with higher performance extender devices) and the like). In addition, the amount of tokens paid by a consumer device/received by an extender device can be controlled by app dynamic pricing.

The token-based MVNO is configured to operate a token marketplace that can include a loyalty token-based program for its subscribers. In the marketplace, tokens may be bought, sold, and/or exchanged for other virtual currency, goods, services and/or cash. For example, tokens can be exchanged for frequent flyer miles, hotel points, car-rental points, restaurant vouchers, other virtual currency related to goods and services. In operation, the MVNO collects transaction fees on the marketplace transactions, manages the connections/services interactions between consumer devices and extender devices, and makes margin on selling the tokens (e.g., to the consumer devices) and operating the loyalty program.

For a consumer (subscriber, owner/operator of a consumer device) there can be a different levels of service that they can subscribe to operate a consumer device. The cost can relate to amounts of data that are used, and/or speed of the data being used, or other factors. For example you could have different tiers, e.g., gold, platinum, silver, each tier offering a different level of service. In an example of a use case, in a photo application on the consumer device, there may be pictures using that have not been backed up (e.g., saved to the cloud). The photo application may identify that certain pictures have not been backed up, and an interface may provide a query to a user asking if the identified pictures should be backed up. Although the user may want to back up the pictures, it may not be advantageous for the consumer device to back up the pictures using cellular communication because, for example, the amount of cellular data needed to back up the pictures is high. The app may wait until the consumer device has certain number of tokens until it asks the user if the pictures should be backed up using token-based communication through an extender device. Then the token-based communication can be used to back up the pictures, rather than the user's own paid for cellular data. In another example of a photo app, the photo app may be configured to provide an option of uploading data using Wi-Fi, or using cellular data, or using token-based cellular based communications using an extender device. A user can choose any of these options. In an embodiment, a user may prioritize which option to use, e.g., based on availability. In other words, the application will wait until you get to a Wi-Fi network to upload the pictures and then you don't have to pay for cellular service, or it can upload them right away if you not in a Wi-Fi network area but it will cost you more.

In various embodiments, there can be more selections. For example, whenever my tokens allow (i.e., if the consumer device has enough tokens), use tokens only, when a certain number of tokens are needed, or any other type of criteria. For example, using Wi-Fi first, then use tokens, then use cell data.

In an embodiment, the consumer device can negotiate the token amount that the consumer device will pay to the extender device for different levels of service (e.g., amounts of data that are used, and/or speed of the data transmission, where the number of tokens increases as performance of the services increases. In an embodiment, a consumer device can negotiate with the token-based MVNO the token amount that the consumer device will pay to the extender device. Additionally, or alternatively, in an embodiment, a consumer device can negotiate with the extender device the token amount that the consumer device will pay to the extender device. A negotiation process relating to the number of tokens for services between a consumer device and an extender device can be performed by an app on the consumer device and a corresponding app on the extender device. In an embodiment, communication for the negotiation can be done on a P2P link between the consumer device and the extender device. A negotiation process between a consumer device and the MVNO can be performed by an app on the consumer device and application software on one or more servers of the MVNO. In an embodiment, communication for the negotiation can be done via any communication channel between the MVNO and the consumer device (e.g., Wi-Fi, cellular, etc.).

The extender device can be any computer (e.g., desktop, tablet, laptop, or phone). The extender device earns tokens by allowing a consumer device to connect and communicate with a cellular network via the extender device's cellular modem. The extender device may redeem tokens for money, virtual currency, etc. If extender devices are subscribers of the MVNO, then they can directly monetize their tokens for their own cellular service. The marketplace allows extender devices to monetize their tokens. Such embodiments of a token-based MVNO may work best with a broad based distribution of the app in order for this to begin to scale. Accordingly, in an embodiment, the app functionality may be included in social media software (e.g., app) or software the is originally installed on a computer (e.g., along with the Microsoft's OS, Apple's iOS, etc.). In other implementations, firmware having the token-based functionality may be incorporated in whatever IoT devices that are being used in a network environment. In some implementations, the consumer device (that is, the consumer equipment) includes a cellular modem. However, in some implementations, the consumer device does not include a cellular modem. For example, lower cost IoT devices.

There are laptop and tablet users who will want to use the token-based communication service frequently, and they can sign up with the MVNO. Because there are users who will pay only on an infrequent basis, they may would prefer to pay with tokens. Thus, tokens do have value for cellular service.

Illustrative Embodiments

Aspects of this disclosure relate to wireless communications methods and systems that facilitate a consumer device, to communicate with a cellular carrier network via an extender device that includes a cellular modem. The consumer device may or may not include a cellular mode. The consumer device can include a mobile client that enables the consumer device to discover one or more (nearby) extender devices in proximity to the consumer device and to establish cellular authentication over a P2P link. The consumer device can establish an authenticated connection with the cellular carrier network via a traffic tunnel through the extender device. The connection can be established with existing cellular offload architecture via network elements, such as an Evolved Packet Data Gateway (ePDG). In certain embodiments, the mobile client can enable the use of social network services to establish a cellular connection via P2P links to a nearby extender device. The mobile client can enable the extender device to be incentivized to establish the data tunnel for low-cost device. Accordingly, communication devices that either do not have a cellular modem or have limited or low capabilities of receiving cellular operator serviced data from and sending data to a cellular network operator are disclosed.

FIG. 1 is a diagram illustrating a token-based wireless network environment 101 in which a consumer equipment ("consumer device") 103 establishes a cellular communication via a P2P link with a nearby extender equipment ("extender device") 105, according to an embodiment. The cellular communication can include a phone call. Alternatively, or additionally, the cellular communication can include any other suitable data exchange. In an embodiment, the consumer device 103 does not include a cellular modem. For example, the consumer device 103 may be only configured to wirelessly exchange information over a non-cellular link. In typical embodiments, the consumer device 103 includes a cellular modem.

The consumer device 103 can wirelessly exchange information over the P2P link. The P2P link with an extender device 105 can be established with Bluetooth, Wi-Fi, cellular protocol, or any other suitable non-cellular P2P technology. The extender device 105 includes a cellular modem. In an embodiment, extender device 105 can operate as a cellular communication device for communications for the user of the extender device 105, or it can operate in conjunction with a consumer device 103. In an embodiment, the extender device 105 only operates as an extender device 105 to provide cellular communications to a consumer device 103.

The extender device 105 is configured to wirelessly transmit cellular data associated with the consumer device 103 to a MNO base station 107. The extender device 105 can wirelessly receive cellular data associated with the consumer device 103 from the base station 107 via one or more antennas of the extender device 105. In various embodiments, the extender device 105 is configured to wirelessly transmit cellular data associated with the consumer device 103 to more than one MNO's, e.g., to more than one MNO base stations 107a-c, or to more than one antennas on a base station 107, each of the antennas being associated with a different MNO.

The extender device 105 is configured to broadcast its availability as an extender device through which a consumer device 103 can connect to a cellular service provider. The consumer device 103 is configured to discover at least on nearby extender device 105. In certain embodiments, the extender device 105 can enable a consumer device 103 associated with a social network graph (e.g., and associated with the extender device) and/or an operator assigned list to connect to the extender device 105 to obtain cellular service via the extender device 105.

The consumer device 103 can include a cellular subscription module storing cellular subscription information associated with the consumer device 103. The cellular subscription module may store sales subscription information of a MVNO 115. The cellular subscription module may store sales subscription information of a MNO 119. Accordingly, the consumer device 103 can maintain its own cellular credential with a MNO 119, and have an additional credential with a MVNO 115. In an embodiment, the consumer device 103 only maintains a credential with a MVNO 115. Each cellular credential can have subscription information can identify one or more of a unique phone number associated with the consumer device 103, another unique identifier of the consumer device 103, an account associated with the consumer device 103, a particular user or group of users associated with the consumer device 103, etc. These cellular credential associated with the MVNO can also have information relating to a number of tokens the consumer device 103 has. In certain instances, the cellular subscription information can indicate that the consumer device 103 is not configured to wirelessly transmit information over a cellular link.

In some instances, the extender device 105 can include a processor configured to detect that the consumer device 103 stores cellular subscription information for the consumer device 103 and is only configured to wirelessly transmit over non-cellular links. A processor of the extender device 105 can determine that the consumer device 103 stores cellular subscription information and does not include a cellular modem based on any suitable information provided by the consumer device 103. In some instances, the extender device 105 can include a processor configured to detect that the consumer device 103 is in a selectable mode that indicates the consumer device 103 seeks to wirelessly transmit over a non-cellular link to an extender device 105 for further transmission to a cellular network. The extender device 105 can take action in response to detecting that the consumer device 103 has cellular subscription information and seeks to wirelessly transmit over non-cellular links to an extender device 105 for further transmission to a cellular network. For example, the action of the extender device 105 can include establishing a P2P link with the consumer device 103. Alternatively, or additionally, the action of the extender device 105 can include using its cellular modem to transmit data associated with the consumer device 103 for transmission to the base station 107 via the one or more antennas of the extender device 105. In at least some such cases, the action of the extender device 105 can also include using its cellular modem to demodulate received data associated with the consumer device 103 that is received from the base station 107 via the one or more antennas of the extender device 105 and communicate the received data to the consumer device 103 via the P2P link.

In an embodiment, the consumer device 103 can establish a P2P link with the extender device for the purposes of using the processing power on the extender device to perform processing for the consumer device 103.

A variety of user equipment (e.g., computers, devices) can be implemented without a cellular modem, each of which being generally referred to as a consumer device 103 in the context of the token-based wireless communication network 101 illustrated in FIG. 1. Such user equipment (UE) can include any suitable wireless communication device used by a user such as a mobile phone, a mobile computing device, a wearable computing device such as a smart watch or an ear piece or smart glasses, a networked appliance (e.g., a consumer networked appliance or industrial plant equipment), an industrial robot with connectivity, a camera, a speaker, a vehicle, or the like. In some implementations, a UE without a cellular modem can be a sensor or other networked device configured to collect data and wirelessly provide the data to another device (e.g., server), which can be connected to a core network such as the Internet. Accordingly, a UE without a cellular modem can be an Internet of Things (IoT) device in certain applications.

In the token-based wireless network environment 101, cellular connectivity can be established by the consumer device 103 via the extender device 105. The extender device 105 can receive incentives for its assistance with communicating data associated with the consumer device 103. The incentives can be in the form of one or more digital tokens.

Still referring to FIG. 1, the illustrated token-based wireless network environment 101 includes core servers 109 that receive data from the one or more base stations 107. The core servers 109 can communicate user network traffic to a network 111 which is then communicated to an application server 113 that executes a process requested by the consumer device 103.

The core servers 109 also can communicate a portion of data it receives to a MVNO 115. Generally, the MVNO 115 keeps track of how many minutes are used, data communicated, by a consumer device 103 and pays the extender devices 105 MNO. In an embodiment, the user of extender device 105 sees no transactions related to the token-based MVNO 115 on their MNO 119 account, as the transactions are monitored, tracked and paid for by the MVNO 115. The MVNO 115 includes one or more servers that are configured to store subscription and account information for consumer devices 103 and extender devices 105. The subscription and account information can include any information associated with the consumer devices 103 and extender devices 105 that facilitates them to operate in the token-based network 101. For example, the subscription and account information for a consumer device 103 may include identification information, a number of tokens the consumer device 103 has, and/or social graph information. The subscription and account information for an extender device 105 may include identification information, a number of tokens the consumer device 103 has, social graph information, and one or more MNO's associated with and extender device 105.

In an embodiment, the MVNO 115 includes one or more servers that are configured to store account data for consumer accounts associated with a respective consumer, the consumer accounts including a first consumer account associated with a first consumer device, the account data including a number of tokens for each consumer account. In an embodiment, the MVNO 115 includes one or more servers that are also configured to store account data for extender accounts associated with a respective extender device, each extender device configured to communicate on a cellular network of a MNO, the extender device accounts including a first extender account associated with a first extender device configured to communicate on a cellular network of a first MNO, the account data including a number of tokens for each extender account. In an embodiment, the MVNO 115 includes one or more servers are also configured to store account data for one or more MNO accounts, each account associated with one of a set of one or more MNO's that at least includes the first MNO, the account data for each MNO account including information of services of the associated MNO used by the MVNO via an extender device.

In an embodiment, the MVNO 115 includes one or more servers that are configured to detect a first consumer device 103 connecting to a cellular network of an associated first MNO via a peer-to-peer link with a first extender device 105, and service usage information of the first MNO by the first consumer device 103 via first extender device. The MVNO 115 further includes one or more servers that are configured to update, in response to the detecting, an amount of tokens of the first account associated with the first consumer device 103. The MVNO 115 further includes one or more servers that are configured to update, in response to the detecting, an amount of tokens of the second account associated with the first extender device 105. The MVNO 115 further includes one or more servers that are configured to update, account data of the MNO account associated with the first MNO based at least in part on the service usage information of the first MNO by the first extender device 105.

The token-based wireless network environment 101 also includes a token server 117 in communication with the MVNO 115. The token server 117 includes one or more servers that can be configured with account information for any consumer device 103, extender device 106, or other device or entity that is using the tokens of the system. For example, using the tokens in the marketplace 121. The account information can include a number of tokens that is associated with each account, billing information for the account, a user profile, device and personal information associate with account, and the like.

The token server 117 can communicate with a marketplace 121 operated to buy, sell and exchange tokens. The marketplace 121 can communicate with numerous computers associated with people and entities via the network 111. The marketplace 121 can include one or more servers that are configured to buy and sell tokens, and/or exchange tokens for other items, for example, digital items of value. For example, in an embodiment the items that can be exchanged for tokens may include one or more of frequent flyer miles, or any airline, hotel miles (or points), restaurant points, travel vouchers, restaurant vouchers, or entertainment vouchers (for example, for movies, shows, excursions, etc.). In another example, the items that can be exchanged for a tokens related to groceries, clothing, jewelry, travel, or any other type of goods, or services. The token server 117 also can communicate with the MVNO 115 to buy, sell, and/or exchange tokens.

Based on the services the extender device 105 provides to the consumer device 103, the consumer device 103 transfers a certain number of tokens to the extender device 105. In an embodiment, corresponding apps running on the consumer device 103 and the extender device 105 monitor the services and provide accounting for the transfer of tokens from the consumer device 103 to the extender device 105. In an embodiment, the MVNO 115 can receive information from the cellular communications transmitted by the extender device 105, monitor the services provided by the extender device 105, and provide accounting for the service provided by the extender device 105 including transferring tokens to the extender device 105. The MVNO 115 can receive information from the cellular communications transmitted by the extender device 105, monitor the services provided to the consumer device 103, and provide accounting for the service provided to the consumer device 103 including transferring tokens from the consumer device 103.

The consumer device 103 can buy tokens from the MVNO 115, for example, based on a service subscription established between the consumer device 103 and the MVNO 115. The consumer device 103 can also buy tokens from the marketplace 121. extender device 105 may exchange tokens (received from providing services) at the marketplace 121, for money, goods, services (including cellular services), and/or other virtual currency. The MVNO 115 can also buy tokens from the marketplace 121. For example, the MVNO 115 can buy tokens from the marketplace 121 via the token server 117.

The MVNO 115 can pay the MNO 119 for cellular services provided by the MNO 119 for the consumer device 103 (i.e., via the extender device 105). The MVNO 115 can buy cellular services from the MNO 119 in a large quantity at reduced or "wholesale" prices. The MVNO 119 can provide the operational means for the consumer device 103 to receive cellular services, which the consumer device 103 pays for in terms of tokens. When tokens are exchanged for cash, goods, or services, they can be redeemed for a retail rate. The tokens are priced such that the MVNO 115 can pay the MNO 119 for the cellular services, operate the system and make a marginal profit for providing such services to the consumer device 103. The MVNO 115 can also operate the marketplace 121, thus generating revenue through the coordination of the exchange of tokens for cash, goods, and/or services.

Figure 2:
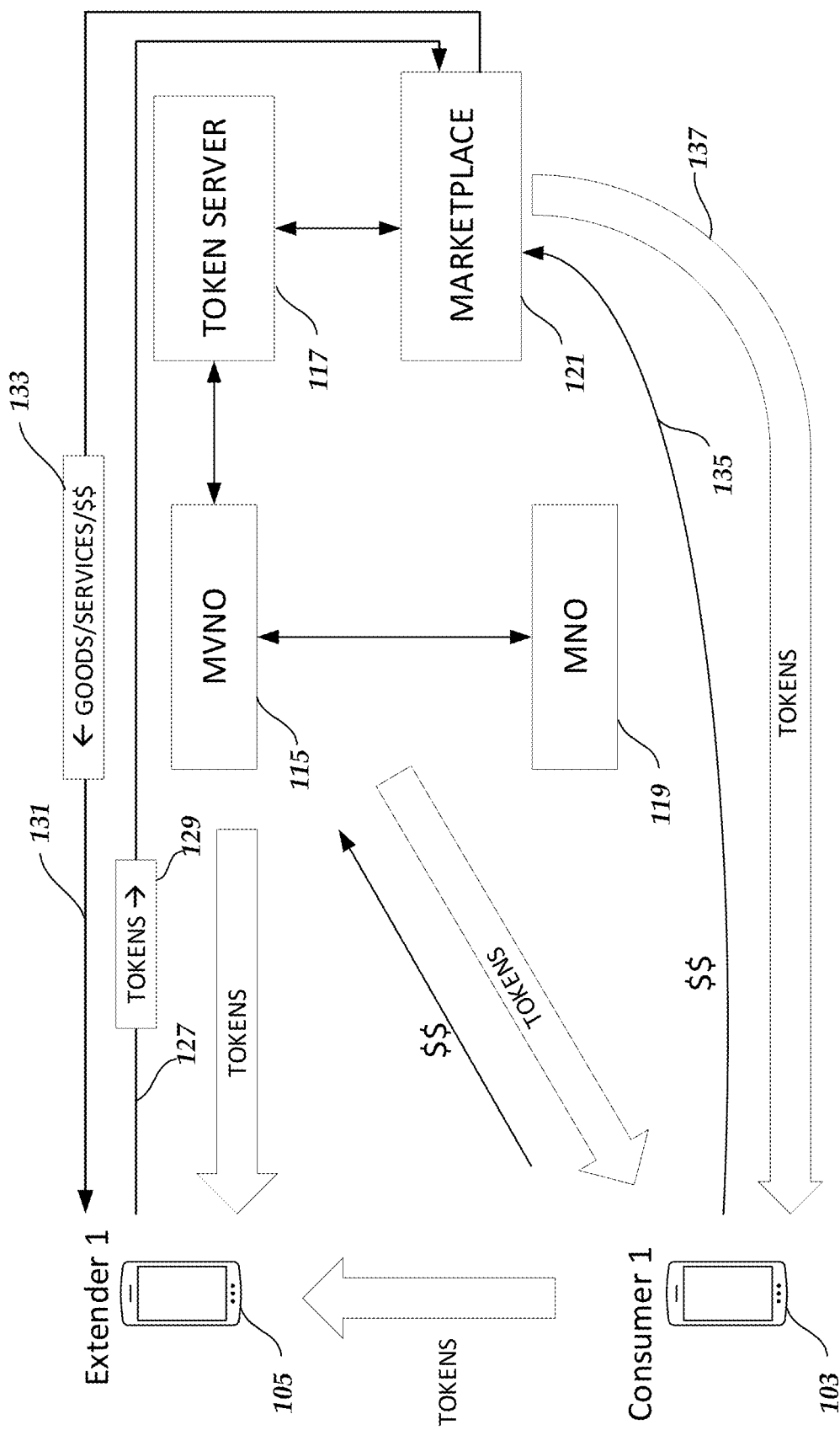
FIG. 2 is a block diagram depicting certain transactions that can take place related to a token-base marketplace.

FIG. 2 is a block diagram depicting certain transactions that can take place related to a token-base marketplace 121. Similar to FIG. 1, FIG. 2 shows a consumer device 103 in communication with an extender device 105. Based on the services the extender device 105 provides to the consumer device 103, the consumer device 103 transfers a certain number of tokens to the extender device 105. The information relating to the transfer of tokens from the consumer device 103 to the extender device 105 can be done using any type of a communication channel directly (e.g., Bluetooth, Wi-Fi, and the like), or indirectly (e.g., via the MVNO 115), between the devices. In an embodiment, corresponding apps running on the consumer device 103 and the extender device 105 monitor the services, and in conjunction with the MVNO, provide accounting for the transfer of tokens from the consumer device 103 to the extender device 105. In an embodiment, the MVNO 115 can receive information from the cellular communications transmitted by the extender device 105, monitor the services provided by the extender device 105, and provide accounting for the service provided by the extender device 105 including transferring tokens to the extender device 105. The MVNO 115 can receive information from the cellular communications transmitted by the extender device 105. The MVNO 115 can monitor the services provided to the consumer device 103. The MVNO 115 can provide accounting for the service provided to the consumer device 103 including transferring tokens from the consumer device 103.

The consumer device 103 can buy tokens from the MVNO 115, for example, based on a service subscription established between the consumer device 103 and the MVNO 115. The consumer device 103 can buy tokens from the marketplace 121. The extender device 105 may exchange tokens (received from providing services) at the marketplace 121, for money, goods, services (including cellular services), and/or other virtual currency. For example, the extender device 105 can provide one or more tokens (e.g., information indicative of conveying one or more tokens) to the marketplace 121 via a communication channel 127. In exchange, the marketplace 121 can provide indicia of certain money, goods, services and the like 133 to the extender device 105 via a communication channel 131. In some embodiments, the MVNO 115 can receive tokens from the marketplace 121, for example, via the token server 117.

The MVNO 115 pays the MNO 119 for cellular services provided by the MNO 119 for the consumer device 103 (i.e., via the extender device 105). The MVNO 115 buys cellular services from the MNO 119 in a large quantity at reduced or "wholesale" prices. The MVNO 119 provides the operational means for the consumer device 103 to receive cellular services, which the consumer device 103 pays for in terms of tokens. When tokens are exchanged for cash, goods, or services, they are redeemed a "retail" rate. The tokens are priced such that the MVNO 115 can pay the MNO 119 for the cellular services, operate the system and make a marginal profit for providing services to the consumer device 103. The MVNO 115 may also operate the marketplace 121, thus generating revenue through the coordination of the exchange of tokens for cash, goods, and/or services.

Figure 3A:
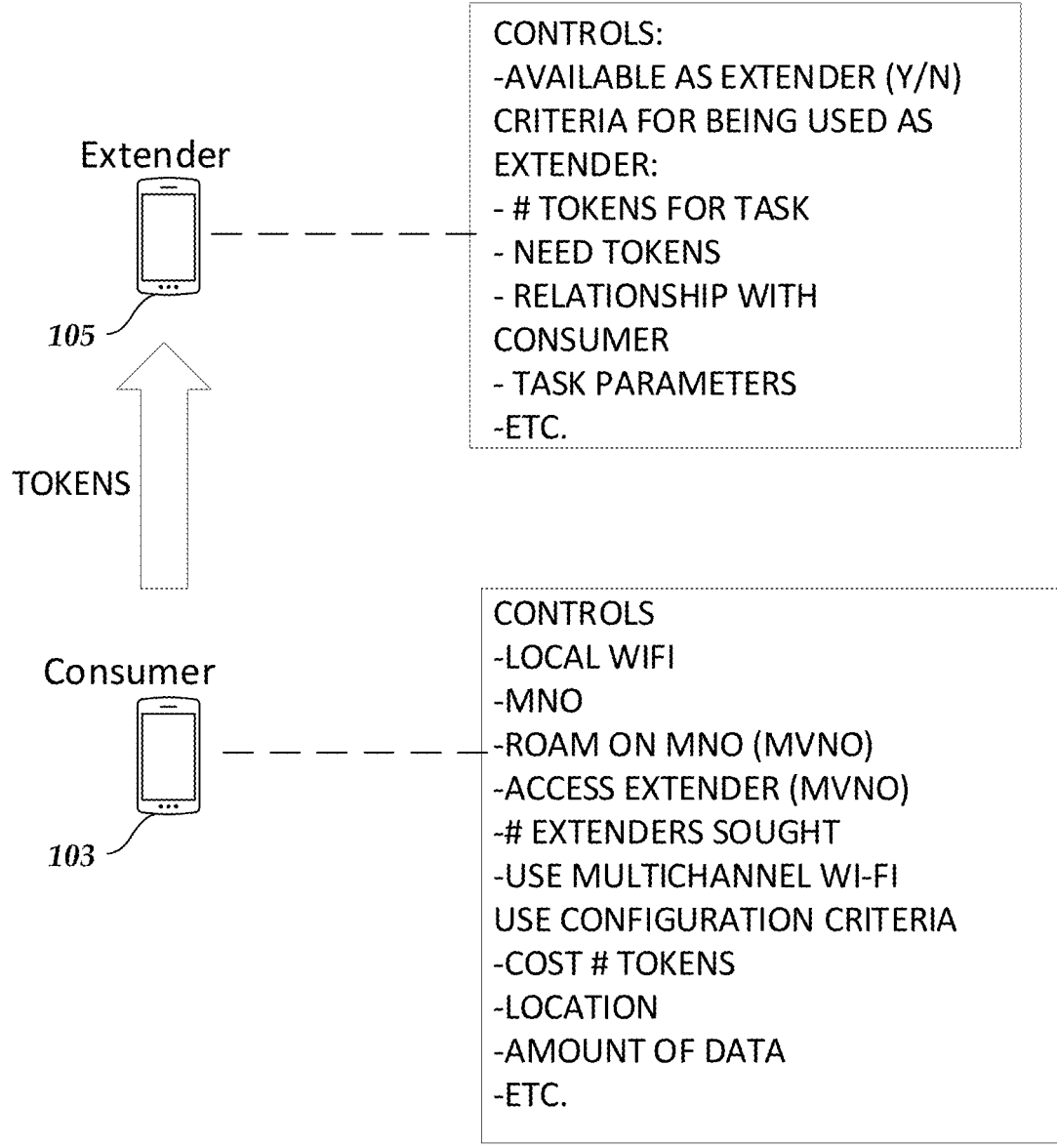
FIG. 3A is diagram illustrating certain functionality of an extender device and a consumer device, according to various embodiments.

FIG. 3A is diagram illustrating certain functionality of a consumer device 103 and an extender device 105, according to various embodiments. An app operating on the consumer device 103 can have various controls that govern the use of token-based communications. The controls may be displayed on an interface of the consumer device 103. The app may be activated or deactivated by a user. The app may be activated or deactivated based on an input received from a user interface. When the consumer device 103 activates the app for communications, the app may allow a user to determine how the communications will be made. For example, using Wi-Fi if it is available, using cellular services via an MNO associated with the consumer device 103, to "roam" via an MNO associated with the consumer device 103 and a non-token based MVNO associated with the MNO, or to access an extender device 105 using a token-based communication service. In an embodiment, these options may be controlled by the user, e.g., using an interface on the consumer device 103. In an embodiment, options may be automatically selected by the app based on certain parameters. For example, options for communication by the consumer device 103 may be selected by the app based on previously determined user input. In an embodiment, options may be selected by the app based on one or more of the availability of the communication services, the battery charge state of the consumer device 103, the number of tokens the consumer device 103 has in its account, that the cost of each communication option, the user's location, the amount of data to communicate, the urgency of the communication, and/or other parameters.

In addition, the selection of a particular extender device 105 for a communication may be based on certain parameters. For example, the signal strength of the extender device may determine whether the extender device will be used by the consumer device. The app can control how the consumer device 103 will connect to a cellular network. The controls can additionally or alternatively include using Wi-Fi if it is available. The controls can additionally or alternatively include using cellular services via an MNO associated with the consumer device 103 if it is available. The controls can additionally or alternatively include using the consumer device 103 in a "roam" mode via an MNO associated with the consumer device 103, using a non-token based MVNO associated with the MNO. The controls can additionally or alternatively include to seek to access to one or more extender devices 105 using a token-based communication service. When the consumer device 103 seeks two or more extender devices 105 to connect with, the controls can include identifying how many extender devices 105 to seek (e.g., two or more).

The app can also be configured to control the consumer device 103 to communicate with extender devices on a single Wi-Fi channel, or to use multiple Wi-Fi channels (e.g., 2.4 GHz and 5.0 GHz). In an embodiment, these options may be controlled by the user, e.g., using an interface of the app configured on the consumer device 103. In an embodiment, the options can be automatically selected by the app based on certain parameters. For example, the options for communication by the consumer device 103 can be selected by the app based on previously determined user input. Additionally or alternatively, the options can be selected by the app based on one or more of the availability of the communication services, the battery charge state of the consumer device 103, the number of tokens the consumer device 103 has in its account, the cost of each communication option, the user's location, the amount of data to communicate, the urgency of the communication, and/or other parameters. In addition, the selection of a particular extender device 105 for a communication can be based on certain parameters. For example, the parameters can include the number of tokens the extender device 105 will receive for the communication, the processor power of the extender device 105, an estimated length of time for the communication, the relationship of the consumer device 103 to the extender device 105 (e.g., the social graph between the consumer device 103 and the extender device 105), the battery charge state of the extender device 105, and/or one or more other parameters.

Some of the above-described options are illustrated in Table 1 below:

TABLE 1

| Device | MNO Subscriber | MVNO Subscriber | Use Mode |
| --- | --- | --- | --- |
| consumer | No | No | local Wi-Fi |
| consumer | No | Yes | (1) Roam on MNO<br>(2) access using extender,<br>(3) Wi-Fi provided by MVNO<br>(4) Other available "free" Wi-Fi |
| consumer | Yes | No | (1) traffic through MNO (today)<br>(2) Wi-Fi |
| consumer | Yes | Yes | Priority User/Auto Selected<br>(1) extender device<br>(2) MVNO -> MNO<br>(3) MNO direct<br>(4) Local Wi-Fi<br>(5) MNO_1, MNO_2 . . . MNO_N |

The different modes in Table 1 could be prioritized. For example, the priority may be Wi-Fi, extender device, MNO direct, MVNO→MNO (roaming). The priority of the modes, or generally the selection of one of the modes may be based on a number of criteria: Person's plan, monthly data bucket full, performance needed, bandwidth needed, preferred MNO, signal strength.

In an embodiment, in certain instances, an extender device 105 can permit access to consumer devices 103 associated with a social network connections of a user of the extender device 105. For example, an extender device 105 can broadcast its availability as an extender device 105 to consumer devices 103 associated with social network connections of the user of the extender device 105. As another example, an extender device 105 can broadcast its availability as an extender device 105 to consumer devices 103 associated with a social network graph (e.g., including first level social network connections, including first and second level social network connections, etc.) associated with the user of the extender device 105. To implement permission based access to the extender device 105 based on social networks connections and/or a social network graph, a mobile client on the extender device 105 can have access to and/or be integrated with a social network client.

Figure 3B:
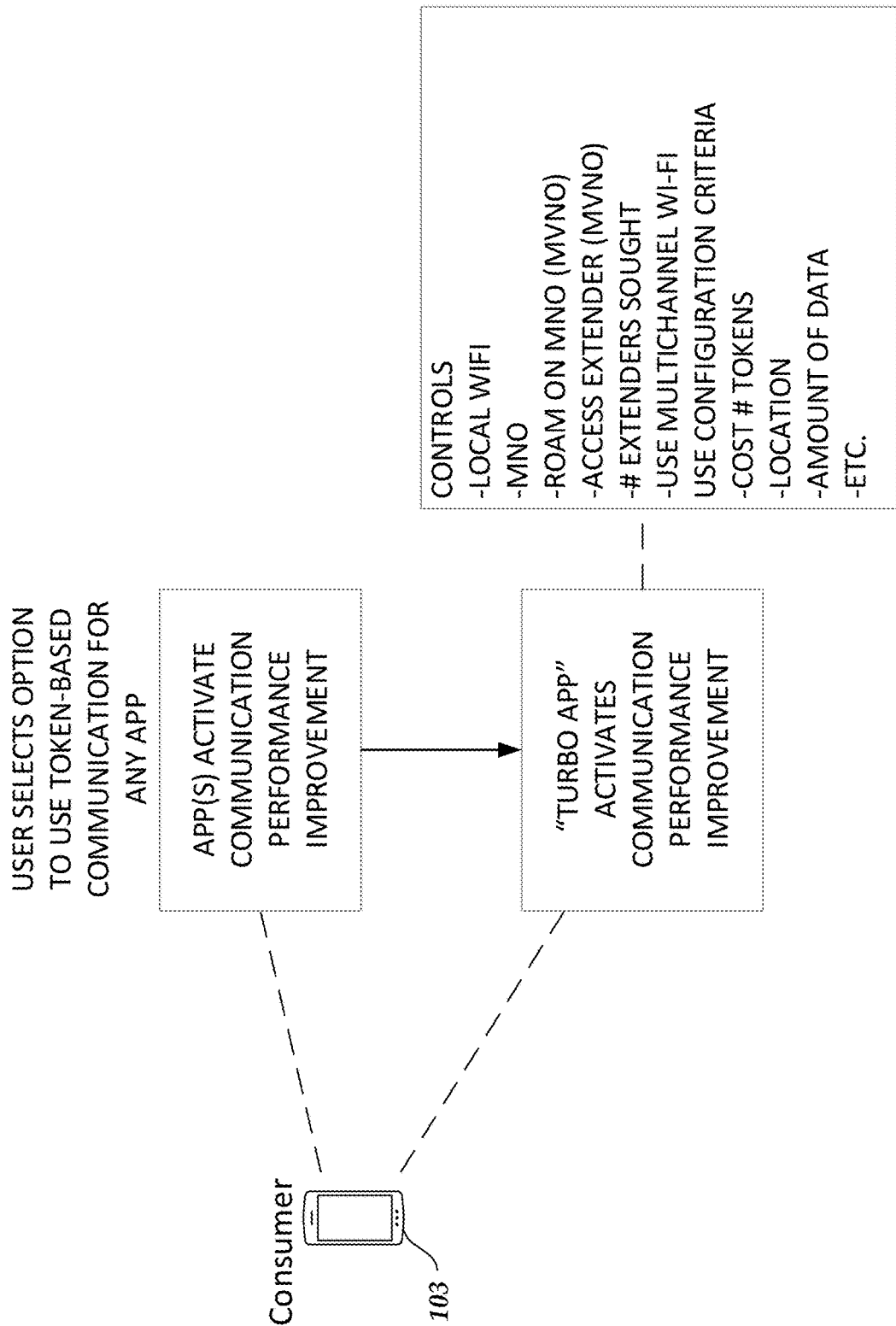
FIG. 3B is block diagram illustrating an app on a consumer device and functionality also on the consumer device (e.g., a second app) that operates to determine how to increase the communication performance of the consumer device, for example, by connecting with one or more extender devices through a P2P connection and/or connecting to a base station with a cellular connection, according to various embodiments.

FIG. 3B is block diagram illustrating an example of a configuration of a variety of applications (apps) on a consumer device, and functionality also on the consumer device (e.g., a second app referred to as "turbo app") that operates to increase the communication performance of the consumer device. The communication performance may be increased, for example, by connecting with one or more extender devices through a P2P connection and/or connecting to a base station with a cellular connection so as to establish at least two parallel communication channels from a consumer device to one or more base stations.

In this example the consumer device 103 is configured to operate a plurality of apps that are designed to perform a number of operations of any type. For example, one or more of the plurality of apps can perform operations relating to social media (e.g., Facebook, Instagram, Twitter, and the like), streaming services (e.g., YouTube, Spotify, FaceTime, videoconferencing, and the like), operations related to a company and accessing services provided by the company, games, and any other functionality provided by apps on a mobile device. Based on the communication requirements of the app, some of the apps may need to communicate a lot of data (e.g., video-streaming) where other apps may need to only communicate a small amount of data but is very important that the data be communicated as quickly as possible (for example, a 911 communication, or other communications involving emergency situations or time critical communications). Any of these apps can include the functionality to activate the app to use the turbo app functionality. For example, as an option in the app a "switch" can be included on a user interface to optionally activate the turbo app functionality. When the user selects from a user interface of the app to use the turbo app (or for some apps it may be the default mode), communications from the app are routed through the turbo app in the turbo app (e.g., using an API) and the turbo app handles all the functionality needed to increase the communication performance of the app for example, the turbo app can determine which communication channels to use the fastest communication based on the amount of data that needs to be communicated, the criticality of the communication, the user's location, the communication channels are available, the cost of the communication, and the like. In this way, any app that is simply configured to communicate with the turbo app can utilize the increase communication performance available by the functionality described herein the can be associated with the turbo app.

Figure 3C:
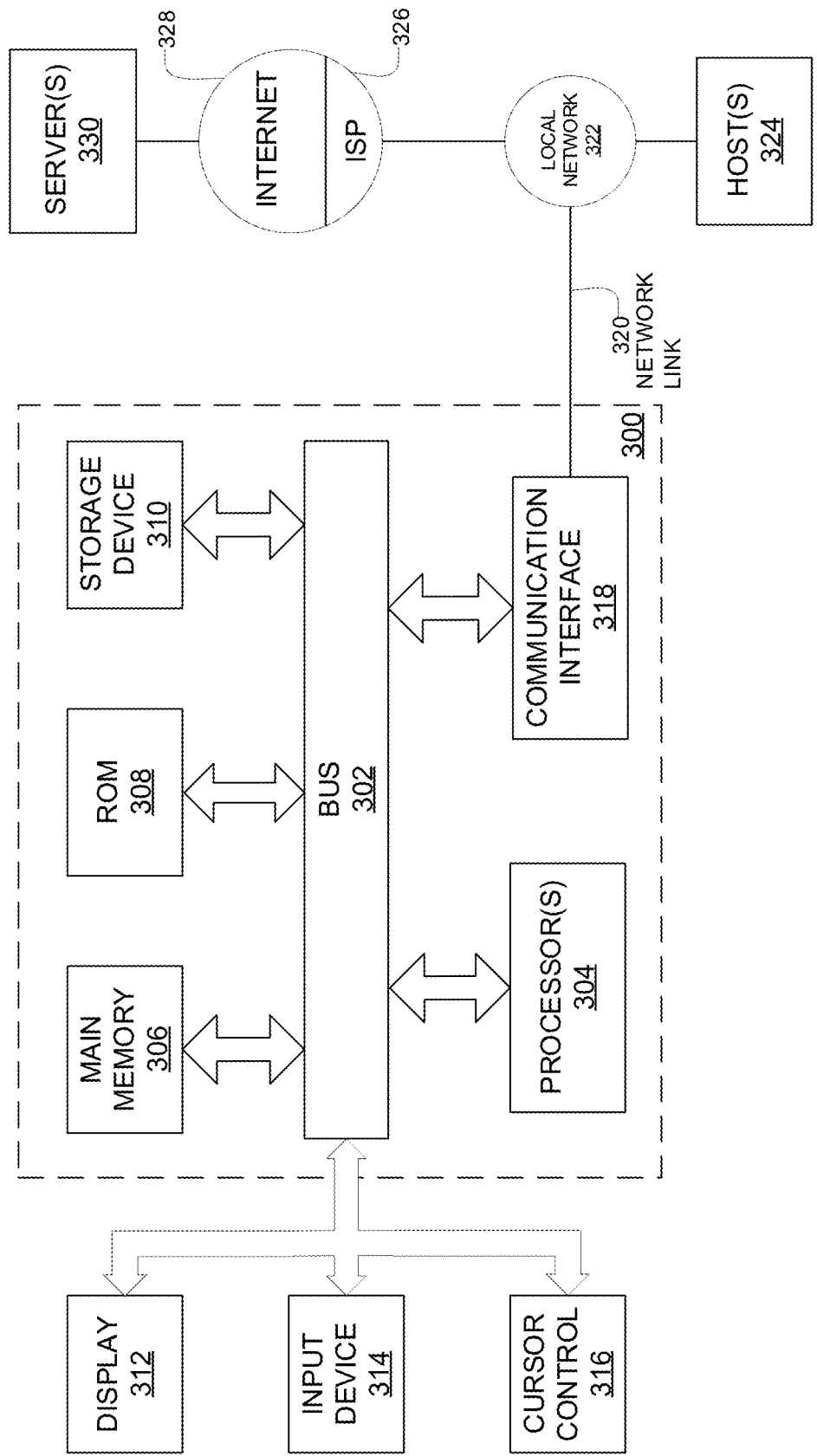
FIG. 3C is a block diagram that illustrates a computer system 300 upon which various embodiments may be implemented.

FIG. 3C is a block diagram that illustrates features which can be included in a computer system 300 upon which various embodiments may be implemented. For example, implementations of mobile computer devices or computer systems illustrated in the Figures, including but not limited to a consumer device 103, extender devices 105, a token server 117, a marketplace 121, a core 109, an MVNO, a base station 107, and/or an application server 113.

In the example illustrated in FIG. 3C, computer system 300 includes a bus 302 or other communication mechanism for communicating information, and a hardware processor, or multiple processors, 304 coupled with bus 302 for processing information. Hardware processor(s) 304 may be, for example, one or more general purpose microprocessors. In implementations as a consumer device, computer executable instructions that perform functionality described herein relating to a consumer device (for example, in reference to FIGS. 1-3B and 4-21) can be stored in memory 306 and executed by the one or more hardware processors 304. In implementations as an extender device, computer executable instructions that perform functionality described relating to a consumer device (for example, in reference to FIGS. 1-3B and 4-21) can be stored in memory 306 and executed by the one or more hardware processors 304. In implementations as a token server or a marketplace computer system, computer executable instructions that perform functionality described relating to a token server or a marketplace computer system (for example, in reference to FIGS. 1-3B) can be stored in memory 306 and executed by the one or more hardware processors 304.

Still referring to the example of FIG. 3C, computer system 300 also includes a main memory 306, such as a random access memory (RAM), cache and/or other dynamic storage devices, coupled to bus 302 for storing information and instructions to be executed by processor 304. Main memory 306 also may be used for storing temporary variables or other intermediate information during execution of instructions to be executed by processor 304. Such instructions, when stored in storage media accessible to processor 304, render computer system 300 into a special-purpose machine that is customized to perform the operations specified in the instructions. In an example of a consumer device, the main memory 306 can, for example, include instructions that establish, by a consumer device, peer-to-peer wireless interfaces with two or more extender devices, transmit concurrently from the consumer device, uplink data to each of two or more extender devices, and receive concurrently, at the consumer device via the peer-to-peer wireless interfaces, data related to the received downlink transmission data. In an example of extender device implementations, the main memory 306 can include instructions that receive data from a consumer device via a P2P wireless communication channel (interface), transmit, uplink transmission data to a cellular network, receive downlink transmission data from a cellular network, and transmit via the P2P wireless interface, the received downlink transmission data to the consumer device.

Computer system 300 further includes a read only memory (ROM) 308 or other static storage device coupled to bus 302 for storing static information and instructions for processor 304. A storage device 310 can be coupled to bus 302 for storing information and instructions. Computer system 300 may be coupled via the bus 302 to a display 312, e.g., an LCD display (or touch screen), for displaying information to a computer user. An input device 314, including alphanumeric and other keys, is coupled to bus 302 for communicating information and command selections to processor 304. In some implementations (e.g., a mobile device with a touchscreen) the input device incorporated in the display. In some embodiments, another type of user input device is cursor control 316, such as a mouse, a trackball, or cursor direction keys for communicating direction information and command selections to processor 304 and for controlling cursor movement on display 312. In some embodiments, the same direction information and command selections as cursor control may be implemented via receiving touches on a touch screen without a cursor.

Computing system 300 may include a user interface module to implement a GUI that may be stored in a mass storage device as computer executable program instructions that are executed by the computing device(s). Computer system 300 may further, as described below, implement the techniques described herein using customized hard-wired logic, one or more ASICs or FPGAs, firmware and/or program logic which in combination with the computer system causes or programs computer system 300 to be a special-purpose machine. According to one embodiment, the techniques herein are performed by computer system 300 in response to processor(s) 304 executing one or more sequences of one or more computer readable program instructions contained in main memory 306. Such instructions may be read into main memory 306 from another storage medium, such as storage device 310. Execution of the sequences of instructions contained in main memory 306 causes processor(s) 304 to perform the process steps described herein. In alternative embodiments, hard-wired circuitry may be used in place of or in combination with software instructions.

Various forms of computer readable storage media may be involved in carrying one or more sequences of one or more computer readable program instructions to processor 304 for execution. The instructions received by main memory 306 may optionally be stored on storage device 310 either before or after execution by processor 304. Computer system 300 also includes a communication interface 318 coupled to bus 302. Communication interface 318 can provide a two-way data communication coupling to a network link 320 that is connected to a local network 322, or another device (e.g., consumer device to extender device, extender device to cellular network, and the like). For example, communication interface 318 may be an integrated services digital network (ISDN) card, cable modem, satellite modem, or a modem to provide a data communication connection to a corresponding type of telephone line. As another example, communication interface 318 may be a local area network (LAN) card to provide a data communication connection to a compatible LAN (or WAN component to communicate with a WAN). Wireless links may also be implemented. In some examples, cellular links may be implemented in the communication interface 318. In any such implementation, communication interface 318 can send and receive electrical, electromagnetic or optical signals that carry digital data streams representing various types of information.

Network link 320 typically provides data communication through one or more networks to other data devices. In an example, one or more extender devices, or one or more consumer devices. For example, network link 320 may provide a connection through local network 322 to a host computer 324 or to data equipment operated by an Internet Service Provider (ISP) 326. ISP 326 in turn provides data communication services through the world wide packet data communication network (the "Internet" 328). Local network 322 and Internet 328 both use electrical, electromagnetic or optical signals that carry digital data streams. The signals through the various networks and the signals on network link 320 and through communication interface 318, which carry the digital data to and from computer system 300, are example forms of transmission media.

Computer system 300 can send messages and receive data, including program code, through the network(s), network link 320 and communication interface 318. In the Internet example, a server 330 might transmit a requested code for an application program through Internet 328, ISP 326, local network 322 and communication interface 318. The received code may be executed by processor 304 as it is received, and/or stored in storage device 310, or other non-volatile storage for later execution.

Accordingly, in an embodiment, the computer system 300 comprises a non-transitory computer storage medium storage device 310 configured to at least store information related to wireless communications. The computer system 300 can also include non-transitory computer storage medium storage that stores instructions for the one or more processors 304 to execute a process (e.g., a method) for communicating to a cellular network on two or more parallel communication connections.

Various embodiments of the present disclosure may be a system, a method, and/or a computer program product at any possible technical detail level of integration. The computer program product may include a computer readable storage medium (or mediums) having computer readable program instructions thereon for causing a processor to carry out aspects of the present disclosure. For example, the functionality described herein may be performed as software instructions are executed by, and/or in response to software instructions being executed by, one or more hardware processors and/or any other suitable computing devices. The software instructions and/or other executable code may be read from a computer readable storage medium (or mediums).

The computer readable storage medium can be a tangible device that can retain and store data and/or instructions for use by an instruction execution device. The computer readable storage medium may be, for example, but is not limited to, an electronic storage device (including any volatile and/or non-volatile electronic storage devices), a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a solid state drive, a random access memory (RAM), a read-only memory (ROM), an erasable programmable read-only memory (EPROM or Flash memory), a static random access memory (SRAM), a memory card/stick, having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions (as also referred to herein as, for example, "code," "instructions," "module," "application," "software application," and/or the like) for carrying out operations of the present disclosure may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. Computer readable program instructions may be callable from other instructions or from itself, and/or may be invoked in response to detected events or interrupts. Computer readable program instructions configured for execution on computing devices may be provided on a computer readable storage medium, and/or as a digital download (and may be originally stored in a compressed or installable format that requires installation, decompression or decryption prior to execution) that may then be stored on a computer readable storage medium. Such computer readable program instructions may be stored, partially or fully, on a memory device (e.g., a computer readable storage medium) of the executing computing device, for execution by the computing device. The computer readable program instructions may execute entirely on a user's computer (e.g., the executing computing device), partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. For example, computer readable program instructions may be provided to a processor of a mobile computer device to produce a consumer device or extender device such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart(s) and/or block diagram(s) block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks. For example, the instructions may initially be carried on a drive of a remote computer. The remote computer may load the instructions and/or modules into its dynamic memory and send the instructions over a telephone, cable, or optical line using a modem. A modem local to a server computing system may receive the data on the telephone/cable/optical line and use a converter device including the appropriate circuitry to place the data on a bus. The bus may carry the data to a memory, from which a processor may retrieve and execute the instructions. The instructions received by the memory may optionally be stored on a storage device (e.g., a solid state drive) either before or after execution by the computer processor.

The flowchart and block diagrams in the Figures illustrate the architecture, functionality, and operation of possible implementations of systems, methods, and computer program products according to various embodiments of the present disclosure. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. In addition, certain blocks may be omitted in some implementations. The methods and processes described herein are also not limited to any particular sequence, and the blocks or states relating thereto can be performed in other sequences that are appropriate.

It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions. For example, any of the processes, methods, algorithms, elements, blocks, applications, or other functionality (or portions of functionality) described in the preceding sections may be embodied in, and/or fully or partially automated via, electronic hardware such application-specific processors (e.g., application-specific integrated circuits (ASICs)), programmable processors (e.g., field programmable gate arrays (FPGAs)), application-specific circuitry, and/or the like (any of which may also combine custom hard-wired logic, logic circuits, ASICs, FPGAs, etc. with custom programming/execution of software instructions to accomplish the techniques).

Any of the above-mentioned processors, and/or devices incorporating any of the above-mentioned processors, may be referred to herein as, for example, "computers," "computer devices," "computing devices," "hardware computing devices," "hardware processors," "processing units," and/or the like. Computing devices of the above-embodiments may generally (but not necessarily) be controlled and/or coordinated by operating system software. In other embodiments, the computing devices may be controlled by a proprietary operating system. Conventional operating systems control and schedule computer processes for execution, perform memory management, provide file system, networking, I/O services, and provide a user interface functionality, such as a graphical user interface ("GUI"), among other things.

Figure 4:
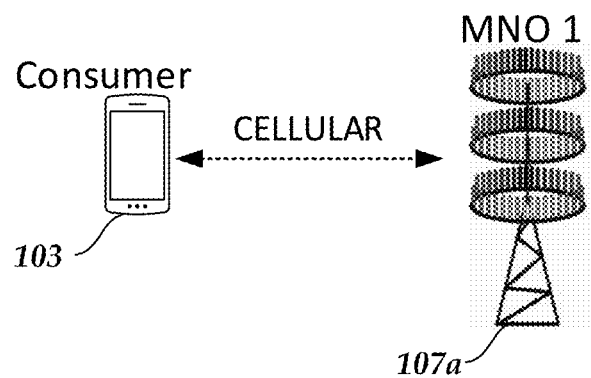
FIG. 4 is a diagram illustrating a portion of a wireless network environment in which a consumer device can communicate with a cellular antenna/base station ("base station") of the wireless network.

FIG. 4 is a diagram illustrating a portion of a wireless network environment in which a consumer device 103 can communicate with a cellular antenna/base station ("base station") 107a of the wireless network. The consumer device 103 has an established association with an MNO that operates (or owns) the base station 107a. Because of the established association, consumer device 103 has an account with the MNO and is charged by the MNO for using the cellular network.

Figure 5:
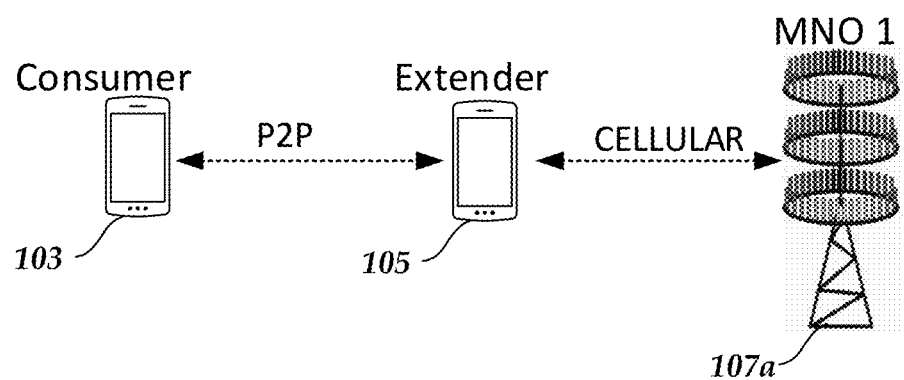
FIG. 5 is a diagram illustrating a portion of a wireless network environment in which a consumer device can communicate with an extender device on a P2P link and the extender device can communicate with a cellular base station of the wireless network.

FIG. 5 is a diagram illustrating a portion of a wireless network environment in which a consumer device can communicate with an extender device on a P2P link, and the extender device can communicate with a cellular base station 107a of the wireless network. This is a simplified diagram of what is shown in FIG. 1. Here, the consumer device 103 can establish communications with nearby extender device 105 using a P2P link. Then consumer device 103 can transmit data related to a communication (e.g., a phone call) to the extender device 105 via the P2P link, and the extender device 105 can transmit data via cellular communications to the base station 107a. The extender device 105 can also receive data from the base station 107a via cellular communications and transmit the data to consumer device 103 via the P2P link. As a result of this interaction, an account of consumer device 103 managed by the MVNO 115 (FIG. 1) is updated, the update decreasing the number of tokens in the consumer device's account. Also as a result of this interaction an account of extender device 105 managed by the MVNO 115 is updated, the update increasing the number of tokens in the extender device's account.

FIGS. 6-19 illustrate various embodiments of a consumer device accessing a cellular network by communicating with one or more extender devices. Although FIGS. 4-9 illustrate many different embodiments, other embodiments are possible as well. In embodiments of a token-based MVNO, there can be one or more extender devices that a single consumer device communicates establishes a P2P link with. Each extender device can communicate with a base station operated by an MNO. When there are multiple extender devices being used to communicate data to a cellular network for a consumer device, each extender device can communicate with a base station operated by the same MNO. Alternatively, each extender device can communicate with a base station operated by a different MNO, or various combinations thereof. In addition, when two or more extender devices are communicating with a base station operated by the same MNO, each of the extender devices can communicate with a base station using the same channel, or a different channel. Also, in many of the embodiments, a consumer device can also communicate with a base station with cellular communications using its own cellular modem, in addition to communicating over the cellular network using an extender device. These and other embodiments relating to a consumer device communicating with a cellular network using an extender device are further discussed below.

Figure 6:
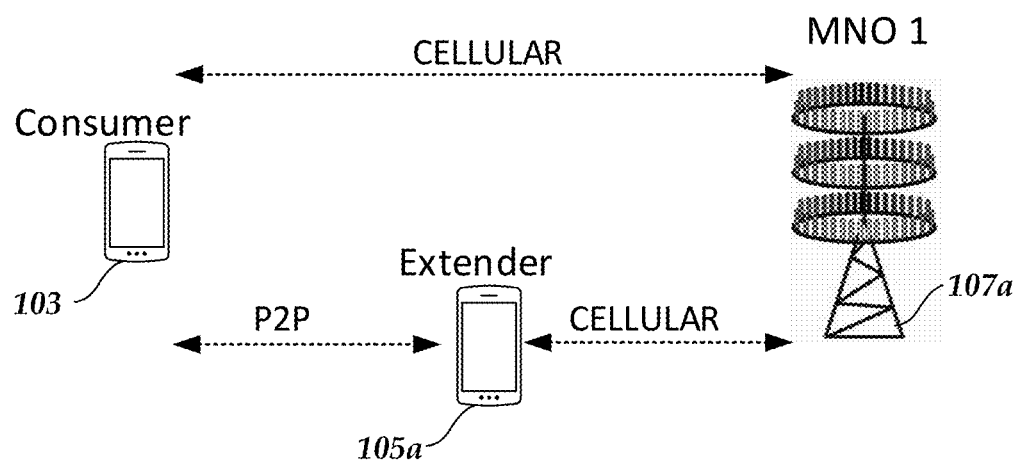
FIG. 6 is a diagram illustrating a portion of a wireless network environment in which a consumer device can communicate with an extender device, on a P2P link, and the extender device can communicate with a cellular base station of the wireless network, and the consumer device can also communicate via cellular communication with a cellular base station of the wireless network.

FIG. 6 is a diagram illustrating a portion of a wireless network environment. In this example, a consumer device 103 communicates via cellular communication with a cellular base station 107a of the wireless network. The consumer device 103 further communicates with an extender device 105 on a P2P link, and the extender device communicates with a cellular base station 107a of the wireless network. Accordingly, this example is similar to the example illustrated in FIG. 5, except that it includes the additional direct cellular communication between the consumer device 103 and the base station 107a.

Figure 7:
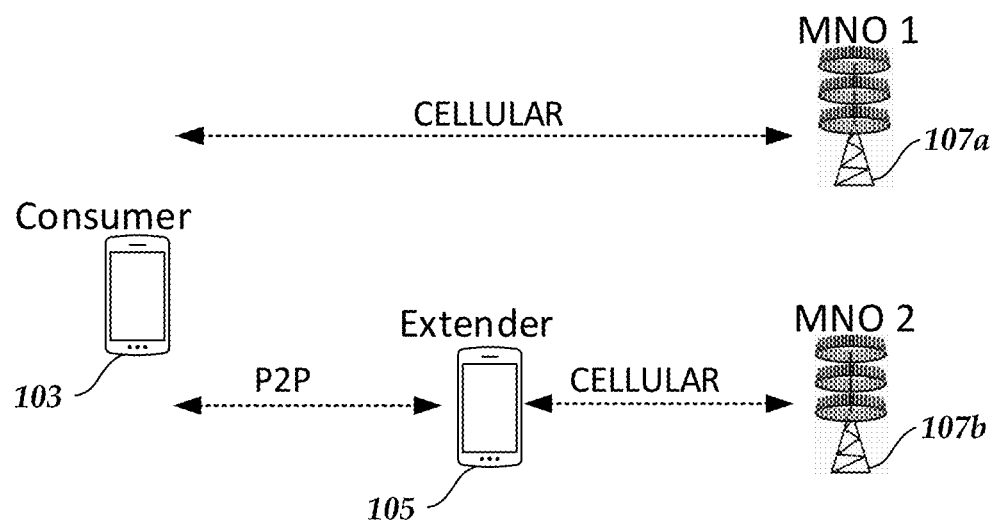
FIG. 7 is a diagram illustrating a portion of a wireless network environment in which a consumer device can communicate with a cellular base station operated by a first mobile network operator (MNO) of the wireless network, and the consumer device also can communicate with an extender device, on a P2P link, and the extender device can communicate with a cellular base station operated by a second MNO.

FIG. 7 is a diagram illustrating a portion of a wireless network environment in which a consumer device 103 can communicate via cellular communication with a cellular base station 107a operated by a first MNO. The consumer device 103 further communicates with an extender device 105 on a P2P link, and the extender device 105 communicates with a cellular base station 107b operated by a second MNO. In this example, because the consumer device 103 is communicating to base stations 107a, 107b operated by different MNO's, cellular communications to the base stations 107a, 107b are guaranteed to be on different channels, and therefore higher communication performance (e.g., faster communication) may be achieved, compared to if the consumer device 103 was communicating to a base stations operated by the same MNO.

Figure 8:
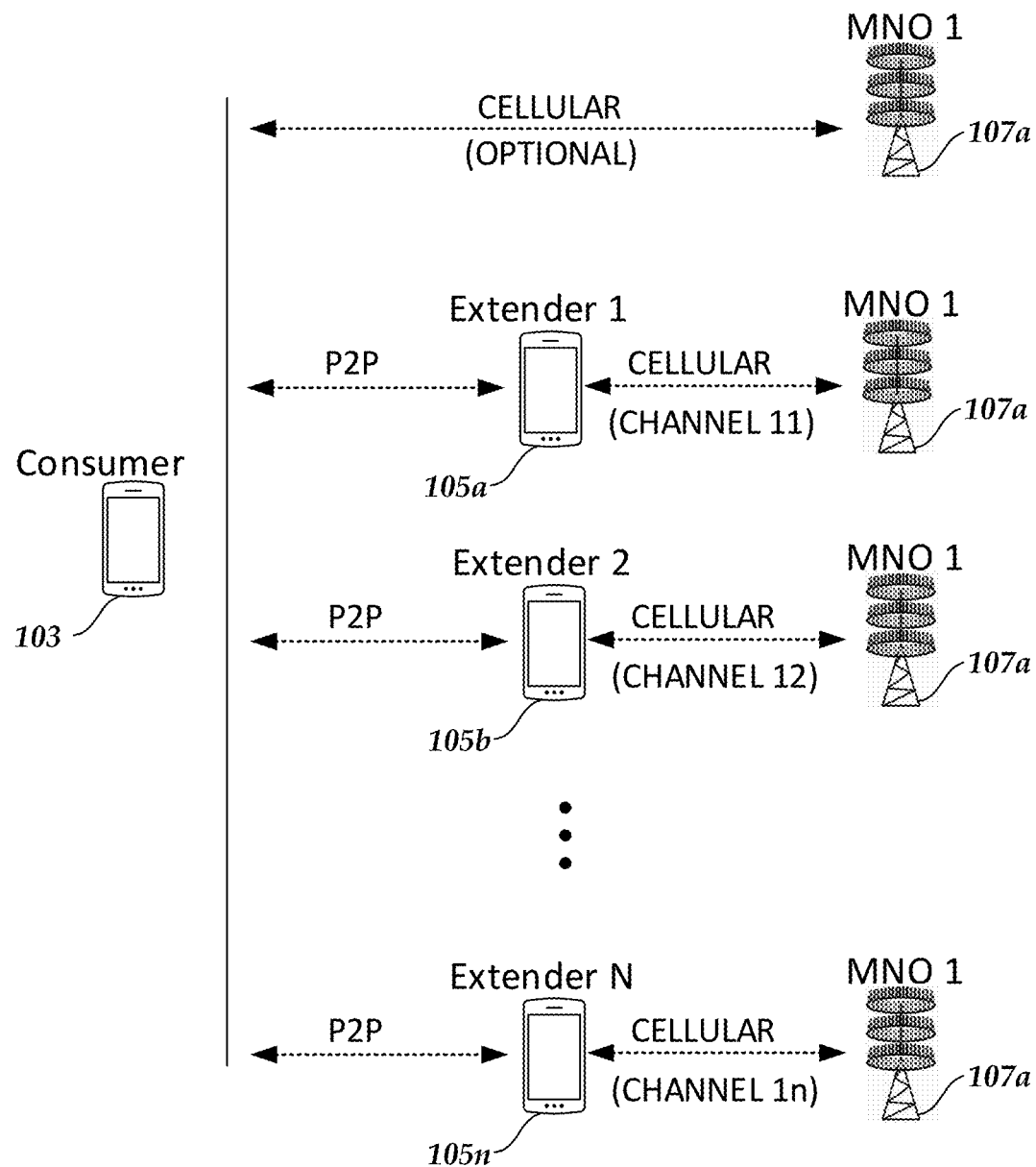
FIG. 8 is a diagram illustrating a portion of a wireless network environment in which a consumer device can communicate via cellular communication with a cellular base station of the wireless network, and the consumer device can communicate with two or more extender devices via a P2P link, and each extender device can communicate with a cellular base station of the wireless network.

FIG. 8 is a diagram illustrating a portion of a wireless network environment in which a consumer device 103 can communicate with two or more extender devices 105a-n via a P2P link. Each extender device 105a-n communicates with a cellular base station 107a-n. In this example, each of the cellular base stations 107a-n is operated by the same MNO. In an embodiment, two or more of the extender devices 105a-n can communicate with the base station 107a over different channels, which may increase communication performance. In addition, in an embodiment the consumer device 103 can directly communicate with a cellular base station 107a using its own cellular modem, such that the consumer device 103 is communicating over a cellular network directly and indirectly (e.g., through two or more extender devices 105) within a period of time (e.g., simultaneously, or substantially simultaneously).

Figure 9:
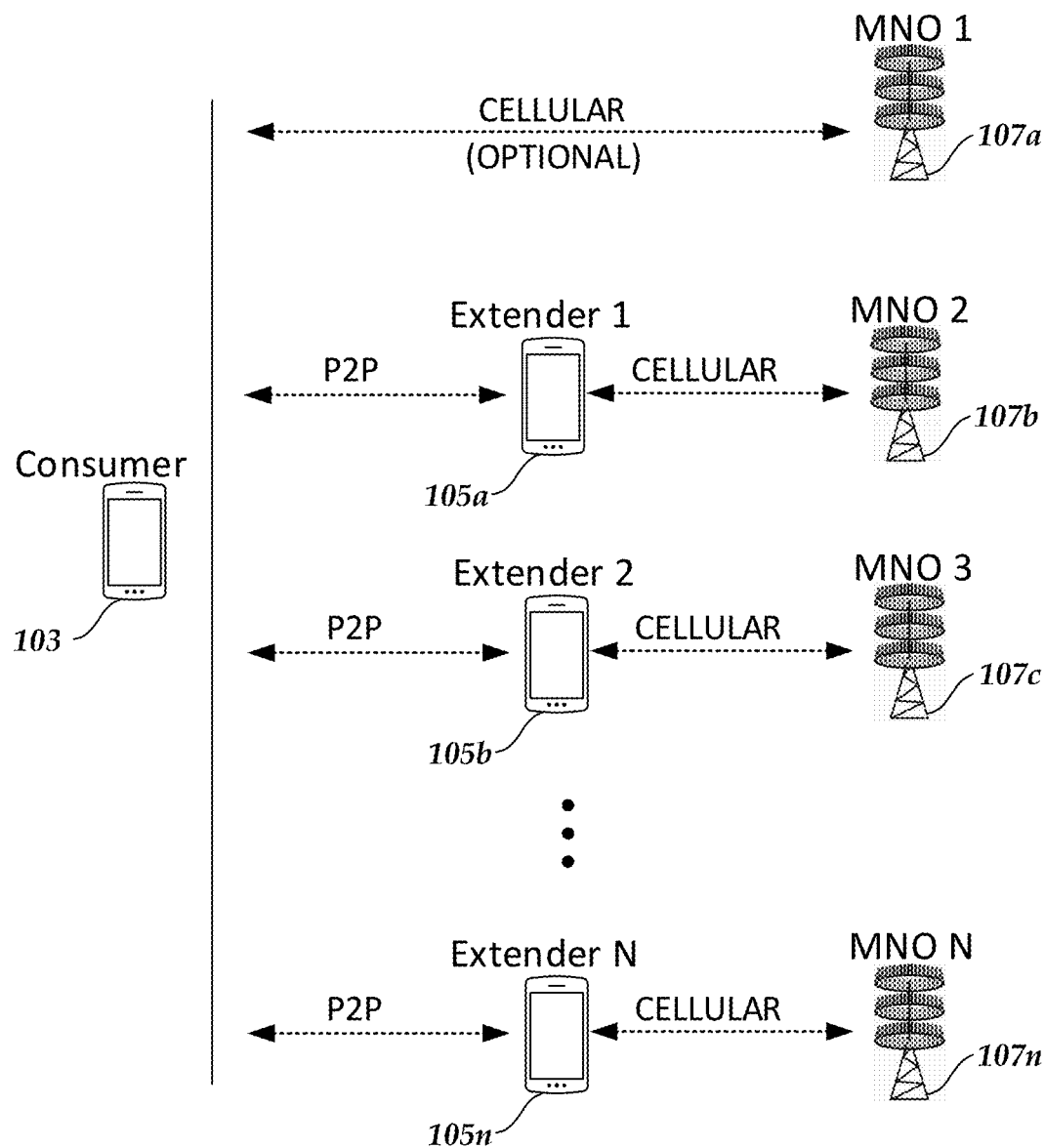
FIG. 9 is a diagram illustrating a portion of a wireless network environment in which a consumer device can communicate via cellular communication with a cellular base station of the wireless network, and the consumer device can communicate with two or more extender devices, via a P2P link, and each extender device can communicate with a cellular base station of the wireless network, where each of the base stations is operated by a different MNO.

FIG. 9 is a diagram illustrating a portion of a wireless network environment in which a consumer device 103 can communicate with two or more extender devices 105a-n via a P2P link. Each extender device 105a-n communicates with a cellular base station 107a-n. In this example, each of the cellular base stations 107a-n is operated by a different MNO. In an embodiment, two or more of the cellular base stations 107a-n are operated by different MON's. In an embodiment, the consumer device 103 may also directly communicate via cellular communication with a cellular base station 107a using a cellular modem of the consumer device. In such a configuration, the consumer device 103 can communicate over a cellular network directly (using its own cellular modem) and indirectly (e.g., through two or more extender devices 105) within a period of time (e.g., simultaneously, or substantially simultaneously).

Figure 10:
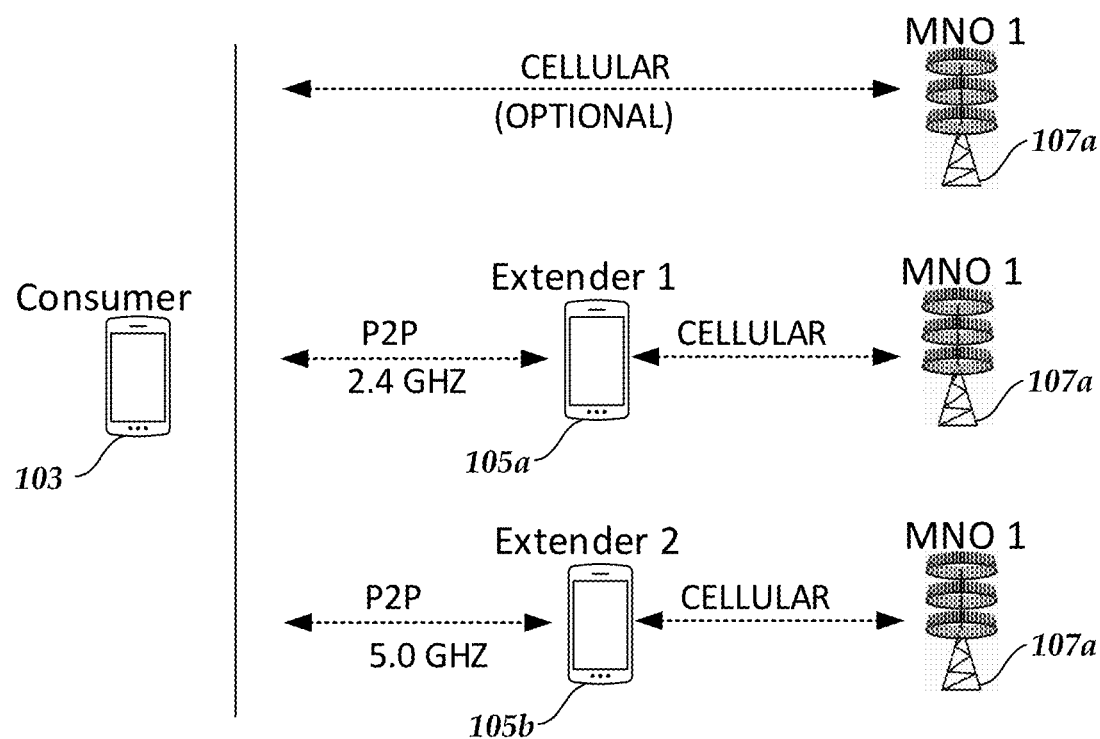
FIG. 10 a diagram illustrating a portion of a wireless network environment in which a consumer device can communicate via cellular communication with a cellular base station of the wireless network, and the consumer device can communicate with two extender devices, via a P2P link, where the communication between the consumer device and each extender device is on a different channel. In an embodiment, the consumer device can communicate with a first extender device on Wi-Fi at a first frequency (e.g., 2.4 GHz) and can communicate with a second extender device on Wi-Fi at a second frequency (e.g., 5.0 GHz).

FIG. 10 a diagram illustrating a portion of a wireless network environment in which consumer device 103 communicates with two extender devices 105a, 105b via a P2P link over a Wi-Fi network. The communication between the consumer device 103 and each extender device 105a, 105b can be on a different channel. For example, the consumer device 103 can communicate with a first extender device 105a over Wi-Fi at a first frequency (e.g., 2.4 GHz), and can communicate with a second extender device 105b over Wi-Fi at a second frequency (e.g., 5.0 GHz). In this embodiment, the consumer device 103 can also communicate directly via cellular communication with a cellular base station 107a using its own cellular modem.

Figure 11:
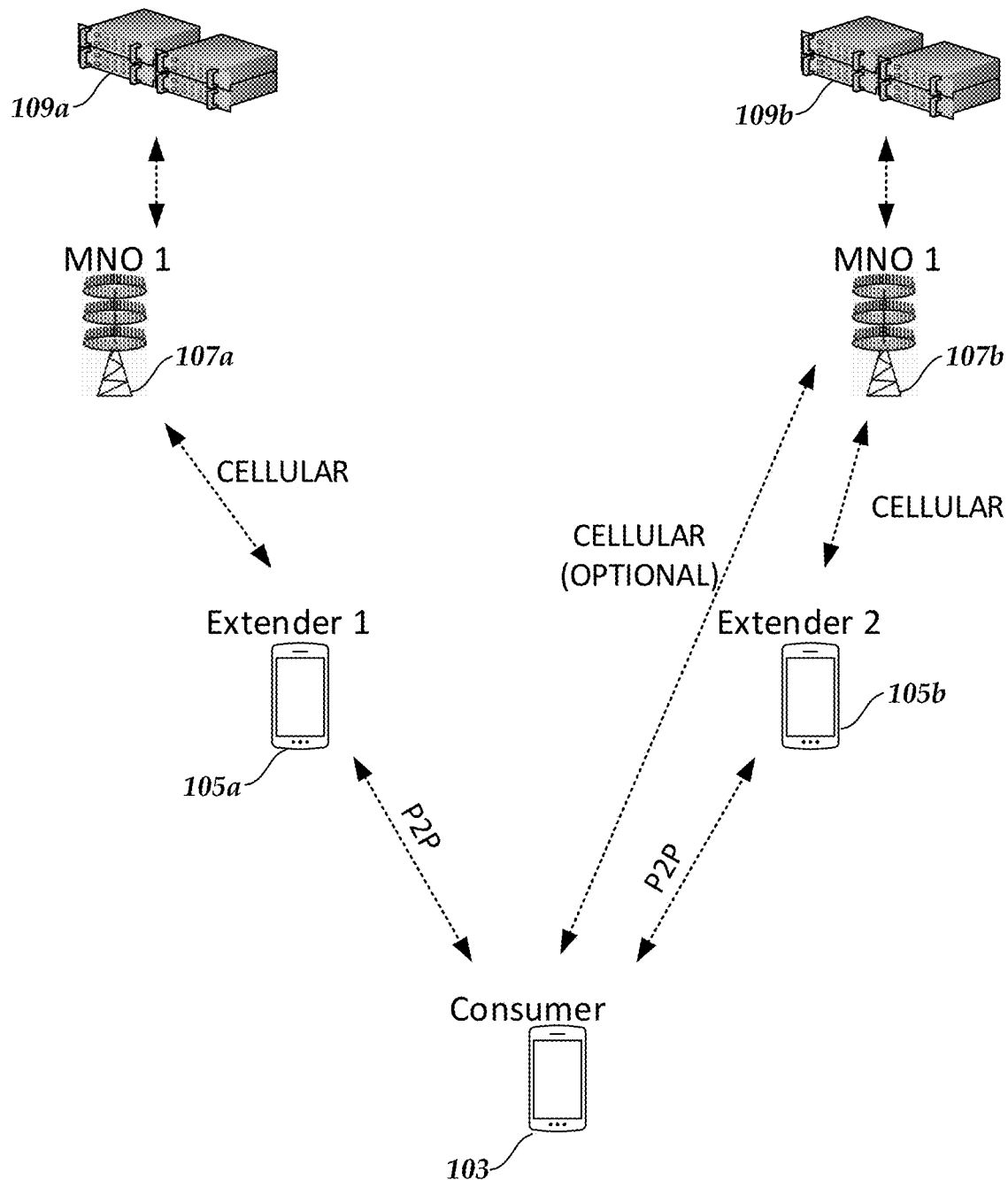
FIG. 11 a diagram illustrating a portion of a wireless network environment in which a consumer device can communicate with two extender devices via a P2P link, and each of the extender devices can communicate to different base station (e.g., in a different cell of the wireless network). Also, the consumer device can optionally communicate via cellular communication with a base station.

FIG. 11 a diagram illustrating a portion of a wireless network environment. In the illustrated embodiment, a consumer device 103 can communicate with two different base stations 107a, 107b. Each of the base stations 107a, 107b are in a different service cell of the wireless network.

As illustrated in the example in FIG. 11, base station 107a is connected to core server 109a. Base station 107b is connected to core server 109b. Accordingly, in this example each of the base stations 107a, 107b can provide service to different cells. For example, they can be adjacent cells. The consumer device 103 can communicate with two extender devices 105a, 105b via a P2P link to each of the extender devices 105a, 105b. Each of the extender devices 105a, 105b can communicate to a different base station, e.g., base station 107a and base station 107b, respectively, which are in a different cell of the wireless network.

Also, as illustrated in the example in FIG. 11, the consumer device 103 can additionally communicate via a direct cellular connection with a base station (for example, base station 107b) using its own cellular modem. Accordingly, in this example the consumer device can communicate via a P2P connection with one or more extender devices (e.g., extender devices 105a, 105b) via a P2P connection, and concurrently communicate with a base station via a cellular connection (e.g., base station 107b). In another example of a consumer device communicating via multiple types of connections with extender devices and base stations, the consumer device 103 may communicate with more than two extender devices using a P2P connection, where each of the extender devices communicates with a base station in a different cell. Additionally, while communicating with the more than two extender devices, the consumer device 103 can also communicate with a base station via a cellular connection. This can occur for instance, when the consumer device 103 and the extender devices 105 are near a cell boundary, for example, a cell boundary where three cells intersect.

Figure 12:
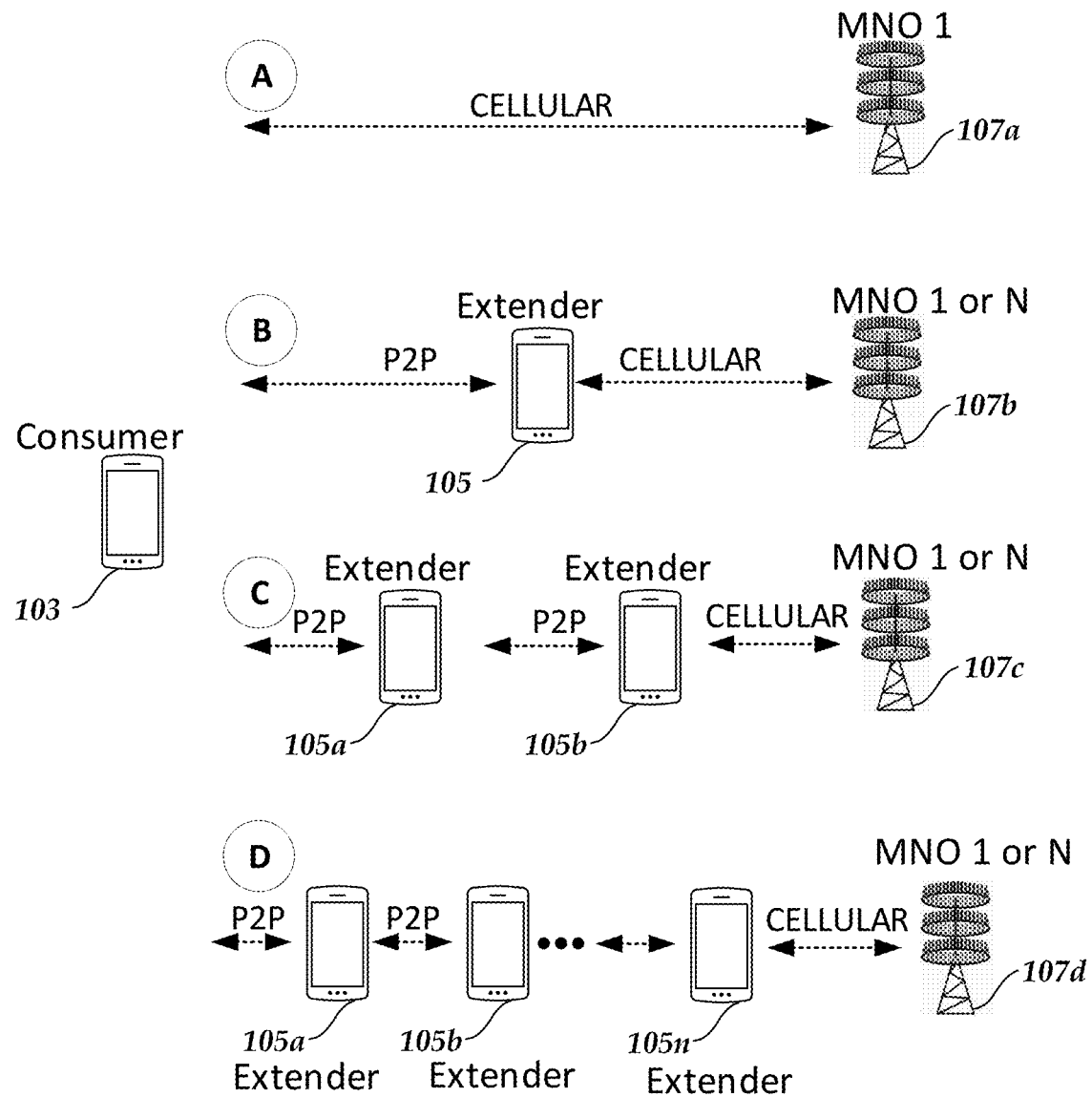
FIG. 12 is a diagram illustrating a portion of a wireless network environment in a which a consumer device can communicate with a cellular base station operated by a first mobile network operator (MNO) of the wireless communication network A (indicated by the circle "A" in FIG. 12), and different examples communication networks B-D (indicated by the circles "B", "C", and "D") of the consumer device also communicating with one or more extender devices, on a P2P link, and the extender device communicating with a cellular base station operated by a the first MNO (e.g., "MNO 1") or a second MNO (e.g., "MNO 1 or N"), that is, the same MNO or a different MNO than is used for the cellular communication.

FIG. 12 is a diagram illustrating a portion of a wireless network environment in a which a consumer device communicates with a cellular base station operated by a first mobile network operator (MNO) of the wireless communication network A (indicated by the circle "A" in FIG. 12), and different examples of communication networks B-D (indicated by the circles "B", "C", and "D" in FIG. 12) that the consumer device is also using to communicate with a base station such that the consumer device is communicating with one or more base stations in parallel. For example, the consumer device may be communicating with a base station on a cellular communication link, and the consumer device is also communicating via one or more extender devices on a P2P link, and the extender device(s) are communicating with a cellular base station operated by a the first MNO (e.g., "MNO 1") or a second MNO (e.g., "MNO 1 or N"), that is, the same MNO or a different MNO than is used for the cellular communication.

In a first example, a consumer device 103 communicates with a base station 107a via a cellular connection, as illustrated in communication network A. In addition to using communication network A, the consumer device 103 also communicates over a communication network B that includes a P2P connection with extender device 105, which has a cellular connection to base station 107b. In various examples, base station 107b can be operated by the same MNO as base station 107a (e.g., MNO 1), or base station 107B can be operated by a different MNO than base station 107a (e.g., MNO 2).

In a second example, the consumer device 103 communicates with a base station 107a via a cellular connection, as illustrated in communication network A. In addition to using communication network A, the consumer device 103 can also communicate on communication network C that includes a P2P connection between the consumer device 103 and a first extender device 105a, and a P2P connection between the first extender device 105a and a second extender device 105b. The second extender device 105b then communicates via a cellular connection to a base station 107c. In various examples, base station 107c can be operated by the same MNO as base station 107a (e.g., MNO 1), or base station 107c can be operated by a different MNO than base station 107a (e.g., MNO 2).

In a third example, the consumer device 103 communicates with a base station 107a via a cellular connection, as illustrated in communication network A. In addition to using communication network A, the consumer device 103 can also communicate or communication network D that includes a P2P connection between the consumer device 103 and a first extender device 105a, a P2P connection between the first extender device 105a and a second extender device 105b, and one or more additional P2P connections between second extender device 105b and one or more additional extender devices 105n. The extender device 105n then communicates via a cellular connection to a base station 107d. In various examples, base station 107d can be operated by the same MNO as base station 107a (e.g., MNO 1), or base station 107d can be operated by a different MNO than base station 107a (e.g., MNO 2). In all of these examples, the consumer device 103 communicates along at least two communication paths in parallel, thus increasing the communication performance.

Other examples include a consumer device in at least two parallel communication paths include communicating with a cellular base station operated by a first mobile network operator (MNO) of the wireless communication network A and variations of the examples shown in FIG. 12. In an example, the consumer device 103 can communicate using the wireless communications network A, and one or more of the communication networks B-D. The base stations 107 associated with the communications networks can be operated by the same MNO, or different MNO's. In some implementations, the P2P connections can be Wi-Fi of a different frequency, for example, 2.5 GHz and 5 GHz. Other frequencies are also contemplated, including using millimeter waves in one or more of the described communications networks.

Figure 13:
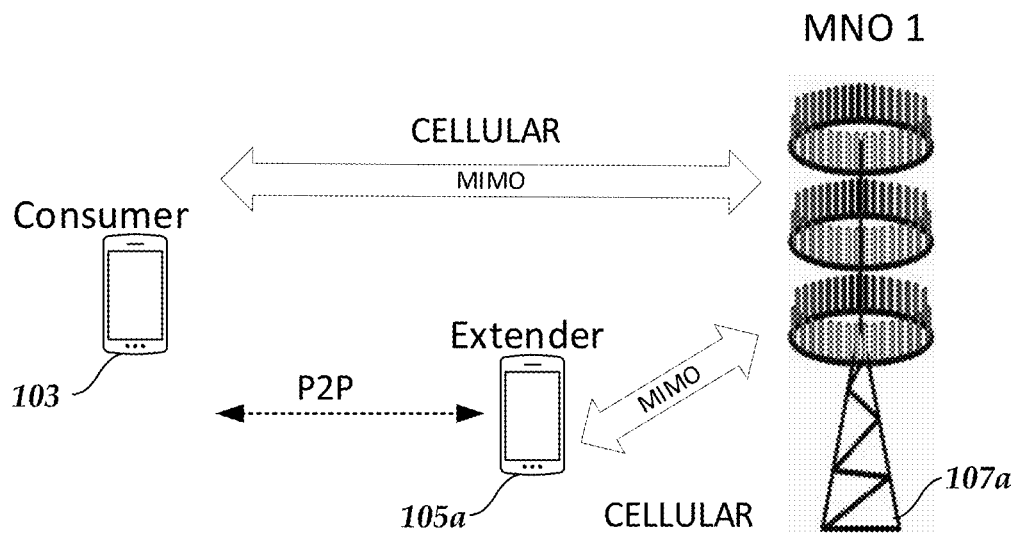
FIG. 13 is a diagram illustrating a portion of a wireless network environment in which a consumer device can communicate with an extender device via a P2P link, and the extender devices can communicate to a base station via cellular communication using multiple-input and multiple-output (MIMO) to multiply the capacity of a radio link using multiple transmission and receiving antennas to exploit multipath propagation. Also, the consumer device can optionally communicate via cellular communication with a base station, and can also use MIMO to multiply the capacity of the cellular communication.

FIG. 13 is a diagram illustrating a portion of a wireless network environment in which a consumer device 103 can communicate with an extender device 105a via a P2P link, and the extender devices can communicate to a base station 107a via cellular communication using multiple-input and multiple-output (MIMO) to multiply the capacity of a radio link using multiple transmission and receiving antennas to exploit multipath propagation. Also, the consumer device 103 can communicate via cellular communication with the base station 107a, and can also use MIMO to multiply the capacity of the cellular communication. MIMO communications use multiple antennas for simultaneously communicating multiple data streams over common frequency spectrum. In certain implementations, the data streams operate with different reference signals to enhance data reception at the receiver. MIMO communications can benefit from higher SNR, improved coding, and/or reduced signal interference due to spatial multiplexing differences of the radio environment.

MIMO communications refers to a number of separate data streams sent or received. For instance, MIMO communications for downlink communications can be described by a number of transmit antennas of a base station and a number of receive antennas for the consumer device 103, or the extender device 105a. For example, two-by-two (2×2) DL MIMO refers to MIMO downlink communications using two base station antennas and two consumer device 103, or extender device 105a, antennas. Additionally, four-by-four (4×4) DL MIMO refers to MIMO downlink communications using four base station antennas and four consumer device 103, or extender device 105a, antennas. For ease of reference to both the consumer device 103 and the extender device 105a, sometimes either or both of them are referred to herein as user equipment (UE).

In examples illustrated in FIGS. 13-19, downlink MIMO communications can be provided to at least one extender device by transmitting using m antennas of a base station and receiving using n antennas of the extender device. Accordingly, such examples illustrate an example of m×n DL MIMO to the at least one extender device. Also, downlink MIMO communications can be provided to the consumer device by transmitting using m antennas of a base station and receiving using n antennas of the consumer device 103. Accordingly, such examples illustrate an example of m×n DL MIMO to the consumer device 103. MIMO functionality can be implemented such that data received from the consumer device 103 via a cellular connection with a base station 107a and data received via the extender device 105a can be integrated together to form downlink transmission data.

Likewise, MIMO order for uplink communications can be described by a number of transmit antennas of an extender device and a number of receive antennas of a base station. Also, MIMO order for uplink communications can be described by a number of transmit antennas of a consumer device and a number of receive antennas of a base station. In an example, 2×2 UL MIMO refers to MIMO uplink communications using two extender device antennas (or two consumer device antennas) and two base station antennas. Additionally, 4×4 UL MIMO refers to MIMO uplink communications using four extender device antennas (or four consumer device antennas) and four base station antennas. MIMO functionality can be implemented such that data transmitted by the consumer device 103 via a cellular connection with a base station 107a and data transmitted via the extender device 105a can be integrated together to form uplink transmission data.

In the examples shown in FIGS. 13-19, uplink MIMO communications are provided by transmitting using n antennas of the extender device 105 and receiving using m antennas of the base station 107, illustrating an example of n×m UL MIMO. Also, uplink MIMO communications are provided by transmitting using n antennas of the consumer device 103 and receiving using m antennas of the base station 107, illustrating another example of n×m UL MIMO.

By increasing the level or order of MIMO, bandwidth of an uplink channel and/or a downlink channel can be increased. MIMO communications are applicable to communication links of a variety of types, such as FDD communication links and TDD communication links.

Figure 14:
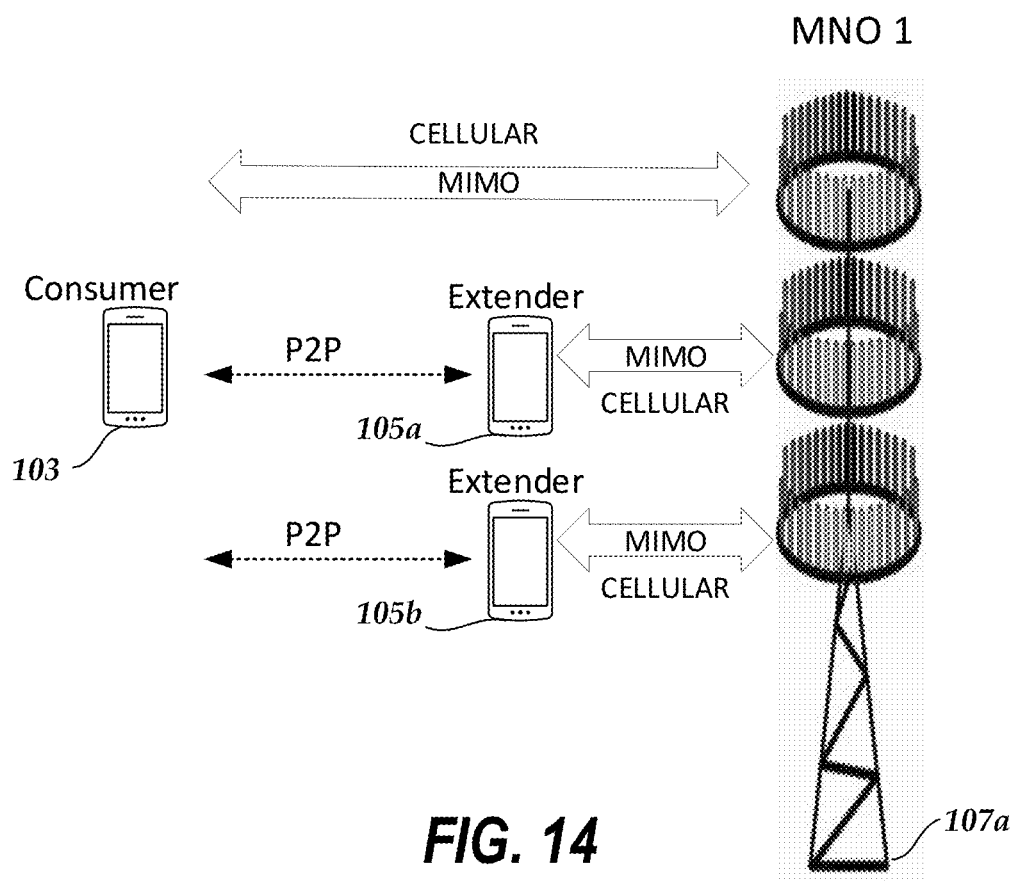
FIG. 14 illustrating a portion of a wireless network environment in which a consumer device can communicate with two (or more) extender devices via P2P links, and the extender devices can each communicate to a base station via cellular communication using multiple-input and multiple-output (MIMO) to multiply the capacity of a radio link using multiple transmission and receiving antennas to exploit multipath propagation. Also, the consumer device can optionally communicate via cellular communication with the base station. Also, the consumer device can optionally communicate via cellular communication with one of the base stations, or another base station, and can also use MIMO to multiply the capacity of the cellular communication.

FIG. 14 is a diagram illustrating a portion of a wireless network environment in which a consumer device 103 can communicate with two (or more) extender devices 105a, 105b via P2P links. The extender devices 105a, 105b can each communicate with a base station 107a via cellular communication using multiple-input and multiple-output (MIMO) to multiply the capacity of a radio link using multiple transmission and receiving antennas to exploit multipath propagation. Also, the consumer device 103 can optionally communicate via cellular communication with the base station 107a, or another base station, and can also use MIMO to multiply the capacity of the cellular communication.

Figure 15:
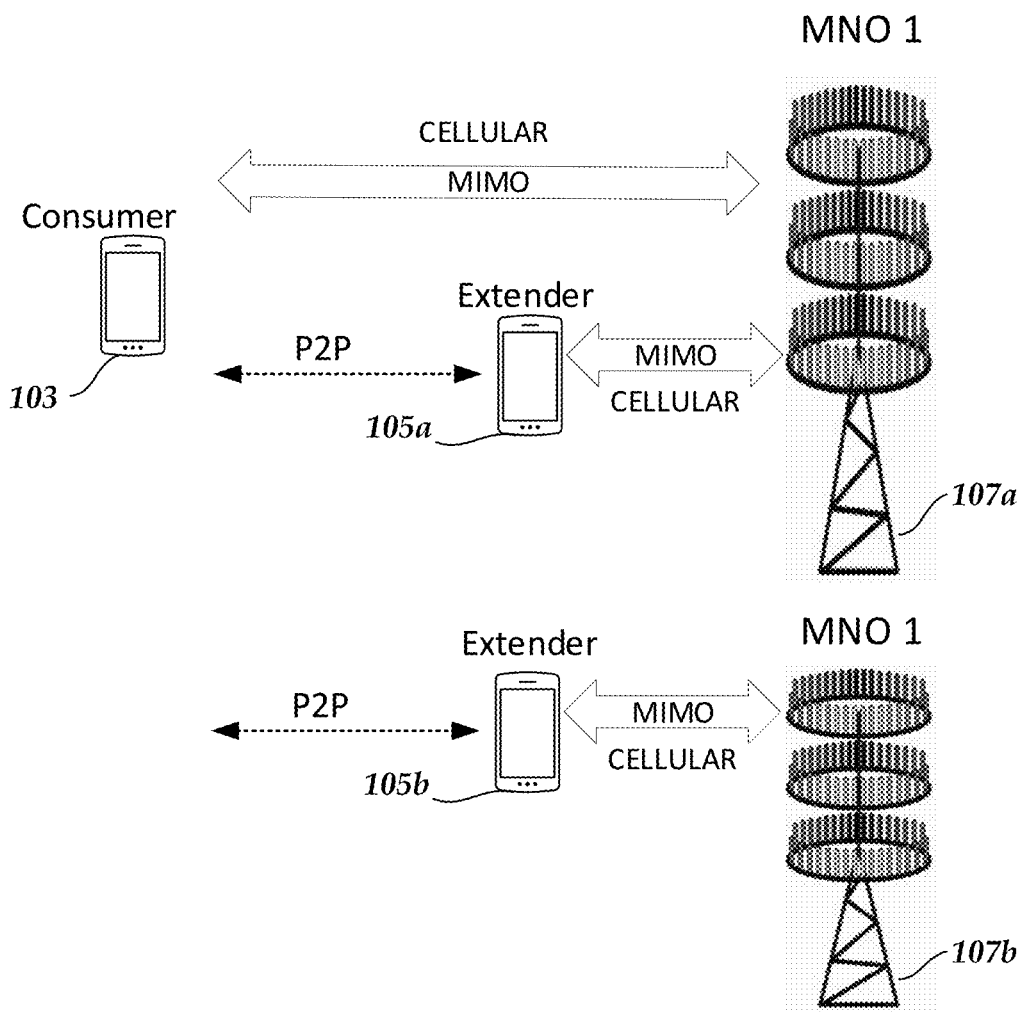
FIG. 15 is a diagram illustrating a portion of a wireless network environment in which a consumer device can communicate with two (or more) extender devices via P2P links, and each of the extender devices can each communicate to a separate base station via cellular communication using multiple-input and multiple-output (MIMO) to multiply the capacity of a radio link using multiple transmission and receiving antennas to exploit multipath propagation. In this example, each of the extender devices communicate with a base station operated by the same MNO. Also, the consumer device can optionally communicate via cellular communication with one of the base stations, or another base station. Also, the consumer device can optionally communicate via cellular communication with one of the base stations, or another base station, and can also use MIMO to multiply the capacity of the cellular communication.

FIG. 15 is a diagram illustrating a portion of a wireless network environment in which a consumer device 103 can communicate with two (or more) extender devices 105a, 105b via P2P links, and each of the extender devices 105a, 105b can communicate to a separate base station 107a, 107b (respectively) via cellular communication using multiple-input and multiple-output (MIMO) to multiply the capacity of a radio link using multiple transmission and receiving antennas to exploit multipath propagation. In this example, each of the extender devices 105a, 105b communicates with a separate base station 107a, 107b and the two base stations 107a, 107b are operated by the same MNO. Also, the consumer device 103 can optionally communicate via cellular communication with one of the base stations 107a, 107b, or another base station, and can also use MIMO to multiply the capacity of the cellular communication.

Figure 16:
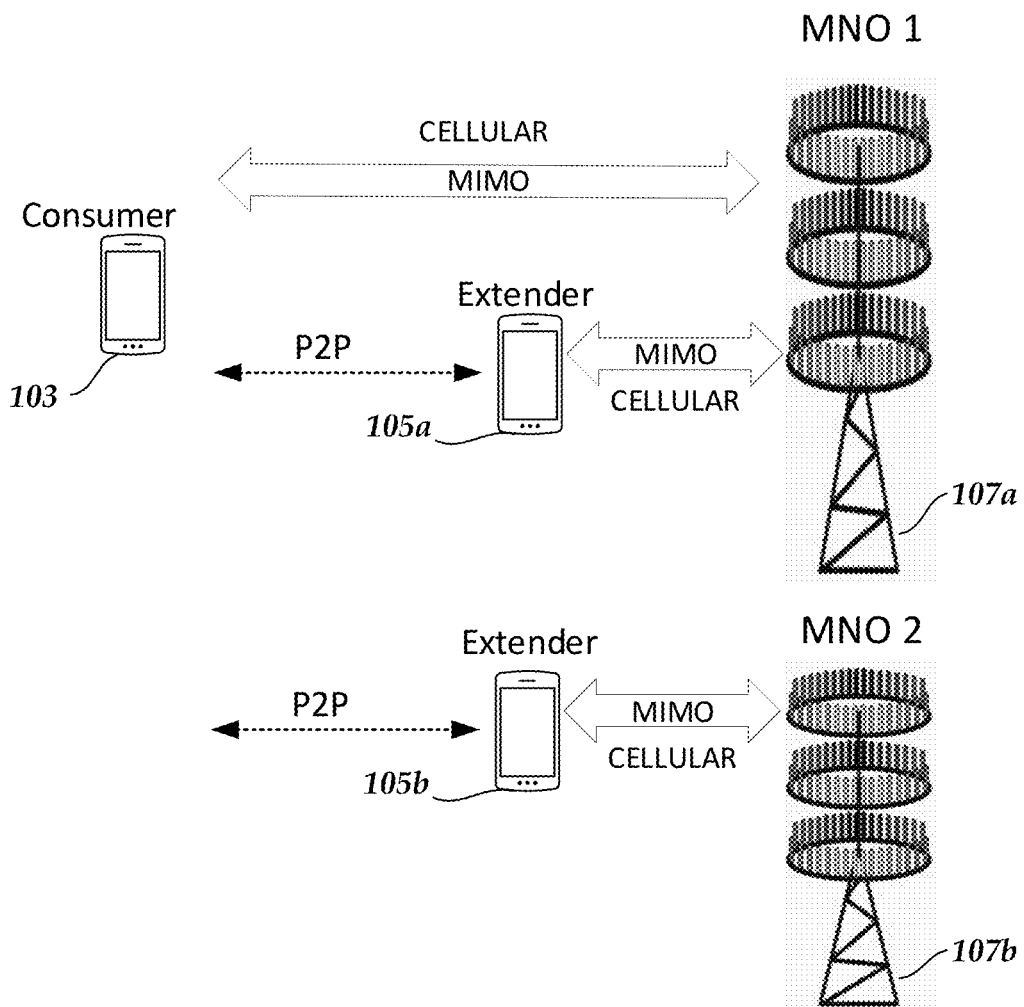
FIG. 16 is a diagram illustrating a portion of a wireless network environment in which a consumer device can communicate with two (or more) extender devices via P2P links, and each of the extender devices can each communicate to a separate base station via cellular communication using multiple-input and multiple-output (MIMO) to multiply the capacity of a radio link using multiple transmission and receiving antennas to exploit multipath propagation. In this example, each of the extender devices communicate with a base station operated by a different MNO. Also, the consumer device can optionally communicate via cellular communication with one of the base stations, or another base station, and can also use MIMO to multiply the capacity of the cellular communication.

FIG. 16 is a diagram illustrating a portion of a wireless network environment in which a consumer device 103 can communicate with two (or more) extender devices 105a, 105b via P2P links. Each of the extender devices 105a, 105b can communicate to a separate base station 107a, 107b (respectively) via cellular communication using multiple-input and multiple-output (MIMO) to multiply the capacity of a radio link using multiple transmission and receiving antennas to exploit multipath propagation. In this example, each of the extender devices 105a, 105b communicates with a base station operated by a different MNO. That is, base station 107a is operated by a different MNO than base station 107b. The consumer device 103 can optionally communicate via cellular communication with one of the base stations 107a, 107b, or another base station, and can also use MIMO to multiply the capacity of the cellular communication.

Figure 17:
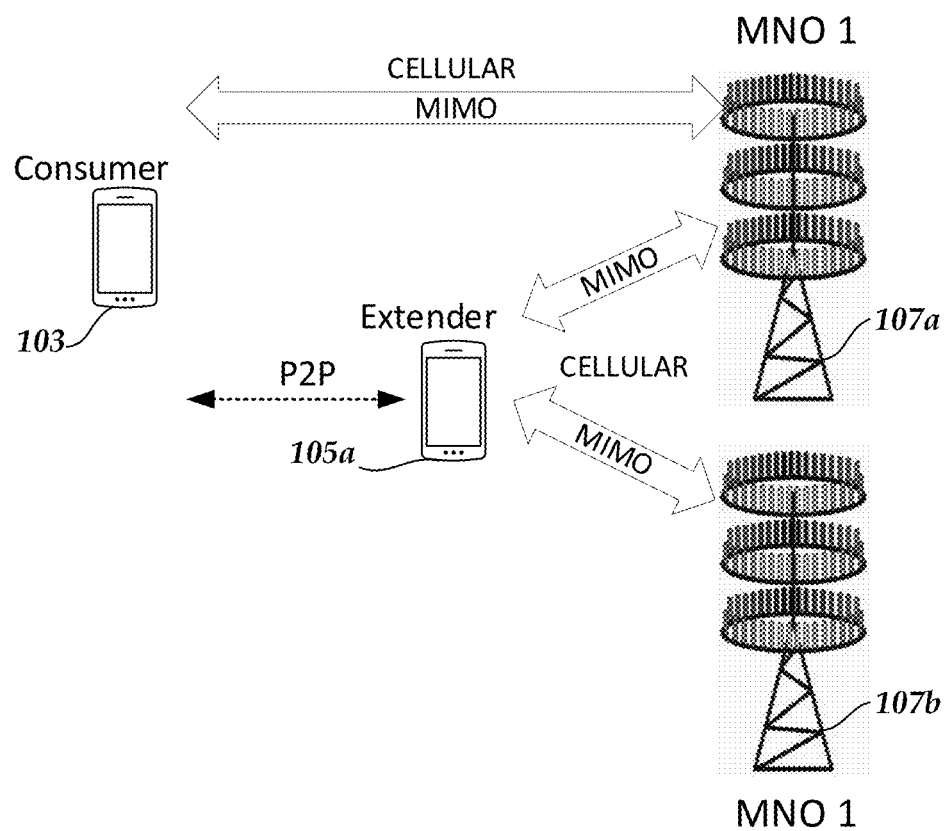
FIG. 17 is a diagram illustrating a portion of a wireless network environment in which a consumer device can communicate with an extender device via a P2P link, and the extender device can communicate to two base stations via cellular communication using multiple-input and multiple-output (MIMO) to multiply the capacity of a radio link using multiple transmission and receiving antennas to exploit multipath propagation. In this example, the extender device communicates with base stations operated by the same MNO. Also, the consumer device can optionally communicate via cellular communication with one of the base stations, or another base station, and can also use MIMO to multiply the capacity of the cellular communication.

FIG. 17 is a diagram illustrating a portion of a wireless network environment in which a consumer device 103 can communicate with an extender device 105a via a P2P link, and the extender device 105a can communicate to two base stations 107a, 107b via cellular communication using multiple-input and multiple-output (MIMO) to multiply the capacity of a radio link using multiple transmission and receiving antennas to exploit multipath propagation. In other examples, the extender device 105a can communicate with more than two base stations. In the example illustrated in FIG. 17, the extender device 105a communicates with two base stations 107a, 107b operated by the same MNO. The consumer device 103 can optionally communicate via cellular communication with one of the base stations 107a, 107b, or another base station, and can also use MIMO to multiply the capacity of the cellular communication.

Figure 18:
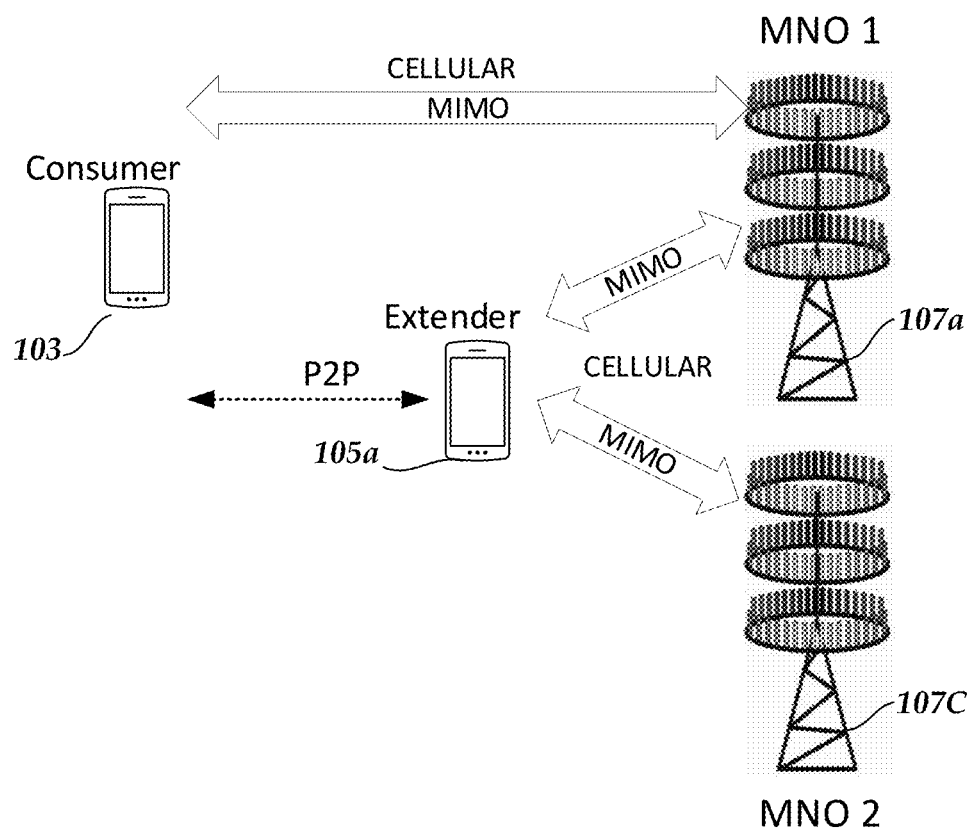
FIG. 18 is a diagram illustrating a portion of a wireless network environment in which a consumer device can communicate with an extender device via a P2P link, and the extender device can communicate to two base stations via cellular communication using multiple-input and multiple-output (MIMO) to multiply the capacity of a radio link using multiple transmission and receiving antennas to exploit multipath propagation. In this example, the extender device communicates with base stations operated by a different MNO. Also, the consumer device can optionally communicate via cellular communication with one of the base stations, or another base station, and can also use MIMO to multiply the capacity of the cellular communication.

FIG. 18 is a diagram illustrating a portion of a wireless network environment in which a consumer device 103 can communicate with an extender device 105a via a P2P link, and the extender device 105a can communicate with two base stations 107a, 107c via cellular communication using multiple-input and multiple-output (MIMO) to multiply the capacity of a radio link using multiple transmission and receiving antennas to exploit multipath propagation. In this example, the extender device 105a communicates with base stations 107a, 107c that are each operated by a different MNO. The consumer device can optionally communicate via cellular communication with one of the base stations 107a, 107c, or another base station, and can also use MIMO to multiply the capacity of the cellular communication.

Figure 19:
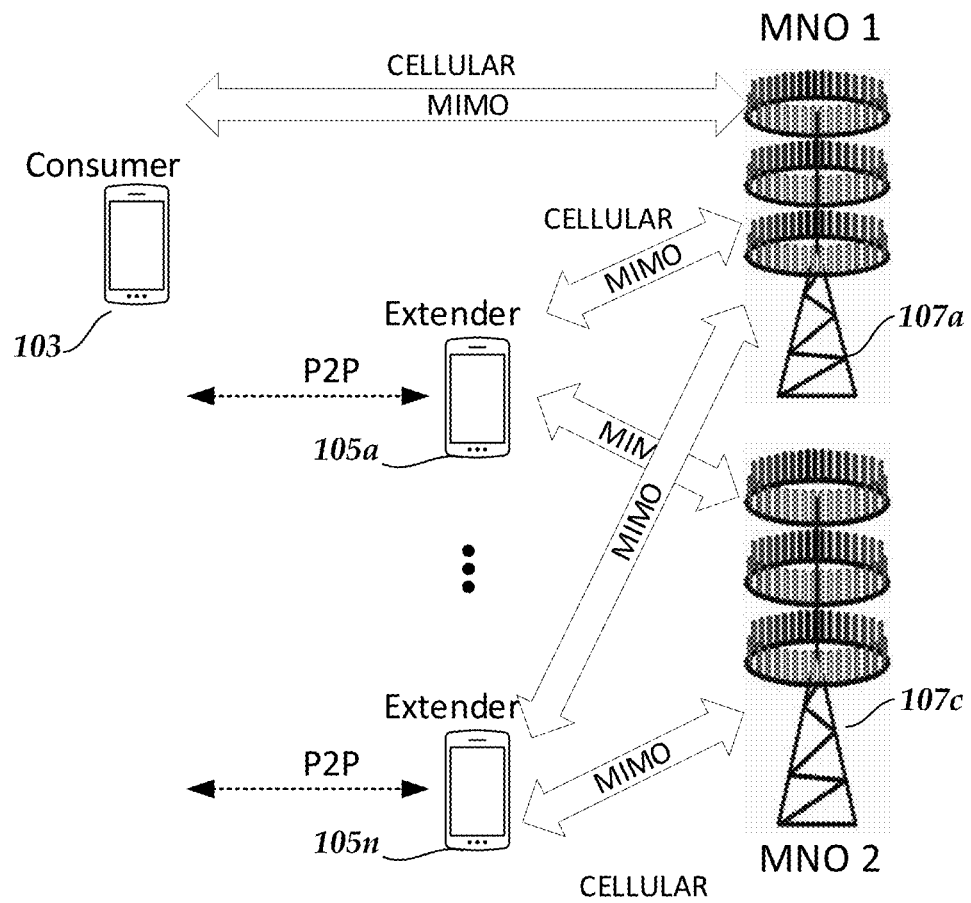
FIG. 19 is a diagram illustrating a portion of a wireless network environment in which a consumer device can communicate with a plurality of extender devices via P2P links, and each of the extender devices can communicate to two base stations via cellular communication using multiple-input and multiple-output (MIMO) to multiply the capacity of a radio link using multiple transmission and receiving antennas to exploit multipath propagation. In this example, the extender devices communicate with base stations operated by either the same MNO, or two or more different MNOs. Also, the consumer device can optionally communicate via cellular communication with one of the base stations, or another base station, and can also use MIMO to multiply the capacity of the cellular communication.

FIG. 19 is a diagram illustrating a portion of a wireless network environment in which a consumer device 103 can communicate with a plurality of extender devices 105a, . . . 105n via P2P links. Each of the extender devices 105a, . . . 105n can communicate to two base stations 107a, 107c via cellular communication using multiple-input and multiple-output (MIMO) to multiply the capacity of a radio link using multiple transmission and receiving antennas to exploit multipath propagation. In this example, the extender devices 105a, . . . 105n communicate with base stations 107a, 107c that are operated by either different MNOs (as illustrated here), or two more different MNOs. The consumer device 103 can optionally communicate via cellular communication with one of the base stations 107a, 107c, or another base station, and can also use MIMO to multiply the capacity of the cellular communication.

Figure 20:
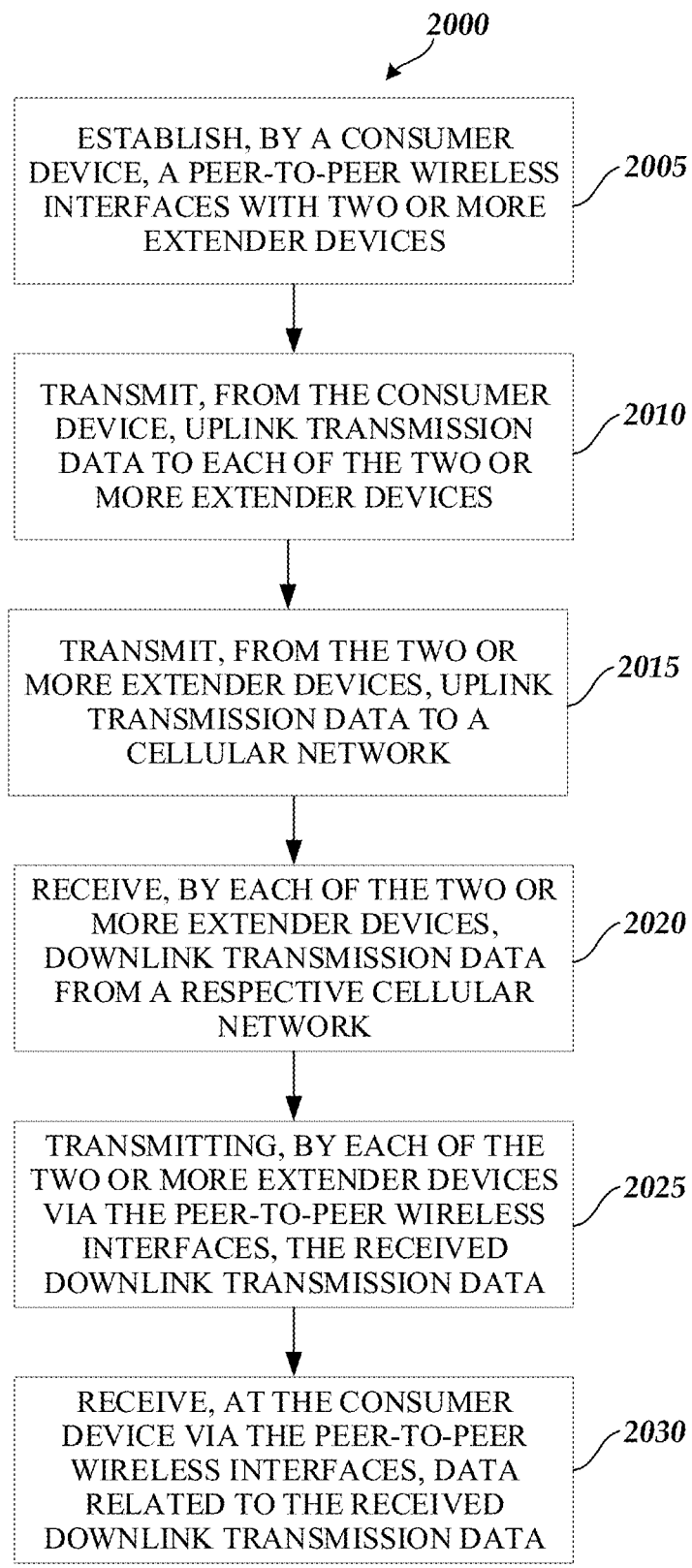
FIG. 20 is a flow diagram illustrating a process of wireless communication between a consumer device and a cellular network.

FIG. 20 is a flow diagram illustrating a method 2000 of wireless communication between a consumer device and a cellular network. At block 2005 the method establishes a peer-to-peer wireless interface between a consumer device and two or more extender devices. In some examples, the consumer device and the extender devices can be mobile communication devices such as smart phones, tablets, or laptops, or can be communication technology implemented in a vehicle (e.g., a car, truck, motorcycle, airplane, and the like). At block 2010, the method transmits, from the consumer device, uplink data to each of the two or more extender devices using the P2P wireless interface to communicate the uplink data to each of the 2 or more extender devices. At block 2015, the method transmits but each of the two or more extender devices, uplink transmission data to a cellular network. In various examples, the two or more extender devices a transmit the uplink transmission data to the same base station, two or more different base stations that are operated by the same MNO, or operated by a different MNO.

At block 2020, the method receives by each of the two or more extender devices, downlink transmission data from a respective cellular network. In some examples, the communication of the downlink transmission data is done using a MIMO protocol. At block 2025, the method transmits by each of the two or more extender devices via the peer-to-peer wireless interface, the received downlink transmission data to the consumer device. The method continues and at block 2030, the consumer device receives via the peer-to-peer wireless interface, data related to the received downlink transmission data. Any features disclosed herein that relate to such methods can also be employed, as described herein.

Figure 21:
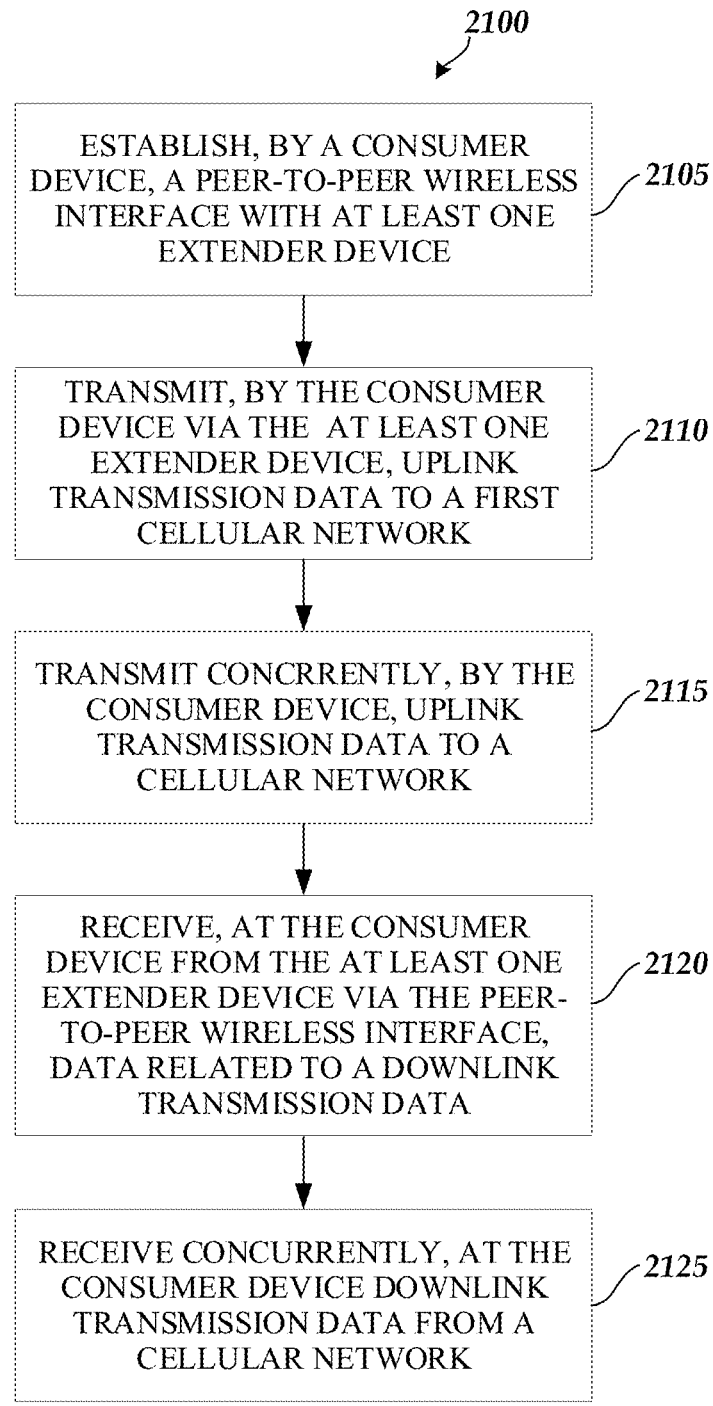
FIG. 21 is a flow diagram illustrating a process of wireless communication between a consumer device and a cellular network.

FIG. 21 is a flow diagram illustrating a process 2100 of wireless communication between a consumer device and a cellular network. At block 2105, the method establishes, by a consumer device, a peer-to-peer wireless interface (or connection) with at least one extender device. At block 2110, the method transmits, by the consumer device via the at least one extender device, uplink transmission data to a cellular network. For example, the consumer device transmits data for uplink transmission to a cellular network to the at least one extender device via the P2P connection with the at least one extender device. The method continues and at block 2115, the consumer device transmits uplink transmission data to a cellular network, the operation of the transmission of the uplink transmission data to a cellular network done concurrently with the consumer device transmitting data to the at least one extender device over the peer-to-peer network. "Concurrent" or "concurrently" as used herein, in the context of transmitting data from a consumer device to at least one extender device or to a cellular network, is a broad term to that indicates the transmissions can occur during the same time period or a portion of the same time where the time period is, for example, generally less than 10 seconds, less than 5 seconds, less than 2 seconds, less than a second, or less than 0.5 seconds. In other words, such that the transmissions generally occur simultaneously. The transmission of uplink transmission data from the consumer device to the cellular network can be a direct transmission from the consumer device to a base station of the cellular network. In other words, this transmission of uplink transmission data from the consumer device does not utilize an extender device to reach the cellular network. The transmission of uplink transmission data from the consumer device to a cellular network can be performed in parallel with the communication of uplink transmission data to the cellular network by the at least one extender device.

The method can continue and at block 2120 the consumer device receives from the at least one extender device via the peer-to-peer wireless interface, data related to a downlink transmission that the at least one extender device received from the cellular network. The method can continue and at block 2125, the consumer device can receive downlink transmission data directly from a cellular network. The uplink transmission data from the consumer device to the cellular network and/or the uplink transmission data from the at least one extender device to the cellular network can utilize a MIMO protocol. Also, the downlink transmission data from the cellular network to the consumer device, and the downlink transmission data from the cellular network to the at least one extender device can also utilize a MIMO protocol. In some examples, a MIMO protocol can be utilized such that portions of related downlink transmission data are provided to the consumer device via the downlink transmission data directly from the cellular network and portions are provided via the at least one extender device. Similarly, in some examples a MIMO protocol can be utilized such that portions of the related uplink transmission data provided by the consumer device directly to the cellular network and portions of related uplink transmission data are provided by the consumer device to the cellular network via the at least one extender device. Any features disclosed herein that relate to such methods can also be employed, as described herein.

Examples of Certain Embodiments

The following are non-limiting examples of certain embodiments of systems and methods of wireless communications. Other embodiments may include one or more other features, or different features, that are discussed herein.

Embodiment 1: A method of token-based cellular communications, the method comprising: storing, by one or more servers of a mobile virtual network operator (MVNO), account data for consumer accounts associated with a respective consumer device, the consumer accounts including a first consumer account associated with a first consumer device, the account data including a number of tokens for each consumer account; storing, by the one or more servers of the MVNO, account data for extender accounts associated with a respective extender device, each extender device configured to communicate on an associated cellular network of a mobile network operator (MNO), the extender accounts including a first extender account associated with a first extender device configured to communicate on a cellular network of a first MNO, the account data including a number of tokens for the each extender account; storing, by the one or more servers of the MVNO, account data for one or more mobile network operator (MNO) accounts, each account associated with one of a set of one or more MNO's that at least includes the first MNO, the account data for each MNO account including information of services of the associated MNO used by the MVNO via an extender device; detecting, by the one or more servers of the MVNO, the first extender device connecting to a cellular network of an associated MNO and service usage information on the MNO by the first extender device for the first consumer device; updating, by the one or more servers of the MVNO and in response to the detecting, an amount of tokens of the first consumer account; updating, by the one or more servers of the MVNO and in response to the detecting, an amount of tokens of the first extender account; and updating, by the one or more servers of the MVNO, account data of the MNO account associated with the first MNO based at least in part on the service usage information of the first MNO by the first extender device for the first consumer device.

Embodiment 2: The method of embodiment 1, wherein updating an amount of tokens of the first extender account includes increasing the number of tokens based at least in part on the service usage information.

Embodiment 3: The method of embodiment 2, wherein each of the plurality of MNO accounts are associated with a different MNO.

Embodiment 4: The method of embodiment 1, wherein updating an amount of tokens of the first consumer account includes decreasing the number of tokens based at least in part on the service usage information.

Embodiment 5: The method of embodiment 4, further comprising receiving payment for tokens from a user associated with a consumer account, and wherein updating the account data to indicate an increase in the number of tokens in a consumer account is in response to receiving the payment for the tokens.

Embodiment 6: The method of embodiment 4, further comprising receiving a promise for payment of tokens from a user associated with a consumer account, and wherein updating the account data to indicate an increase in the number of tokens in a consumer account is in response to receiving the promise for payment of the tokens.

Embodiment 7: The method of embodiment 1, wherein further comprising receiving, by the one or more servers of the MVNO, one or more tokens from an extender device in exchange for MNO services of the extender device.

Embodiment 8: The method of embodiment 1, further comprising determining, by the one or more servers of the MVNO, a number of tokens needed for services of the first MNO used by the first consumer device via the first extender device.

Embodiment 9: The method of embodiment 8, wherein the determining a number of tokens is based on one or more factors.

Embodiment 10: The method of embodiment 8, wherein the one or more factors comprise the amount of data to be communicated by the first extender on the first MNO.

Embodiment 11: The method of embodiment 8, wherein the one or more factors comprise the data quality of connection indicated by an achievable data rate.

Embodiment 12: The method of embodiment 8, wherein the MVNO is a social media entity.

Embodiment 13: The method of embodiment 9, wherein the number of tokens for services is based on the allowing advertisements to be received on the first consumer device.

Embodiment 14: The method of embodiment 1, wherein the number of tokens for services is based on allowing data mining of social media information on the first consumer device by the MVNO.

Embodiment 15: The method of embodiment 1, wherein the first consumer device is a laptop computer, a tablet computer, an IoT device, or a smart phone.

Embodiment 16: The method of embodiment 1, wherein the first consumer device is mobile device.

Embodiment 17: The method of embodiment 1, wherein the first consumer device does not include a cellular modem.

Embodiment 18: A token-based cellular communication system, comprising: one or more servers of a mobile virtual network operator (MVNO) configured to: store account data for consumer accounts associated with a respective consumer device, the account data including a number of tokens for each consumer account; store account data for extender accounts associated with a respective extender device, each extender device configured to communicate on an associated mobile network operator (MNO) cellular network, the account data including a number of tokens for each extender account; receive information indicating a first extender device connected to a cellular network of an associated MNO, indicting a first consumer device connected to the first extender device, and indicting service usage information of the first extender device on the associated MNO; update account information of the first extender device to indicate an additional number of tokens in the account of the first extender device based on the received service usage information; and update account information of the first consumer device to indicate a decrease in the number of tokens in the account of the first consumer device based on the received service usage information.

Embodiment 19: The token-based system of embodiment 18, wherein the one or more servers of the MVNO are further configured to update account data of an MNO account associated with the first extender device based at least in part on the received service usage information.

Embodiment 20: The token-based system of embodiment 18, wherein the one or more servers of the MVNO are further configured to communicate with the first extended device and communicate with the first consumer device to determine, at least in part, the amount of tokens to be used for a connection.

Embodiment 21: The token-based system of embodiment 20, wherein said to determine, at least in part, the amount of tokens to be used for a connection is based on a tier of service indicated for the first consumer device.

Embodiment 22: A method of token-based cellular communications, method comprising: receiving, by the extender device, information indicative of nearby consumer devices; transmitting via messaging, by the extender device, information on decision factors for the consumer device to determine whether to establish a connection; receiving, by an extender device, a request to connect to a consumer device seeking access to a cellular communication network; establishing, by the extender device, communications with the consumer device via a peer-to-peer (P2P) link; receiving, by the extender device, data from the consumer device; transmitting, by the extender device, data associated with the received data to a wireless communications network operated by a mobile network operator (MNO) associated with the extender device; receiving from the wireless communications network, by the extender device, data associated with the consumer device; transmitting the data associated with the consumer device to the consumer device via the P2P link; and receiving, at the extender device, token information indicating a number of tokens added to an account of the extender device, the token information associated with a mobile virtual network operator (MVNO) that the extender device has an account with, the number of tokens being based on service usage information for the extender device on the MNO for transmitting and receiving data associated with the consumer device.

Embodiment 23: The method of embodiment 22, wherein the information on decision factors for the consumer device to determine whether to establish a connection comprise status indicative of one or more of battery life and signal strength of the extender device.

Embodiment 24: A method of token-based cellular communications, method comprising: determining the presence of nearby extender devices; transmitting, by a consumer device, a request to connect to an extender device for access to a cellular communication network; establishing, by the consumer device, communications with the extender device via a peer-to-peer link; transmitting, by the consumer device, data to the extender device for transmission to the cellular communication network; receiving, by the consumer device, data from the extender device via the P2P link, the received data associated with data transmitted by the consumer device; receiving, at the consumer device, token information indicating a number of tokens subtracted from an account of the consumer device, the token information associated with a mobile virtual network operator (MVNO) that the consumer device has an account with, the number of tokens being based on service usage information of the extender device on the MNO for transmitting and receiving data associated with the consumer device.

Embodiment 25: The method of embodiment 24, wherein determining the presence of nearby extender devices comprises receiving, at the consumer device and via the P2P link, signals from at least one extender device.

Embodiment 26: The method of embodiment 24, wherein determining the presence of nearby extender devices comprises receiving, at the consumer device from the MVNO, information indicating the presence of nearby extender devices.

Embodiment 27: The method of embodiment 24, wherein the information indicating the presence of nearby extender devices comprises location information of extender devices that are within a determined distance of the consumer device.

Embodiment 28: The method of embodiment 24, wherein the determined distance is a predetermined distance.

Embodiment 29: The method of embodiment 24, wherein the determined distance is a distance selected by the consumer device.

Terminology, Applications, and Conclusion

Depending on the embodiment, certain acts, events, or functions of any of the processes or algorithms described herein can be performed in a different sequence, can be added, merged, or left out altogether (e.g., not all described operations or events are necessary for the practice of the process or algorithm). Moreover, in certain embodiments, operations, or events can be performed concurrently, e.g., through multi-threaded processing, interrupt processing, or multiple processors or processor cores or on other parallel architectures, rather than sequentially.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements, and/or operations. Thus, such conditional language is not generally intended to imply that features, elements, and/or operations are in any way required for one or more embodiments or that one or more embodiments necessarily include logic for deciding, with or without other input or prompting, whether these features, elements, and/or steps are included or are to be performed in any particular embodiment. The terms "comprising," "including," and the like are synonymous and are used inclusively, in an open-ended fashion, and do not exclude additional elements, features, acts, operations, and so forth. Additionally, the words "herein," "above," "below," and words of similar import, when used in this application, shall refer to this application as a whole and not to any particular portions of this application. Where the context permits, words in the above Detailed Description of Certain Embodiments using the singular or plural may also include the plural or singular, respectively. Also, the term "or" is used in its inclusive sense (and not in its exclusive sense) so that when used, for example, to connect a list of elements, the term "or" means one, some, or all of the elements in the list.

Disjunctive language such as the phrase "at least one of X, Y, Z," unless specifically stated otherwise, is otherwise understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Unless otherwise explicitly stated or generally understood from context, articles such as "a" or "an" should generally be interpreted to include one or more described items. Accordingly, phrases such as "a device configured to" are intended to include one or more recited devices. Such one or more recited devices can also be collectively configured to carry out the stated recitations. For example, "a processor configured to carry out recitations A, B and C" can include a first processor configured to carry out recitation A working in conjunction with a second processor configured to carry out recitations B and C.

The word "coupled," as generally used herein, refers to two or more elements that may be either directly coupled to each other, or coupled by way of one or more intermediate elements. Likewise, the word "connected," as generally used herein, refers to two or more elements that may be either directly connected, or connected by way of one or more intermediate elements.

As used herein, the terms "determine" or "determining" encompass a wide variety of actions. For example, "determining" may include calculating, computing, processing, deriving, generating, obtaining, looking up (e.g., looking up in a table, a database or another data structure), ascertaining and the like via a hardware element without user intervention. Also, "determining" may include receiving (e.g., receiving information), accessing (e.g., accessing data in a memory) and the like via a hardware element without user intervention. Also, "determining" may include resolving, selecting, choosing, establishing, and the like via a hardware element without user intervention.

As used herein, the terms "provide" or "providing" encompass a wide variety of actions. For example, "providing" may include storing a value in a location of a storage device for subsequent retrieval, transmitting a value directly to the recipient via at least one wired or wireless communication medium, transmitting or storing a reference to a value, and the like. "Providing" may also include encoding, decoding, encrypting, decrypting, validating, verifying, and the like via a hardware element.

While the above detailed description has shown, described, and pointed out novel features as applied to various embodiments, it can be understood that various omissions, substitutions, and changes in the form and details of the devices or algorithms illustrated can be made without departing from the spirit of the disclosure. For example, circuit blocks and/or method blocks described herein may be deleted, moved, added, subdivided, combined, arranged in a different order, and/or modified. Each of these blocks may be implemented in a variety of different ways. Any portion of any of the methods disclosed herein can be performed in association with specific instructions stored on a non-transitory computer readable storage medium being executed by one or more processors. As can be recognized, certain embodiments described herein can be embodied within a form that does not provide all of the features and benefits set forth herein, as some features can be used or practiced separately from others. The scope of certain embodiments disclosed herein is indicated by the appended claims rather than by the foregoing description. All changes which come within the meaning and range of equivalency of the claims are to be embraced within their scope.

What is claimed is:

1. A method of wireless communication, the method comprising:
    establishing, by a consumer device, peer-to-peer wireless links with two or more extender devices;
    transmitting concurrently, from the consumer device, uplink data to each of the two or more extender devices;
    transmitting, by each of the two or more extender devices, uplink transmission data to one or more cellular networks;
    receiving, by each of the two or more extender devices, downlink transmission data;
    transmitting, by each of the two or more extender devices via the peer-to-peer wireless links, the received downlink transmission data;
    receiving concurrently, at the consumer device via the peer-to-peer wireless links, data related to the received downlink transmission data;
    transmitting, by the consumer device, uplink transmission data to a cellular network;
    receiving, by the consumer device, downlink transmission data from the cellular network, wherein the downlink transmission data received from the cellular network and via the peer-to-peer wireless links are aggregated at the consumer device, and
    wherein said transmitting the uplink transmission data to the cellular network and said receiving the downlink transmission data from the cellular network occur during a same time period as said transmitting concurrently and said receiving concurrently.

2. The method of claim 1,
    wherein the two or more extender devices comprise a first extender device and a second extender device, and
    wherein said transmitting uplink transmission data to one or more cellular networks comprises:
        transmitting, by the first extender device, to a first cellular network operated by a first mobile network operator, and
        transmitting, by the second extender device, to a second cellular network operated by a second mobile network operator.

3. The method of claim 1, wherein the one or more cellular networks comprise a single cellular network.

4. The method of claim 1,
    wherein the two or more extender devices comprise a first extender device and a second extender device, and
    wherein said transmitting uplink transmission data to one or more cellular networks comprises:
        transmitting, by the first extender device on a first channel, to a cellular network operated by a first mobile network operator, and
        transmitting, by the second extender device on a second channel, to the cellular network operated by the first mobile network operator.

5. The method of claim 1, wherein the one or more cellular networks comprise the cellular network.

6. The method of claim 1, wherein said establishing peer-to-peer wireless links with two or more extender devices comprises establishing a first peer-to-peer wireless link with a first extender device using a first wireless protocol, and establishing a second peer-to-peer wireless link with a second extender device using a second wireless protocol different from the first wireless protocol.

7. The method of claim 6, wherein the first and second peer-to-peer wireless links include two different cellular channels.

8. A method of wireless communication, the method comprising:
    establishing, by a consumer device, a first peer-to-peer wireless link with a first extender device using a first wireless protocol;
    establishing, by the consumer device, a second peer-to-peer wireless link with a second extender device using a second wireless protocol, wherein the first wireless protocol is Wi-Fi and the second wireless protocol is Bluetooth;
    transmitting concurrently, from the consumer device, uplink data to the first and second extender devices;
    transmitting, by the first and second extender devices, uplink transmission data to one or more cellular networks;
    receiving, by the first and second extender devices, downlink transmission data;
    transmitting, by the first and second extender devices the received downlink transmission data to the consumer device; and
    receiving concurrently, at the consumer device, the downlink transmission data from the first and second extender devices.

9. The method of claim 1, wherein said transmitting concurrently comprises communicating with a first extender device of the two or more extender devices on a first peer-to-peer wireless link on a first channel, and communicating with a second extender device of the two or more extender devices on a second peer-to-peer wireless link on a second channel.

10. The method of claim 9, wherein at least one of the first and second channels is a channel is a millimeter wave band channel.

11. The method of claim 9, wherein at least one of the first and second channels is a channel is a sub-6 GHz channel.

12. The method of claim 9, wherein the first channel and the second channel are different bands of 4G.

13. The method of claim 9, wherein the first channel and the second channel are different bands of 5G.

14. The method of claim 1, wherein the peer-to-peer wireless links include Wi-Fi links.

15. The method of claim 14, wherein the Wi-Fi links include a first Wi-Fi link on first channel at 2.4 GHz and a second Wi-Fi link on a second channel at or below 6 GHz.

16. The method of claim 8, further comprising:
transmitting, by the consumer device, uplink transmission data to a cellular network; and
receiving, by the consumer device, downlink transmission data from the cellular network, wherein the downlink transmission data receiving from the cellular network and via the peer-to-peer wireless links are aggregated at the consumer device,
wherein said transmitting the uplink transmission data to the cellular network and said receiving the downlink transmission data from the cellular network occur during a same time period as said transmitting concurrently and said receiving concurrently.

17. The method of claim 8, wherein transmitting, by the first and second extender devices, uplink transmission data to one or more cellular networks involves multiple-input and multiple-output (MIMO) communication.

18. A method of wireless communication, the method comprising:
establishing, by a consumer device, a first peer-to-peer wireless link with a first extender device using a first wireless protocol;
establishing, by the consumer device, a second peer-to-peer wireless link with a second extender device using a second wireless protocol, wherein the first and second peer-to-peer wireless links include two different cellular channels;
transmitting concurrently, from the consumer device, uplink data to the first and second extender devices;
transmitting, by the first and second extender devices, uplink transmission data to one or more cellular networks;
receiving, by the first and second extender devices, downlink transmission data;
transmitting, by the first and second extender devices the received downlink transmission data to the consumer device; and
receiving concurrently, at the consumer device, the downlink transmission data from the first and second extender devices.

19. The method of claim 18, further comprising:
transmitting, by the consumer device, uplink transmission data to a cellular network; and
receiving, by the consumer device, downlink transmission data from the cellular network, wherein the downlink transmission data receiving from the cellular network and via the peer-to-peer wireless links are aggregated at the consumer device,
wherein said transmitting the uplink transmission data to the cellular network and said receiving the downlink transmission data from the cellular network occur during a same time period as said transmitting concurrently and said receiving concurrently.

20. The method of claim 18, wherein transmitting, by the first and second extender devices, uplink transmission data to one or more cellular networks involves multiple-input and multiple-output (MIMO) communication.

21. A method of wireless communication, the method comprising:
establishing, by a consumer device, peer-to-peer wireless links with first and second extender devices;
transmitting, by the consumer device via the first and second extender devices, uplink transmission data to a first cellular network, wherein the first and second extender devices each wirelessly communicate with the first cellular network using multiple-input and multiple-output (MIMO) communication;
transmitting, by the consumer device, uplink transmission data to a second cellular network using MIMO communication concurrently with the transmitting, by the consumer device via the first and second extender devices, uplink transmission data to the first cellular network;
receiving, at the consumer device from the first and second extender devices via the peer-to-peer wireless links, data related to a downlink transmission from the first cellular network; and
receiving, at the consumer device, downlink transmission data from the second cellular network.

22. The method of claim 21, wherein the first cellular network and the second cellular network are operated by the same mobile network operator.

23. The method of claim 21, wherein the first cellular network and the second cellular network are operated by different mobile network operators.

24. A method of wireless communication, the method comprising:
sending data from a consumer device for cellular communication to an extender device via a first peer-to-peer wireless link;
sending data from the consumer device to a communication network via another communication link concurrently with sending data via the first peer-to-peer wireless link;
receiving, at the consumer device via the first peer-to-peer wireless link, data associated with a downlink transmission from a first cellular network; and
receiving, at the consumer device via the another communication link, data associated with a downlink transmission from a second cellular network concurrently with receiving the data associated with the downlink transmission from the first cellular network.

25. The method of claim 24, wherein the another communication link comprises a cellular communication link.

26. The method of claim 24, wherein the another communication link comprises a second peer-to-peer wireless link between the consumer device and a second extender device.

27. A communication device, comprising:
one or more computer hardware processors in communication with a non-transitory computer storage medium, the one or more computer hardware processors configured to execute computer-executable instructions stored on the non-transitory storage medium to cause the communication device to at least:
establish a first communication channel with at least one extender device for transmission of data from the communication device to a first cellular network;
establish a second communication channel for transmission of data from the communication device to a second cellular network concurrent with establishing the first communication channel;
transmit uplink data via the first communication channel;
transmit uplink data via the second communication channel concurrent with transmitting first uplink data via the first communication channel;
receive, via the first communication channel, data associated with a downlink transmission from the first cellular network; and
receive, via the second communication channel, data associated with a downlink transmission from the second cellular network concurrent with receiving the data associated with the downlink transmission from the first cellular network.

28. The communication device of claim 27, wherein the first cellular network and the second cellular network are operated by the same mobile network operator.

29. The communication device of claim 27, wherein the first cellular network and the second cellular network are operated by different mobile network operators.

30. The communication device of claim 27, wherein the one or more computer hardware processors are further configured to execute the computer-executable instructions stored on the non-transitory storage medium to cause the communication device to at least aggregate the data related to the downlink transmissions from the first and second cellular networks.

* * * * *